United States Patent
Youn et al.

(10) Patent No.: US 10,437,441 B2
(45) Date of Patent: Oct. 8, 2019

(54) ELECTRONIC APPARATUS AND OPERATING METHOD THEREOF

(71) Applicant: Samsung Electronics Co., Ltd, Gyeonggi-do (KR)

(72) Inventors: Ah-Reum Youn, Gyeonggi-do (KR); Geon-Soo Kim, Gyeonggi-do (KR); Han-Jib Kim, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 330 days.

(21) Appl. No.: 15/331,776

(22) Filed: Oct. 21, 2016

(65) Prior Publication Data

US 2017/0115860 A1   Apr. 27, 2017

(30) Foreign Application Priority Data

Oct. 21, 2015 (KR) .................. 10-2015-0146701

(51) Int. Cl.
| | |
|---|---|
| G06F 3/0484 | (2013.01) |
| G06F 3/0482 | (2013.01) |
| G06F 1/16 | (2006.01) |
| G06F 3/01 | (2006.01) |
| G06F 3/023 | (2006.01) |
| G04G 21/08 | (2010.01) |
| G06F 3/0488 | (2013.01) |

(52) U.S. Cl.
CPC ......... *G06F 3/04845* (2013.01); *G04G 21/08* (2013.01); *G06F 1/163* (2013.01); *G06F 3/018* (2013.01); *G06F 3/0236* (2013.01); *G06F 3/0482* (2013.01); *G06F 3/017* (2013.01); *G06F 3/04883* (2013.01); *G06F 3/04886* (2013.01); *G06F 2203/04803* (2013.01); *G06F 2203/04807* (2013.01)

(58) Field of Classification Search
CPC .............................. G06F 3/0484; G06F 3/0482
See application file for complete search history.

(56) References Cited

U.S. PATENT DOCUMENTS

| | | | |
|---|---|---|---|
| 6,744,427 B2 | 6/2004 | Maglio et al. | |
| 7,036,091 B1 | 4/2006 | Nguyen | |

(Continued)

FOREIGN PATENT DOCUMENTS

| | | |
|---|---|---|
| JP | 2007-287135 | 11/2007 |
| KR | 10-2014-0137170 | 12/2014 |
| KR | 10-2015-0031614 | 3/2015 |

*Primary Examiner* — David E Choi

(57) ABSTRACT

An electronic apparatus according to an embodiment of the present disclosure includes a housing and a display exposed through one surface of the housing. The display is configured to detect a touch or gesture input and has a first radius. The electronic apparatus also has a processor and a memory which stores instructions executed to allow the processor to display a first region and a second region on the display, in which the first and the second regions are distinguished by a first curve having a second radius. Further, the processor may display first information on at least one part of the first region on the display, display second information on at least one part of the second region on the display, and change at least one part of the displayed first information in response to an input of selecting the at least one part of the second region.

17 Claims, 53 Drawing Sheets

(56) References Cited

U.S. PATENT DOCUMENTS

| | | | |
|---|---|---|---|
| 7,817,168 B2* | 10/2010 | Nagiyama | G06F 3/0482 |
| | | | 345/661 |
| 2007/0261001 A1 | 11/2007 | Nagiyama et al. | |
| 2014/0139422 A1* | 5/2014 | Mistry | G06F 3/014 |
| | | | 345/156 |
| 2014/0347289 A1 | 11/2014 | Suh et al. | |
| 2015/0077580 A1 | 3/2015 | Kim et al. | |
| 2015/0111558 A1* | 4/2015 | Yang | G04G 21/04 |
| | | | 455/418 |
| 2015/0378548 A1* | 12/2015 | Wan | G06F 1/1643 |
| | | | 345/173 |
| 2016/0327915 A1* | 11/2016 | Katzer | G04B 19/04 |
| 2017/0115860 A1* | 4/2017 | Youn | G06F 3/0482 |

\* cited by examiner

ELECTRONIC APPARATUS AND OPERATING METHOD THEREOF

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Oct. 21, 2015 and assigned Serial No. 10-2015-0146701, the entire disclosure of which is hereby incorporated by reference.

TECHNICAL FIELD

The present disclosure relates to an electronic apparatus and a method for an information display operation thereof.

BACKGROUND

In general, various functions are added to an electronic apparatus to perform a complex function. For example, the electronic apparatus may perform a mobile communication function, a data communication function, an image capturing function, a voice recording function, or the like. Such an electronic apparatus stores and manages a great amount of information. Additionally, the electronic apparatus may discover and display the information. For example, the electronic apparatus may include a display, and may display the information on the display.

An electronic apparatus (e.g., a wearable device) having a small display displays a limited amount of information on the display. For this reason, a user of the electronic apparatus has difficulty in recognizing correlation of a plurality of pieces of information being displayed, and has difficulty in performing a plurality of functions. Further, when an event (e.g., a system, a message, an application, or the like) is generated, information currently being displayed may be hidden, or a screen needs to be changed to confirm the event.

SUMMARY

To address the above-discussed deficiencies, it is a primary object to provide an electronic apparatus which addresses these concerns. According to various embodiments of the present disclosure, an electronic apparatus includes a housing and a display disposed to the housing and exposed through one surface of the housing. The display is configured to detect a touch or gesture input and has a first radius. Additionally, the electronic apparatus has a processor connected to the display, and a memory connected to the processor. The memory may store instructions executed to allow the processor to display a first region and a second region on the display, in which the first and the second regions are distinguished by a first curve having a second radius. Further, the processor may display first information on at least one part of the first region on the display, display second information on at least one part of the second region on the display, and change at least one part of the displayed first information in response to an input of selecting the at least one part of the second region.

According to various embodiments of the present disclosure, an electronic apparatus includes a housing, a circular-shaped display exposed through one surface of the housing and having a first radius, a user input device, a processor electrically connected to the display and the user input device, and a memory electrically connected to the processor. The memory may store instructions executed to allow the processor to display a first region and a second region, which are distinguished by a first curve having a second radius, on the display, display a first item on at least one part of the first region on the display, display a second item on at least one part of the second region on the display, and change at least one part of a screen displayed on the second region in response to an input of selecting the second item.

According to various exemplary embodiments of the present disclosure, a method of operating an electronic apparatus includes displaying a first region and a second region, which are distinguished by a first curve having a second radius, on an information display screen having a first radius. The method may further include displaying first information on at least one part of the first region, displaying second information on at least one part of the second region, and changing at least one part of the displayed first information or second information, in response to an input of selecting the at least one part of the second region.

An electronic apparatus and an operating method thereof according to various embodiments of the present disclosure may include a display of, or in a method embodiment, displaying an information display screen including a first region and a second region. In various embodiments of the present disclosure, a variety of information can be displayed through a small display controlled by a user. That is, a screen can be effectively divided by using an information display screen with a user interface (UI) for a variety of information and applications.

In one embodiment of the present disclosure, a plurality of applications currently being executed can be displayed through the second region of the information display screen, and information can be easily shared between the applications. That is, multi-tasking can be supported through a plurality of sub-regions, and information sharing can be supported between an application displayed on the first region and an application displayed on the second region or between multiple applications displayed on the second region. Further, this can be easily confirmed by displaying a menu having an index or a multi-depth on the second region.

In one embodiment of the present disclosure, a keyboard can be correctly input on a small screen in such a manner that the keyboard is effectively displayed on the second region so that a character may be input thereon.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
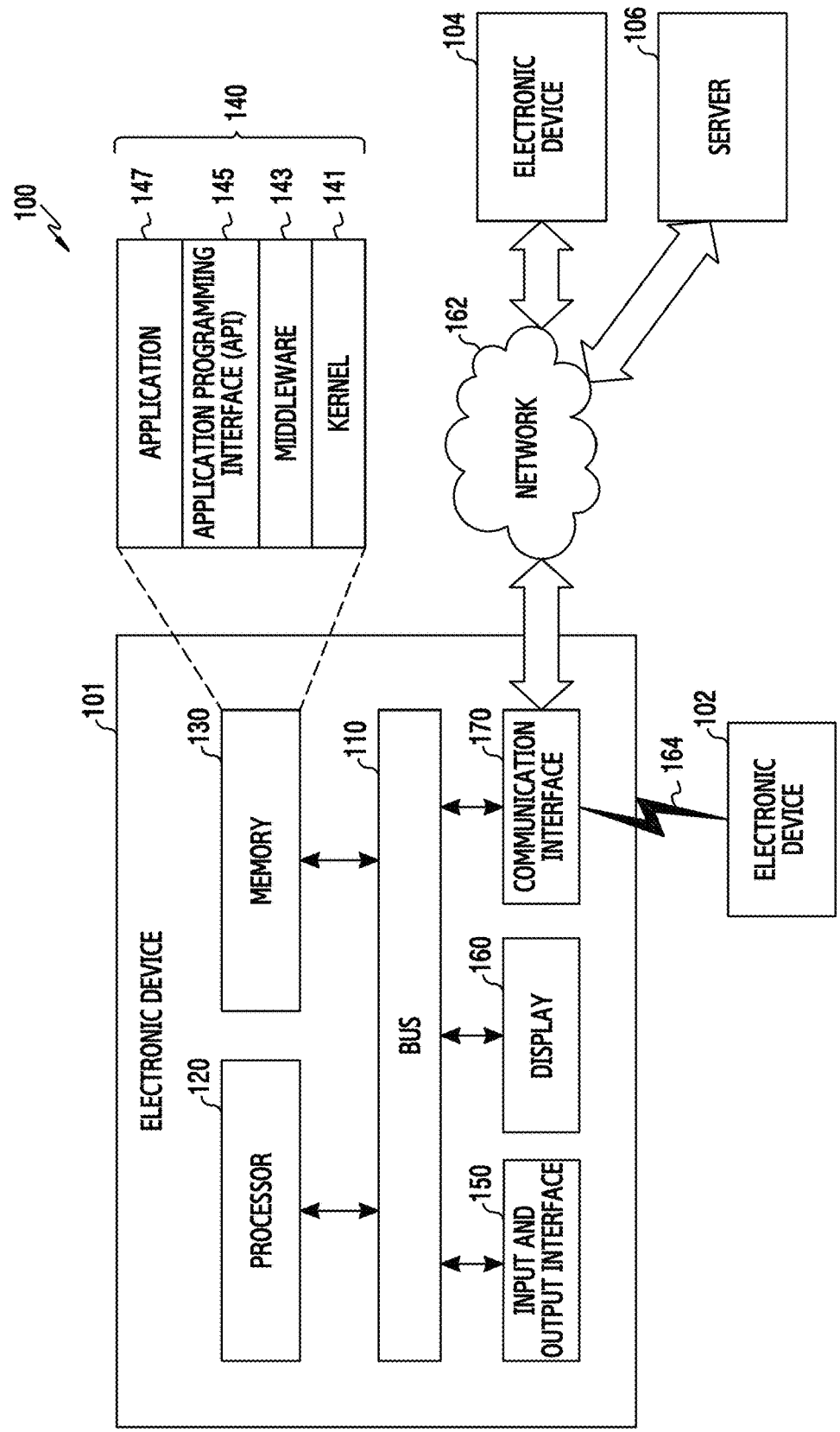
FIG. 1 illustrates a network environment system according to various embodiments of the present disclosure.
Figure 53:
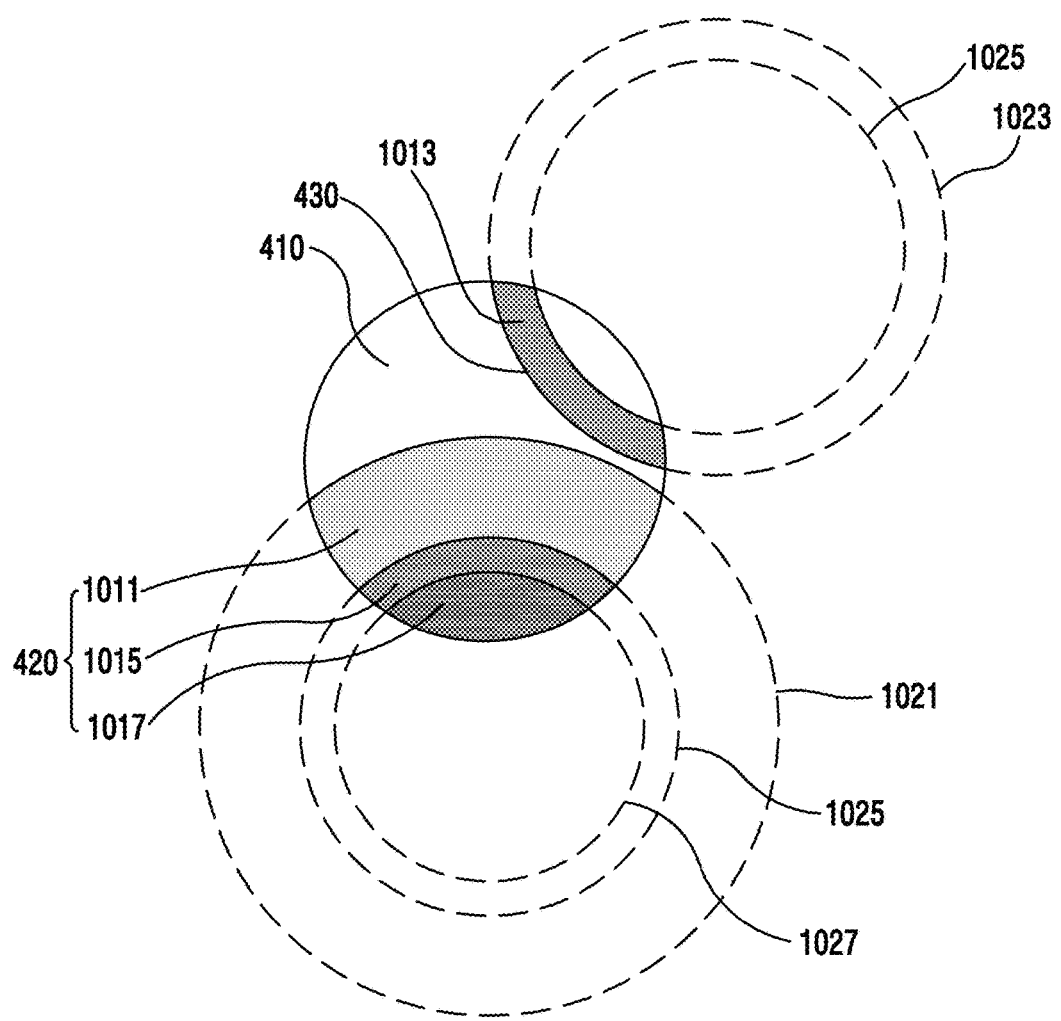

FIGS. 1 through 53, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure are described with reference to the accompanying drawings. It should be understood, however, that it is not intended that the disclosure be limited to the various embodiments of the present document, in the particular form disclosed. On the contrary, it is intended that the disclosure cover all modifications, equivalents, and alternatives falling within the spirit and scope of the various embodiments of the present document. Like reference numerals denote like components throughout the drawings. A singular expression includes a plural concept unless there is a contextually distinctive difference therebetween. In the present disclosure, an expression "A or B", "A and/or B", or the like may include all possible combinations of items enumerated together. Although expressions such as "$1^{st}$", "$2^{nd}$", "first", and "second" may be used to express corresponding constitutional elements, it is not intended to limit the corresponding constitutional elements. When a certain (e.g., $1^{st}$) constitutional element is mentioned as being "operatively or communicatively coupled with/to" or "connected to" a different (e.g., $2^{nd}$) constitutional element, the certain constitutional element is directly coupled with/to another constitutional element or can be coupled with/to the different constitutional element via another (e.g., $3^{rd}$) constitutional element.

An expression "configured to" used in the present disclosure may be interchangeably used with, for example, "suitable for", "having the capacity to", "adapted to", "made to", "capable of", or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

An electronic apparatus according to various embodiments of the present disclosure may include, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device. The wearable device may include at least one of an accessory-type device (e.g., a watch, a ring, a bracelet, an anklet, a necklace, glasses, contact lenses, or a Head-Mounted Device (HMD)), a fabric- or clothes-integrated device (e.g., electronic clothes), a body attaching-type device (e.g., a skin pad or tattoo), or a body implantable device (e.g., an implantable circuit). According to certain embodiments of the present disclosure, the electronic apparatus may include, for example, at least one of a television (TV), a digital video disk (DVD) player, an audio player, a refrigerator, an air conditioner, a cleaner, an oven, a microwave oven, a washing machine, an air purifier, a set-top box, a home automation control panel, a security control panel, a TV box (e.g., Samsung HomeSync®, Apple® TV, or Google® TV), a game console (e.g., Xbox®, PlayStation®), an electronic dictionary, an electronic key, a camcorder, and an electronic picture frame.

According to other embodiments of the present disclosure, the electronic apparatus may include at least one of various medical devices (e.g., various portable medical measuring devices (e.g., a blood sugar measuring device, a hear rate measuring device, a blood pressure measuring device, a body temperature measuring device, etc.), Magnetic Resonance Angiography (MRA), Magnetic Resonance Imaging (MRI), Computed Tomography (CT), imaging equipment, ultrasonic instrument, etc.)), a navigation device, a Global Positioning System (GPS) receiver, an Event Data Recorder (EDR), a Flight Data Recorder (FDR), a car infotainment device, an electronic equipment for ship (e.g., a vessel navigation device, a gyro compass, etc.), avionics, a security device, a car head unit, an industrial or domestic robot, a drone, an Automatic Teller's Machine (ATM) of financial institutions, Point Of Sales (POS) of shops, and Internet of things (e.g., a light bulb, various sensors, an electric or gas meter, a sprinkler device, a fire alarm, a thermostat, a streetlamp, a toaster, a fitness equipment, a hot water tank, a heater, a boiler, etc.). According to certain embodiments of the disclosure, the electronic apparatus may include at least one of one part of furniture, buildings/constructions or cars, an electronic board, an electronic signature receiving device, a projector, and various measurement machines (e.g., water supply, electricity, gas, propagation measurement machine, etc.). The electronic apparatus, according to various embodiments of the disclosure, may be flexible, or may be a combination of two or more of the aforementioned various devices. The electronic apparatus according to an embodiment of the present disclosure is not limited to the aforementioned devices. The term 'user' used in the present disclosure may refer to a person who uses the electronic apparatus or a device (e.g., an Artificial Intelligence (AI) device) which uses the electronic apparatus.

Referring to FIG. 1, an electronic apparatus 101 in a network environment 100 is described according to various embodiments of the disclosure. The electronic apparatus 101 may include a bus 110, a processor 120, a memory 130, an input/output interface 150, a display 160, and a communication interface 170. In an embodiment, the electronic apparatus 101 may omit at least one of the aforementioned constitutional elements or may additionally include other constitutional elements. For example, the bus 110 may include a circuit for connecting the aforementioned constitutional elements 110 to 170 to each other and for delivering communication (e.g., a control message and/or data) between the aforementioned constitutional elements. The processor 120 may include one or more of a Central Processing Unit (CPU), an application processor, and a Communication Processor (CP). The processor 120 may control, for example, at least one of other constitutional elements of the electronic apparatus 101 and/or may execute an arithmetic operation or data processing for communication.

The memory 130 may include a volatile and/or non-volatile memory. The memory 130 may store, for example, an instruction or data related to at least one different constitutional element of the electronic apparatus 101. According to one embodiment of the disclosure, the memory 130 may store a software and/or a program 140. The program 140 may include, for example, a kernel 141, a middleware 143, an Application Programming Interface (API) 145, an application program (or an "application") 147, or the like. At least one part of the kernel 141, middleware 143, or API 145 may be referred to as an Operating System (OS). The kernel 141 may control or manage, for example, system resources (e.g., the bus 110, the processor 120, the memory 130, etc.) used to execute an operation or function implemented in other programs (e.g., the middleware 143, the API 145, or the application program 147). Further, the kernel 141 may provide an interface capable of controlling or managing the system resources by accessing individual constitutional elements of the electronic apparatus 101 in the middleware 143, the API 145, or the application program 147.

The middleware 143 may perform, for example, a mediation role so that the API 145 or the application program 147 can communicate with the kernel 141 to exchange data. Further, the middleware 143 may handle one or more task requests received from the application program 147 according to a priority. For example, the middleware 143 may assign a priority capable of using the system resources (e.g., the bus 110, the processor 120, or the memory 130) of the electronic apparatus 101 to at least one of the application programs 147, and may handle the one or more task requests. The API 145 may include at least one interface or function (e.g., instruction), for example, for file control, window control, video processing, or character control, as an interface capable of controlling a function provided by the application 147 in the kernel 141 or the middleware 143. The input/output interface 150 may deliver an instruction or data input from a user or a different external device(s) to the different constitutional elements of the electronic apparatus 101, or may output an instruction or data received from the different constitutional element(s) of the electronic apparatus 101 to the different external device.

The display 160 may include various types of displays, for example, a Liquid Crystal Display (LCD), a Light Emitting Diode (LED) display, an Organic Light-Emitting Diode (OLED) display, a MicroElectroMechanical Systems (MEMS) display, or an electronic paper display. The display 160 may display, for example, a variety of contents (e.g., text, image, video, icon, symbol, or the like) to the user. The display 160 may include a touch screen, and may detect a touch, gesture, proximity, or hovering input by using, for example, an electronic pen or a part of a user's body. The communication interface 170 may establish, for example, communication between the electronic apparatus 101 and the external device (e.g., a $1^{st}$ external electronic apparatus 102, a $2^{nd}$ external electronic apparatus 104, or a server 106). For example, the communication interface 170 may communicate with the external device (e.g., the $2^{nd}$ external electronic apparatus 104 or the server 106) by being connected with a network 162 through wireless communication or wired communication.

The wireless communication may include, for example, cellular communication using at least one of LTE, LTE Advance (LTE-A), code division multiple access (CDMA), Wideband CDMA (WCDMA), Universal Mobile Telecommunications System (UMTS), Wireless Broadband (WiBro), Global System for Mobile Communications (GSM), etc. According to one embodiment of the disclosure, the wireless communication may include, for example, at least one of Wireless Fidelity (WiFi), Bluetooth®, Bluetooth Low Energy (BLE), Zigbee, Near Field Communication (NFC), magnetic secure transmission, Radio Frequency (RF), Body Area Network (BAN), etc. According to one exemplary embodiment, the wireless communication may include a Global Navigation Satellite System (GNSS). The GNSS may be, for example, Global Positioning System (GPS), Global Navigation Satellite System (Glonass®), Beidou® Navigation Satellite System (hereinafter, "Beidou") or Galileo®, the European global satellite-based navigation system, etc. Hereinafter, the "GPS" and the "GNSS" may be used interchangeably in the present disclosure. The wired communication may include, for example, at least one of Universal Serial Bus (USB), High Definition Multimedia Interface (HDMI), Recommended Standard-232 (RS-232), power-line communication, Plain Old Telephone Service (POTS), etc. The network 162 may include, for example, at least one of a telecommunications network, a computer network (e.g., LAN or WAN), the Internet, and a telephone network.

Each of the $1^{st}$ and $2^{nd}$ external electronic apparatuses 102 and 104 may be the same type or different type of the electronic apparatus 101. According to various embodiments of the present disclosure, all or some of operations executed by the electronic apparatus 101 may be executed in a different one or a plurality of electronic apparatuses (e.g., the electronic apparatus 102 or 104 or the server 106). According to one embodiment of the disclosure, if the electronic apparatus 101 needs to perform a certain function or service either automatically or at a request, the electronic apparatus 101 may request at least a part of functions related thereto alternatively or additionally to a different electronic apparatus (e.g., the electronic apparatus 102 or 104 or the server 106) instead of executing the function or the service autonomously. The different electronic apparatus (e.g., the electronic apparatus 102 or 104 or the server 106) may execute the requested function or additional function, and may deliver a result thereof to the electronic apparatus 101. The electronic apparatus 101 may provide the requested function or service either directly or by additionally processing the received result. For this, for example, a cloud computing, distributed computing, or client-server computing technique may be used.

Figure 2:
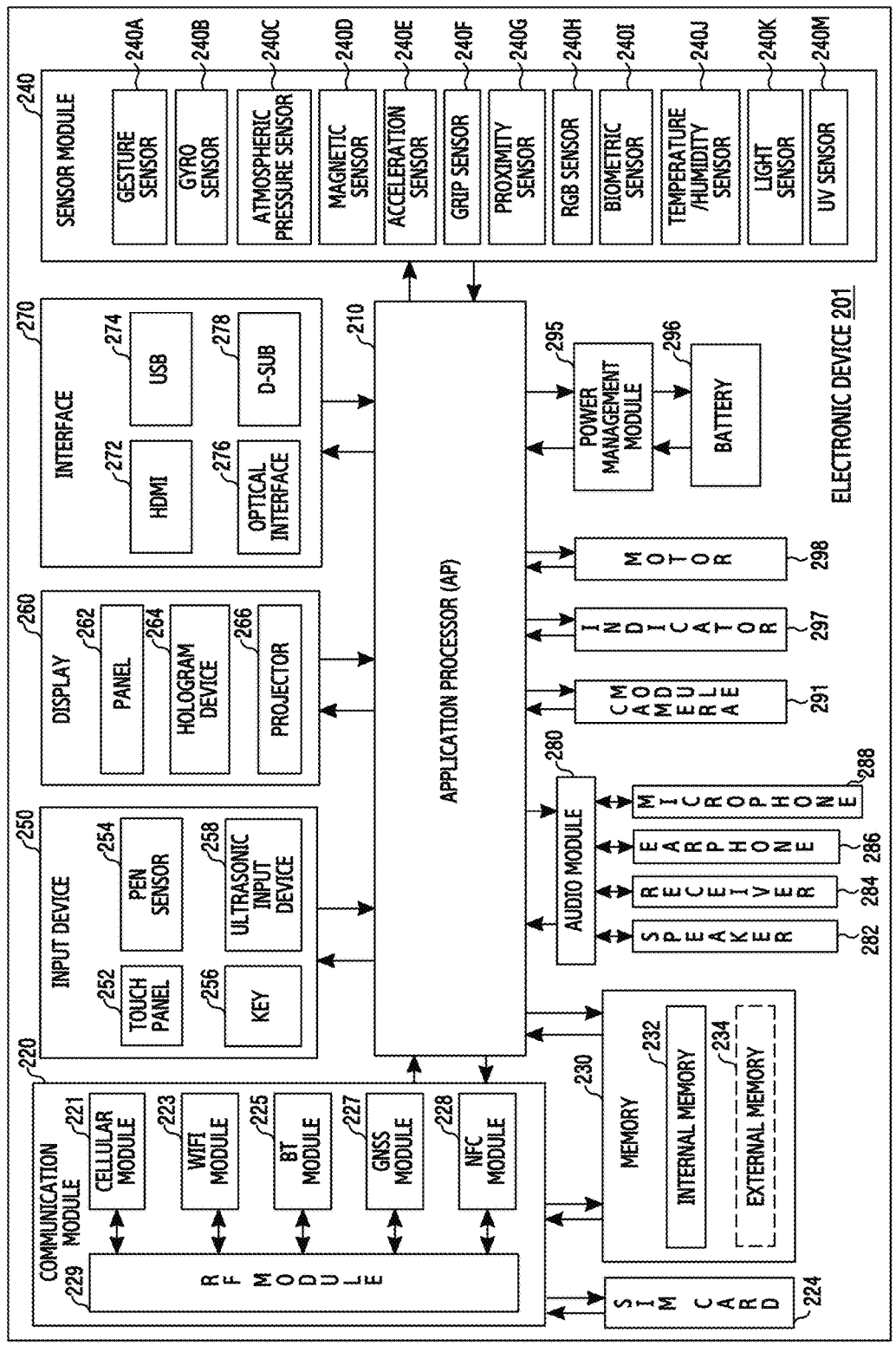
FIG. 2 is a block diagram of an electronic apparatus according to various embodiments of the present disclosure.

FIG. 2 is a block diagram of an electronic apparatus 201 according to various embodiments of the present disclosure. The electronic apparatus 201 may include, for example, all or some parts of the electronic apparatus 101 of FIG. 1. The electronic apparatus 201 may include one or more processors (e.g., Application Processors (APs)) 210, a communication module 220, a subscriber identity module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software constitutional elements connected to the processor 210 by driving, for example, an operating system or an application program, and may process a variety of data including multimedia data and may perform an arithmetic operation. The processor 210 may be implemented, for example, with a System on Chip (SoC). According to one embodiment of the disclosure, the processor 210 may further include a Graphic Processing Unit (GPU) and/or an image signal processor. The processor 210 may include at least one part (e.g., a cellular module 221) of the aforementioned constitutional elements of FIG. 2. The processor 210 may process an instruction or data, which is received from at least one of different constitutional elements (e.g., a non-volatile memory), by loading it to a volatile memory and may store a variety of data in the non-volatile memory.

The communication module 220 may have the same or similar configuration of the communication interface 170. The communication module 220 may include, for example, the cellular module 221, a Wi-Fi module 223, a BlueTooth® (BT) module 225, a Global Positioning System (GPS) module 227, a Near Field Communication (NFC) module 228, and a Radio Frequency (RF) module 229. The cellular module 221 may provide a voice call, a video call, a text service, an Internet service, or the like, for example, through a communication network. According to one embodiment of the disclosure, the cellular module 221 may identify and authenticate the electronic apparatus 201 in the communication network by using a subscriber identity module (e.g., a Subscriber Identity Module (SIM) card) 224.

According to one embodiment of the disclosure, the cellular module 221 may perform at least some functions that can be provided by the processor 210. According to one embodiment of the disclosure, the cellular module 221 may include a Communication Processor (CP). According to an embodiment of the disclosure, at least some (e.g., two or more) of the cellular module 221, the WiFi module 223, the BT module 225, the GPS module 227, and the NFC module 228 may be included in one Integrated Chip (IC) or IC package. The RF module 229 may transmit/receive, for example, a communication signal (e.g., a Radio Frequency (RF) signal). The RF module 229 may include, for example, a transceiver, a Power Amp Module (PAM), a frequency filter, a Low Noise Amplifier (LNA), an antenna, or the like. According to another embodiment of the disclosure, at least one of the cellular module 221, the WiFi module 223, the BT module 225, the GPS module 227, and the NFC module 228 may transmit/receive an RF signal via a separate RF module. The subscriber identity module 224 may include, for example, a card including the subscriber identity module and/or an embedded SIM, and may include unique identification information (e.g., an Integrated Circuit Card IDentifier (ICCID)) or subscriber information (e.g., an International Mobile Subscriber Identity (IMSI)).

The memory 230 (e.g., the memory 130) may include, for example, an internal memory 232 or an external memory 234. The internal memory 232 may include, for example, at least one of a volatile memory (e.g., a Dynamic RAM (DRAM), a Static RAM (SRAM), a Synchronous Dynamic RAM (SDRAM), etc.) and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard drive, or a Solid State Drive (SSD)). The external memory 234 may further include a flash drive, for example, Compact Flash (CF), Secure Digital (SD), Micro Secure Digital (Micro-SD), Mini Secure digital (Mini-SD), extreme Digital (xD), memory stick, or the like. The external memory 234 may be operatively and/or physically connected to the electronic apparatus 201 via various interfaces.

The sensor module 240 may measure, for example, physical quantity or detect an operational status of the electronic apparatus 201, and may convert the measured or detected information into an electric signal. The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, and an Ultra Violet (UV) sensor 240M. Additionally or alternatively, the sensor module 240 may include, for example, an E-nose sensor, an ElectroMyoGraphy (EMG) sensor, an ElectroEncephaloGram (EEG) sensor, an ElectroCardioGram (ECG) sensor, an Infrared (IR) sensor, an iris sensor, and/or a fingerprint sensor. The sensor module 240 may further include a control circuit for controlling at least one or more sensors included therein. In a certain embodiment of the disclosure, the electronic apparatus 201 may further include a processor configured to control the sensor module 204 either separately or as one part of the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may recognize a touch input, for example, by using at least one of an electrostatic type, a pressure-sensitive type, and an ultrasonic type. In addition, the touch panel 252 may further include a control circuit. The touch penal 252 may further include a tactile layer and thus may provide the user with a tactile reaction. The (digital) pen sensor 254 may be, for example, one part of a touch panel, or may include an additional sheet for recognition. The key 256 may be, for example, a physical button, an optical key, a keypad, or a touch key. The ultrasonic input device 258 may detect an ultrasonic wave generated from an input means through a microphone (e.g., a microphone 288) to confirm data corresponding to the detected ultrasonic wave.

Figure 4:
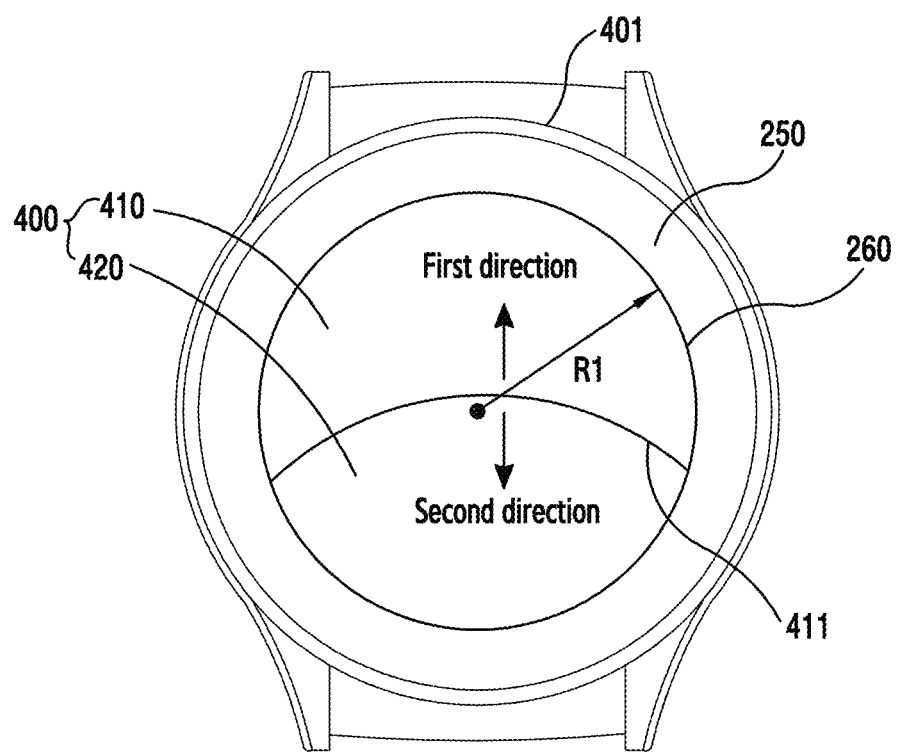
FIG. 4 illustrates an information display screen of an electronic apparatus according to an embodiment of the present disclosure.

According to one embodiment of the disclosure, the input device 250 may further include a rotation device (not shown). The rotation device generates rotation input data in the electronic apparatus 101. In this case, the rotation device may generate the rotation input data in response to a user input of the electronic apparatus 101. Further, the rotation device is joined in a rotatable manner at a periphery of the display 160. In this case, the rotation device may be implemented in various shapes. Herein, the rotation device may be implemented in a ring shape as shown in FIG. 4. For example, the rotation device may be implemented in a circular ring shape. That is, the rotation device may surround the display 160. Further, the rotation device may rotate about a central axis of the display 160 in a clockwise direction or a counter-clockwise direction. Alternatively, although not shown, according to one embodiment of the disclosure, the rotation device may be implemented in a cylindrical shape. For example, the rotation device may be implemented in a crown shape of an analog watch. That is, at least one portion of the rotation device may be inserted inside the electronic apparatus 101, and the remaining portions of the rotation device may protrude outside the electronic apparatus 101. The rotation device may rotate about a vertical axis orthogonal to the central axis of the display 160 in a clockwise direction or a counter-clockwise direction. According to one embodiment of the disclosure, the rotation device may generate squeezing, pressing input data. In this case, the rotation device may generate the squeezing, pressing input data in response to the user input of the electronic apparatus 101.

The display 260 may be exposed through one surface of a housing 401. The display 260 may detect a touch or gesture input. The display 260 (e.g., the display 160) may include a panel 262, a hologram 264, a projector 266, and/or a control circuit for controlling these elements. The panel 262 may be implemented, for example, in a flexible, transparent, or wearable manner. The panel 262 may be constructed as one module with the touch panel 252. The hologram 264 may use an interference of light and show a stereoscopic image in the air. The projector 266 may display an image by projecting a light beam onto a screen. The screen may be located, for example, inside or outside the electronic apparatus 201. The interface 270 may include, for example, a High-Definition Multimedia Interface (HDMI) 272, a Universal Serial Bus (USB) 274, an optical communication interface 276, or a D-subminiature (D-sub) 278. The interface 270 may be included, for example, in the communication interface 170 of FIG. 1. Additionally or alternatively, the interface 270 may include, for example, a Mobile High-definition Link (MHL) interface, a Secure Digital (SD)/Multi-Media Card (MMC) interface, or an Infrared Data Association (IrDA) standard interface. The display 260 may have a circular shape or a polygonal shape.

The audio module 280 may bilaterally convert, for example, a sound and electric signal. At least some constitutional elements of the audio module 280 may be included in, for example, the input/output interface 150 of FIG. 1. The audio module 280 may convert sound information which is input or output, for example, through a speaker 282, a receiver 284, an earphone 286, the microphone 288, or the like. The camera module 291 is, for example, a device for image and video capturing, and according to one embodiment of the disclosure, may include one or more image sensors (e.g., a front sensor or a rear sensor), a lens, an Image Signal Processor (ISP), or a flash (e.g., LED or xenon lamp). The power management module 295 may manage, for example, power of the electronic apparatus 201. According to one embodiment of the disclosure, the power management module 295 may include a Power Management Integrated Circuit (PMIC), a charger Integrated Circuit (IC), or a battery fuel gauge. The PMIC may have a wired and/or wireless charging type. The wireless charging type may include, for example, a magnetic resonance type, a magnetic induction type, an electromagnetic type, or the like, and may further include an additional circuit for wireless charging, for example, a coil loop, a resonant circuit, a rectifier, or the like. The battery gauge may measure, for example, residual quantity of the battery 296 and voltage, current, and temperature during charging. The battery 296 may include, for example, a rechargeable battery and/or a solar battery.

The indicator 297 may indicate a specific state, for example, a booting state, a message state, a charging state, or the like, of the electronic apparatus 201 or one part thereof (e.g., the processor 210). The motor 298 may convert an electric signal into a mechanical vibration, and may generate a vibration or haptic effect. The electronic apparatus 201 may include a mobile TV supporting device (e.g., a GPU) capable of handling media data according to a protocol of, for example, Digital Multimedia Broadcasting (DMB), Digital Video Broadcasting (DVB), media flow, or the like. Each of the constitutional elements described in the present disclosure may consist of one or more components, and names thereof may vary depending on a type of the electronic apparatus. According to various embodiments of the present disclosure, some of the constitutional elements of the electronic apparatus (e.g., the electronic apparatus 201) may be omitted, or additional other constitutional elements may be further included. Further, some of the constitutional elements of the electronic apparatus may be combined and constructed as one entity while performing the same functions of corresponding constitutional elements as before they are combined.

Figure 3:
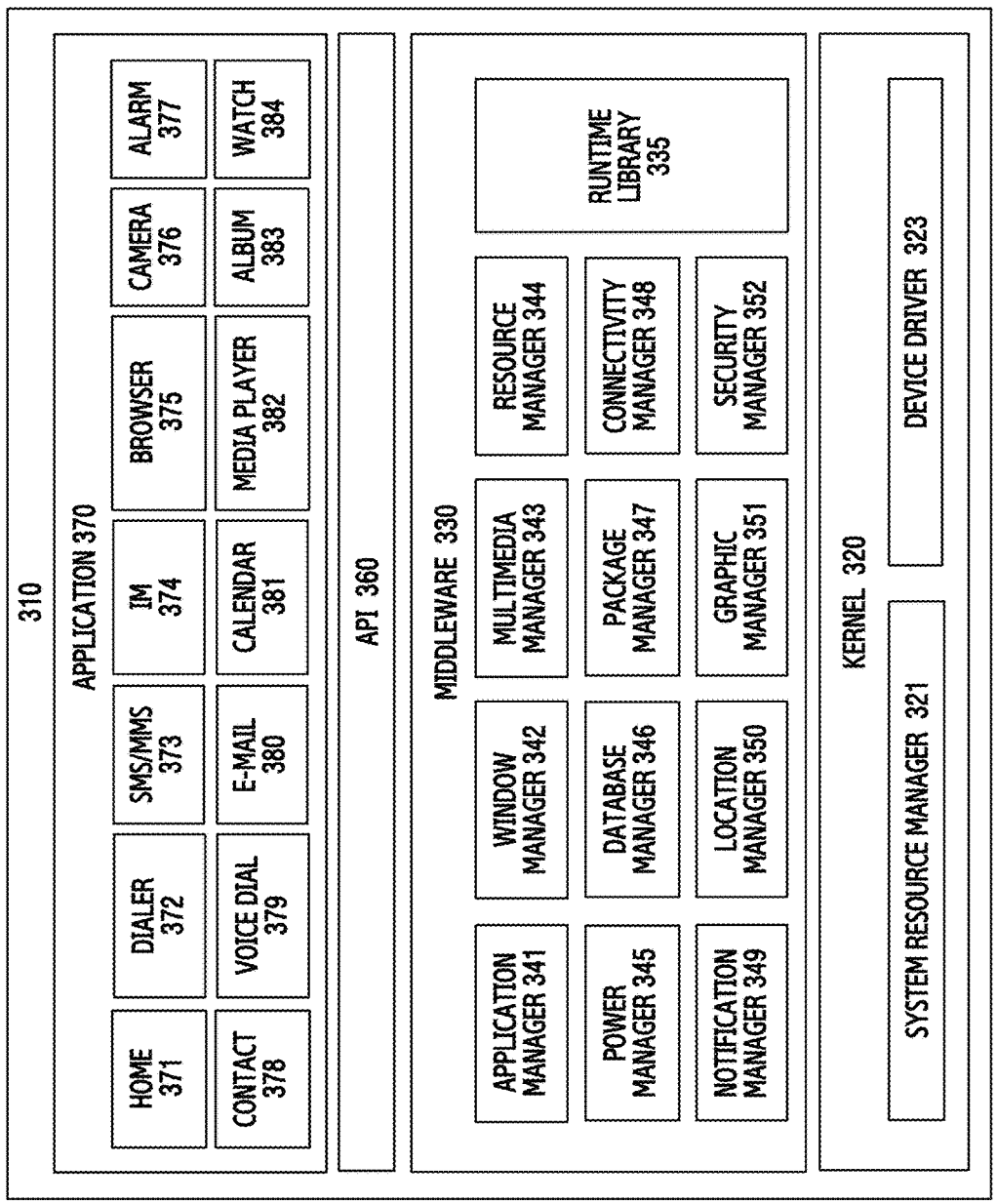
FIG. 3 is a block diagram of a program module according to various embodiments of the present disclosure.

FIG. 3 is a block diagram of a program module according to various embodiments of the disclosure. According to one embodiment of the disclosure, a program module 310 (e.g., the program 140) may include an Operating System (OS) for controlling a resource related to an electronic apparatus (e.g., the electronic apparatus 101) or various applications (e.g., the application 147) driven on the OS. The OS may be, for example, Android®, iOS®, Windows®, Symbian®, Tizen®, Bada®, or the like. Referring to FIG. 3, the programming module 310 may include a kernel 320 (e.g., the kernel 141), a middleware 330 (e.g., the middleware 143), an Application Programming Interface (API) 360 (e.g., the API 145), and/or an application 370 (e.g., the application program 147). At least one part of the program module 310 can be preloaded on the electronic apparatus, or can be downloaded from a server (e.g., the electronic apparatus 102 or 104, the server 106, or the like).

The kernel 320 may include, for example, a system resource manager 321 or a device driver 323. The system resource manager 321 may perform control, allocation, retrieval, or the like of the system resource. According to one embodiment of the disclosure, the system resource manager 321 may include a process managing unit, a memory managing unit, a file system managing unit, or the like. The device driver 323 may include, for example, a display driver, a camera driver, a Bluetooth driver, a shared memory driver, a USB driver, a keypad driver, a WiFi driver, an audio driver, or an Inter-Process Communication (IPC) driver. The middleware 330 may provide, for example, a function commonly required by the application 370, or may provide various functions through the API 360 so that the application 370 can effectively use a limited system resource inside the electronic apparatus. According to one embodiment of the disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler to add a new function through a programming language while the application 370 is executed. The runtime library 335 may perform an operation of an input/output management, a memory management, an arithmetic function, or the like. The application manager 341 may manage, for example, a life cycle of the application 370. The window manager 342 may manage a Graphic User Interface (GUI) resource used in a screen. The multimedia manager 343 may recognize a format required to reproduce various media files, and may use a codec suitable for the format to perform encoding or decoding of the media file. The resource manager 344 may manage a source code or memory space of the application 370. The power manager 345 may manage, for example, battery capacity or power, and may provide power information required for the operation of the electronic apparatus. According to one embodiment of the disclosure, the power manager 345 may interwork with a Basic Input/Output System (BIOS). The database manager 346 may generate, search, or change a database to be used, for example, in the application 370. The package manager 347 may manage an installation or update of an application distributed in a form of a package file.

The connectivity manager 348 may manage, for example, a wireless connection. The notification manager 349 may provide the user with an event such as an incoming message, an appointment, a proximity notification, or the like. The location manager 350 may manage, for example, location information of the electronic apparatus. The graphic manager 351 may manage, for example a graphic effect to be provided to the user or a user interface related thereto. The security manager 352 may provide, for example, system security or user authentication. According to one embodiment of the disclosure, the middleware 330 may include a telephony manager for managing a voice or video telephony function of the electronic apparatus, or a middleware module capable of forming a combination of various functions of the aforementioned constitutional elements. According to one embodiment of the disclosure, the middleware 330 may provide a module specified for each type of operating system. The middleware 330 may dynamically delete some of the existing constitutional elements or add new constitutional elements. The API 360 is, for example, a set of API programming functions, and may be provided with other configurations according to an operating system. For example, for the Android® or iOS® operating system, one API set may be provided for each platform, and for the Tizen® operating system, two or more API sets may be provided for each platform.

The application 370 may include an application for providing, for example, a home 371, a dialer 372, a Short Message Service (SMS)/Multimedia Messaging Service (MMS) 373, an Instant Message (IM) 374, a browser 375, a camera 376, an alarm 377, a contact 378, a voice dial 379, an e-mail 380, a calendar 381, a media player 382, an album 383, a watch 384, a health care (e.g., an application for measuring a physical activity level, a blood sugar level, etc.), or environment information (e.g., atmospheric pressure, humidity, or temperature information). According to one embodiment of the disclosure, the application 370 may include an application for supporting information exchange between the electronic apparatus and an external electronic apparatus. The information exchange application may include, for example, a notification relay application for relaying specific information to the external electronic apparatus or a device management application for managing the external electronic apparatus. For example, the notification relay application may relay notification information generated in another application of the electronic apparatus to the external electronic apparatus, or may receive the notification information from the external electronic apparatus to provide the information to the user. The device management application may install, delete, or update, for example, a function (e.g., turning on/turning off the external electronic apparatus itself (or some components thereof) or adjusting of a display illumination (or a resolution)) of an external electronic apparatus which communicates with the electronic apparatus, or an application which operates in the external electronic apparatus. According to one embodiment of the disclosure, the application 370 may include an application specified according to an attribute of the external electronic apparatus (e.g., a health managing application of a mobile medical device). According to one embodiment of the disclosure, the application 370 may include an application received from the external electronic apparatus. At least one part of the program module 310 may be implemented (e.g., executed) in software, firmware, hardware (e.g., the processor 210), or at least two or more of combinations thereof, and may include modules, programs, routines, sets of instructions, processes, or the like for performing one or more functions.

A term "module" used in the present disclosure includes a unit consisting of hardware, software, or firmware, and may be interchangeably used with a term such as a unit, a logic, a logical block, a component, a circuit, and the like. The "module" may be an integrally constructed component or a minimum unit or one part thereof for performing one or more functions. The "module" may be mechanically or electrically implemented, and may include, for example, an Application-Specific Integrated Circuit (ASIC) chip, a Field-Programmable Gate Arrays (FPGAs), or a programmable-logic device, which is known or to be developed to perform certain operations.

At least one part of an apparatus (e.g., modules or functions thereof) or method (e.g., operations) according to various embodiments of the disclosure may be implemented with an instruction stored in a computer-readable storage media (e.g., the memory 130). If the instruction is executed by one or more processors (e.g., the processor 120), the one or more processors may perform a function corresponding to the instruction. The computer-readable storage media may include a hard disk, a floppy disk, magnetic media (e.g., a magnetic tape), optical media (e.g., a Compact Disc-ROM (CD-ROM), a Digital Versatile Disc (DVD), magnetic-optic media (e.g., a floptical disk)), an internal memory, or the like. The instruction may include a code created by a compiler or a code executable by an interpreter.

Figure 5:
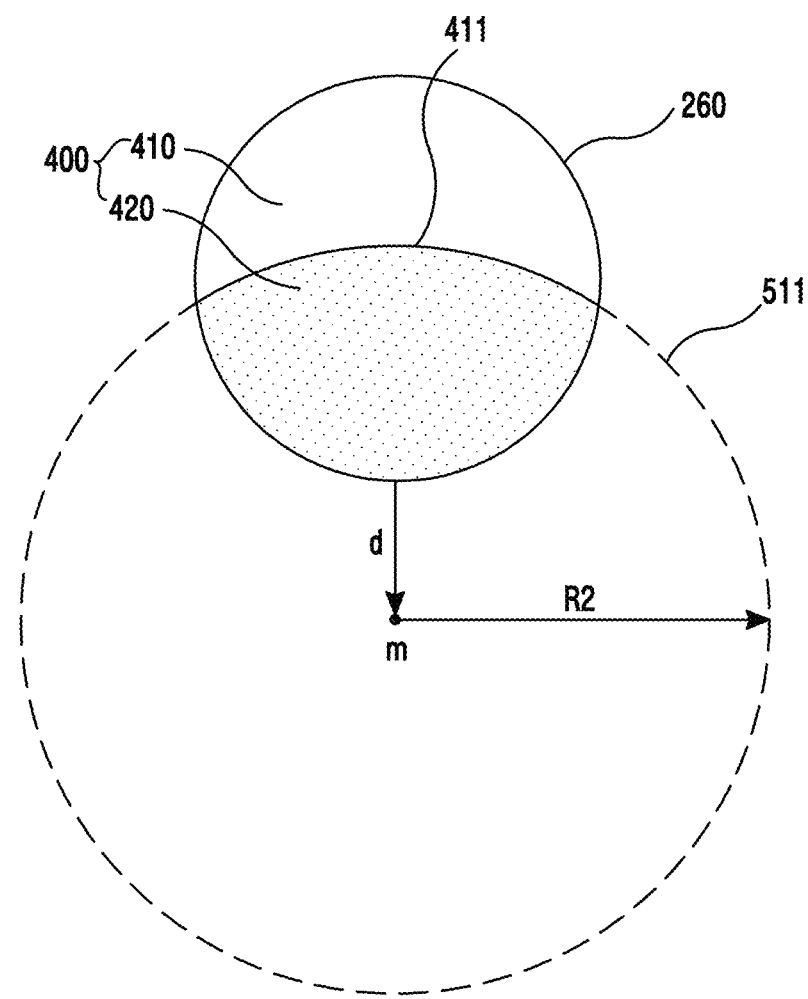
FIG. 5 illustrates an information display screen of an electronic apparatus according to an embodiment of the present disclosure.

FIG. 4 and FIG. 5 illustrate examples of implementing an information display screen of an electronic apparatus according to various embodiments of the disclosure.

As shown in FIG. 4, the processor 120 may display an information display screen 400 through the display 260. For example, the processor 120 may display the information display screen 400 as a background screen, and may also display it as a function execution screen. The information display screen 400 may have a circular shape. The information display screen 400 may have a circular shape with a first radius R1. Further, the information display screen 400 may include a first region 410 and a second region 420.

A first curve 411 may be displayed between the first region 410 and the second region 420. Alternatively, the first curve 411 may not be displayed so that it is not seen visually. For example, the first curve 411 may be a virtual line. The first region 410 and the second region 420 may be distinguished by the first curve 411. Alternatively, when the first curve 411 is not displayed, the first region 410 and the second region 420 may be distinguished by various colors. A first direction which is an outward direction of the first curve 411 and a second direction opposite to the first direction may be defined in the information display screen 400. That is, the second direction is an inward direction of the first curve 411. In this case, the first region 410 is a region extended from the first curve 411 in the first direction. The second region 420 is a region extended from the first curve 411 in the second direction. Meanwhile, the first region 410 and the second region 420 may be displayed in various colors. The color may be determined such that the first region 410 and the second region 420 are contrasted with each other. The first region 410 and the second region 420 may be displayed in different colors. Alternatively, when the information display screen 400 is displayed, the second region 420 may be displayed in a highlighted manner such as being flickered or the like.

First information or a first item may be displayed on at least one part of the first region 410. In this case, the first information or the first item may be information related to at least one application.

Upon generation of an event, the second region 420 may be displayed. Second information or a second item may be displayed on at least one part of the second region 420. In response to an input of selecting the at least one part of the second region 420, at least one part of a screen displayed on the first region 410 or the second region 420 may be changed. Alternatively, at least one part of the first information or the second information may be changed. Alternatively, at least one part of the first item or the second item may be changed. The first information may be information related to the first application, and the second information may be information related to the second application. The first information and the second information may be independent from each other. Alternatively, the first information and the second information may be dependent on each other. The second item may be information related to the first item. The first item and the second item may be information related to the same application. The first item and the second item may be dependent on each other. According to one embodiment of the disclosure, the second region 420 may include a plurality of sub-regions. The second region 420 may include the plurality of sub-regions according to the number of pieces of information to be displayed. Alternatively, the second region 420 may include the plurality of sub-regions according to the number of generated events. In this case, the event indicates generating of an operation in the electronic apparatus 101. Herein, the event may include at least any one of a communication event, an input event, a system event, and a measurement event. Herein, the communication event may be generated by communication with the external devices 102, 104, and 106. The input event may be generated by a user input in the electronic apparatus 101. The system event may be generated based on an alarm or battery state information or the like. The measurement event may be generated in response to a change in a surrounding environment in the electronic apparatus 101. The first region 410 and/or the second region 420 may have a variable size.

Meanwhile, as shown in FIG. 5, the processor 120 may generate a virtual circle 511. The virtual circle 511 may be a circle with a second radius R2 about a virtual center point m. The virtual center point m may be located at a distance separated by a specific distance d from a periphery of the information display screen 400. Alternatively, the virtual center point m may be located inside the information display screen 400. Alternatively, the virtual center point m may be located at a periphery of the information display screen 400. The second radius R2 may have a different size from the first radius R1 of the information display screen 400. Alternatively, the second radius R2 may have the same size as the first radius R1. At least one part of the virtual circle 511 may overlap with the display 260. Therefore, at least one part of the virtual circle 511 may be displayed on the display 260. The virtual circle 511 displayed on the display 260 may correspond to the second region 420. That is, the second region 420 may be a region in which the virtual circle 511 and the display 260 overlap with each other. Meanwhile, the first curve 411 may be a circumference of the virtual circle 511 overlapping with the display 260.

According to various embodiments of the disclosure, the electronic apparatus 101 includes the housing 401, the display 260 exposed through one surface of the housing 401, configured to be capable of detecting a touch or gesture input, and having the first radius R1, the processor 210 electrically connected to the display 260, and the memory 230 electrically connected to the processor 210. The memory 230 stores instructions executed to allow the processor 210 to display the first region 410 and the second region 420, which are distinguished by the first curve having the second radius R2, on the display 260, display first information on at least one part of the first region 410 on the display 260, display second information to at least one part of the second region 420 on the display 260, and change at least one part of the displayed first information in response to an input of selecting the at least one part of the second region 420.

According to various embodiments of the disclosure, the instructions allow the processor 210 to display the first curve 411 on the display 260.

According to various embodiments of the disclosure, the instructions allow the processor 210 to display a curved band or belt containing a periphery formed by the first curve 411 on the display 260.

According to various embodiments of the disclosure, the first region 410 is a region extended from the first curve 411 in the first direction which is an outward direction of the first curve 411, and the second region 420 is a region extended from the first curve 411 in the second direction which is an inward direction of the first curve 411.

According to various embodiments of the disclosure, the second region 420 of the display 260 includes a first sub-region 1011 extended between a first curve 1111 and a second curve 1113 separated from the first curve 1111 in the second direction and having a third radius R3 smaller than the second radius R2, and a second sub-region 1013 extended from the second curve 1113 in the second direction. The instructions allow the processor 210 to display the second information on at least one part of the first sub-region 1011 on the display 260, and display third information on at least one part of the second sub-region 1013 on the display 260.

According to various embodiments of the disclosure, the instructions allow the processor 210 to acquire a priority of the second information and the third information from the memory 230 or an external device, and display the second information on the first sub-region 1011 and display the third information on the second sub-region 1013 on the basis of the acquired priority.

According to various embodiments of the disclosure, the instructions allow the processor 210 to determine a width of the first sub-region 1011 and/or the second sub-region 1013 on the basis of the acquired priority.

According to various embodiments of the disclosure, the instructions allow the processor 210 to determine a width of the first sub-region 1011 and/or the second sub-region 1013 on the basis of an amount of the second information and/or the third information.

According to various embodiments of the disclosure, the instructions allow the processor 210 to determine a width of the first region 410, the first sub-region 1011, and/or the second sub-region 1013 on the basis of a user input of dragging a periphery between two regions among the first region 410, the first sub-region 1011, or the second sub-region 1013.

According to various embodiments of the disclosure, the first radius R1 is smaller than the second radius R2.

According to various embodiments of the disclosure, the first information is information related to at least one application, and the second information is information related to the first information.

According to various embodiments of the disclosure, the first information is information related to a first application, and the second information is information related to a second application.

According to various embodiments of the disclosure, the electronic apparatus 101 includes the housing 401, the actually circular-shaped display 260 exposed through one surface of the housing 401 and having the first radius R1, the user input device 250, the processor 210 electrically connected to the display 260 and the user input device 250, and the memory 230 electrically connected to the processor 210. The memory 230 stores instructions executed to allow the processor 210 to display the first region 410 and the second region 420, which are distinguished by the first curve 411 having the second radius R2, on the display 260, display a first item in at least one part of the first region 410 on the display 260, display a second item in at least one part of the second region 420 on the display 260, and change at least one part of a screen displayed on the second region 420 in response to an input of selecting the second item.

According to various embodiments of the disclosure, the instructions allow the processor 210 to further display, on the display 260, a third region 1015 having the third radius R3 smaller than the second radius R2, and distinguished from the second region 420 by the second curve 1113 arranged concentrically with the first curve 1111, and disposed to an opposite side of the first region 410 with respect to the second region 420.

According to various embodiments of the disclosure, the instructions allow the processor 210 to display, on the display 260, instead of the second curve 1113, the third curve 1115 having a fourth radius R4 smaller than the third radius R3 and arranged concentrically with the first curve 1111, in response to a user input of selecting the second item.

Figure 6:
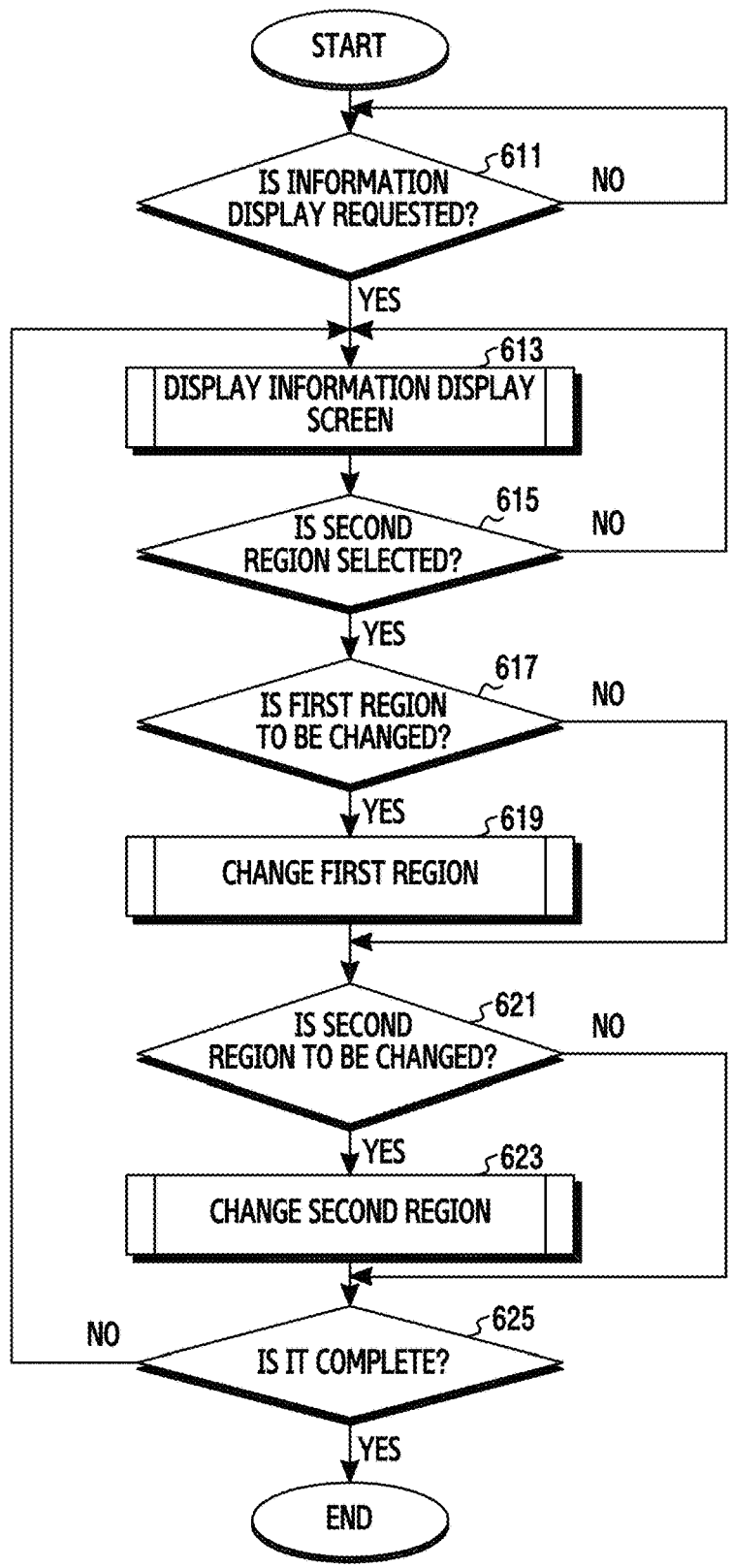
FIG. 6 is a flowchart illustrating a method performed by an electronic apparatus according to various embodiments of the present disclosure.

FIG. 6 is a flowchart illustrating a method performed by an electronic apparatus according to various embodiments of the present disclosure.

As shown in FIG. 6, in a method performed by the electronic apparatus 101 according to an embodiment of the present disclosure, in operation 611, the processor 120 may detect an information display request. When an event is generated due to communication with the external device 102, 104, or 106 or when a user input is generated in the electronic apparatus 101, the processor 120 may detect the information display request upon generation of at least one of a system event, a measurement event, and the like. For example, a user input may be generated by a rotation device which is one of the input device 250. Alternatively, the user input may be generated by physically selecting a button. Alternatively, the user input may be generated by a touch input on the information display screen 400.

In operation 613, the processor 120 may display the information display screen 400. The processor 120 may control the information display screen 400 in response to a rotation input of the rotation device. The processor 120 may control the information display screen 400 in response to a selection of the button. The processor 120 may control the information display screen 400 in response to a selection of a physical key such as a rotary, a crown, or the like. The processor 120 may control the information display screen 400 in response to a voice or a gesture. The processor 120 may control the information display screen 400 in response to a touch input on the information display screen 400.

According to an embodiment of the present disclosure, the processor 120 may detect a location or inclined angle of the display 260 through the acceleration sensor 240E. Therefore, the processor 120 may determine and display a location or direction of the information display screen 400 according to the location or inclined angle of the display 260.

Figure 7:
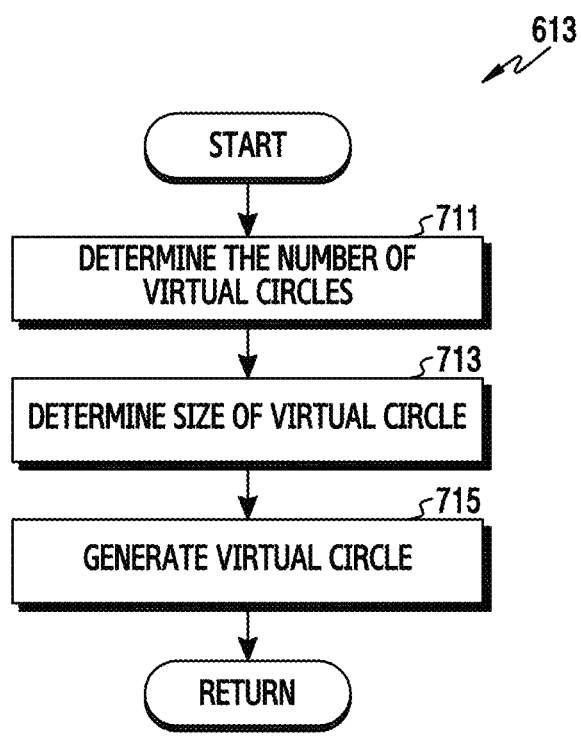
FIG. 7 is a flowchart illustrating an operation of displaying an information display screen as performed by an electronic apparatus as part of the method of FIG. 6, according to various embodiments of the present disclosure.

FIG. 7 is a flowchart illustrating an operation of displaying an information display screen as performed by an electronic apparatus as part of the method of FIG. 6. accordingly to various embodiments of the disclosure. FIG. 8 to FIG. 13 illustrate an information display screen of an electronic apparatus according to various embodiments of the present disclosure.

In operation 711, the processor 120 may determine the number of virtual circles 1020. The processor 120 may determine the number of virtual circles 1020 according to the number of pieces of information to be displayed. Alternatively, the processor 120 may determine the number of virtual circles 1020 according to the number of events to be generated. The number of sub-regions included in the second region 420 may be determined according to the number of virtual circles 1020. That is, the number of sub-regions displayed on the information display screen 400 may be determined according to the number of virtual circles 1020. For example, if there is one virtual circle 1020, the second region 420 including one sub-region may be displayed. If there are a plurality of virtual circles 1020, the second region 420 including a plurality of sub-regions may be displayed. For example, if there are two virtual circles 1020, the second region 420 including two sub-regions may be displayed.

Figure 8:
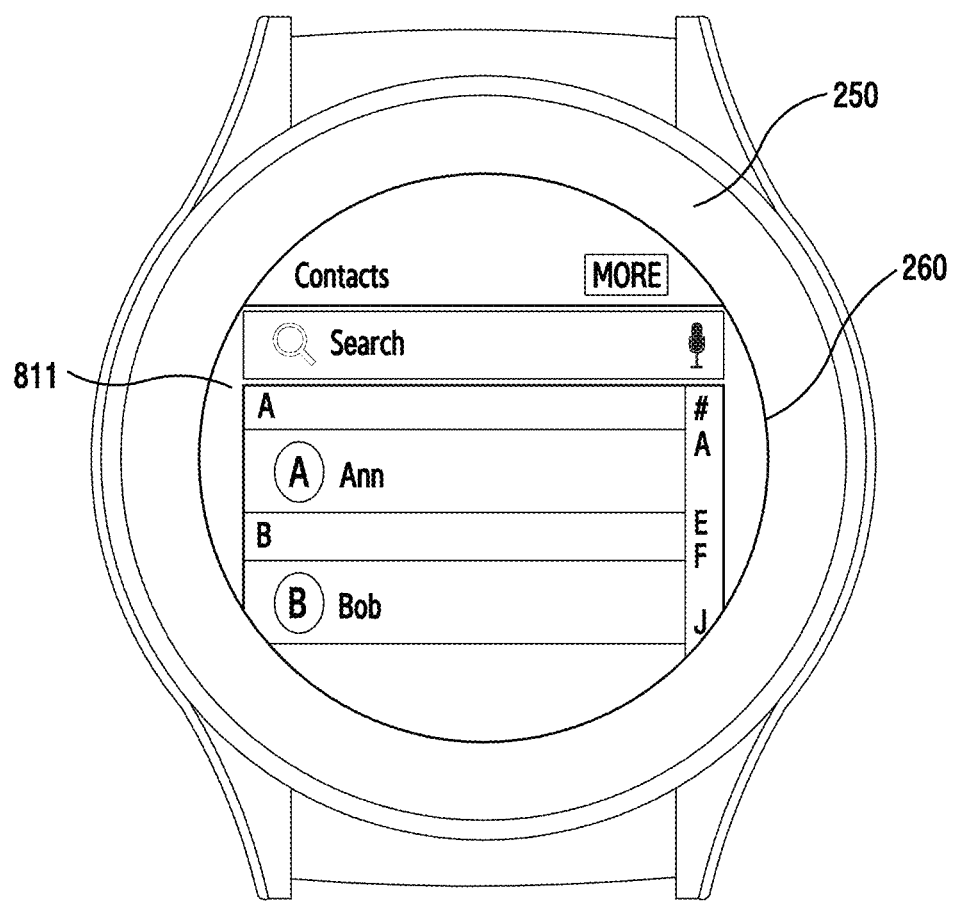
FIG. 8 to FIG. 13 illustrate an information display screen of an electronic apparatus according to various embodiments of the present disclosure.
Figure 9:
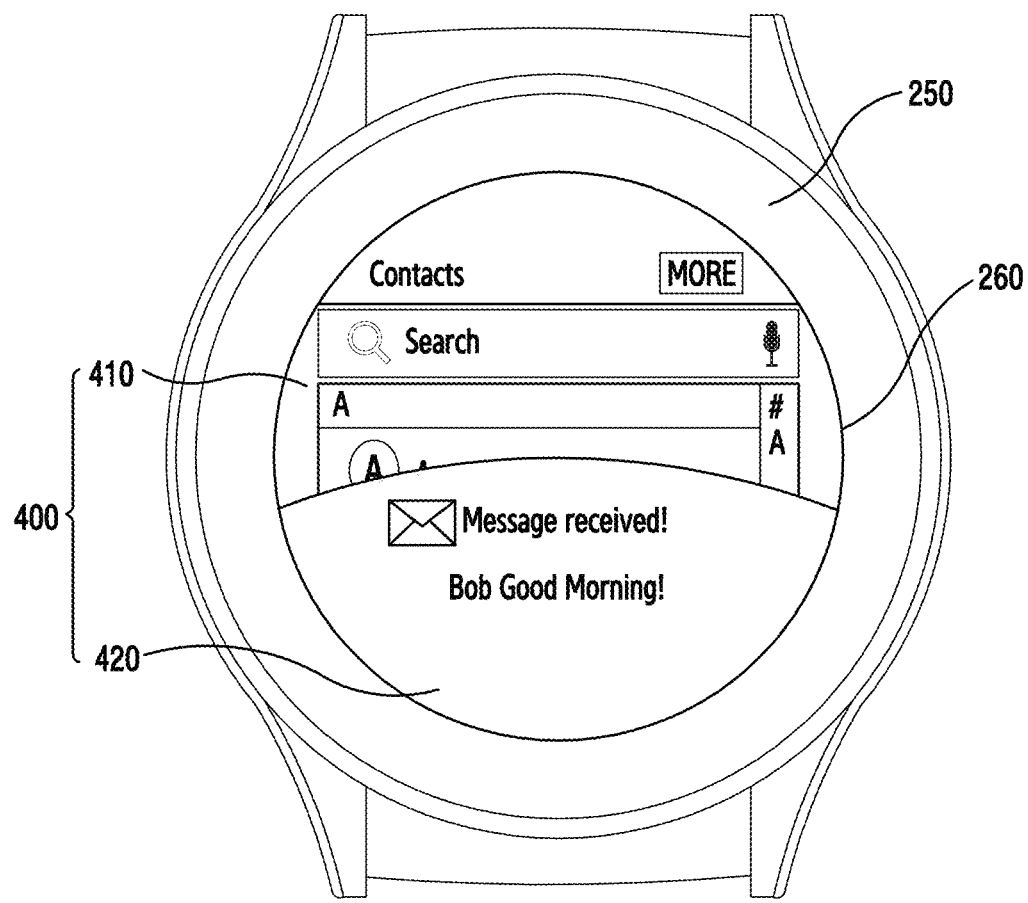

For example, a contact list screen 811 is displayed as shown in FIG. 8, and upon receiving a message in response to communication with respect to an external device, the information display screen 400 may be displayed as shown in FIG. 9. The information display screen 400 may be displayed in response to an input of a rotation device (e.g., a rotary or a crown or the like) which may be an input device 250. Alternatively, the information display screen 400 may be displayed in response to a user input based on a selection of a button (e.g., a key 256 which is one of a Hardware (HW)

key or a Software (SW) key). Alternatively, the information display screen 400 may be displayed in response to a user voice input.

Referring to FIG. 8, if there is one piece of information to be displayed, the number of the virtual circles 1020 may be determined to one. Accordingly, the second region 420 including one sub-region may be displayed. In this example, a contact list 811 may be displayed on the first region 410 of the information display screen 400, and a message reception notification may be displayed on the second region 420. That is, one part of a previous displayed screen may be displayed on the first region 410 of the information display screen 400, and information based on a generation of an information display request may be displayed on the second region 420. According to one embodiment of the disclosure, upon generation of an event, the event generation may be displayed on a lower end of the display 260 by using color or flicking or the like, or may be reported by using a sound, a vibration, or the like. When a user selection is input, as shown in FIG. 9, the second region 420 may be enlarged and displayed. In addition, a size of the second region 420 may be dynamically determined according to a type or content of the event. Thus, although it is illustrated in the drawing that a screen previously displayed on the first region 410 is partially displayed since the second region 420 is displayed, the disclosure is not limited thereto. Thus, in various embodiments of the disclosure, the screen previously displayed on the first region 410 may be shrunk and displayed.

Figure 10:
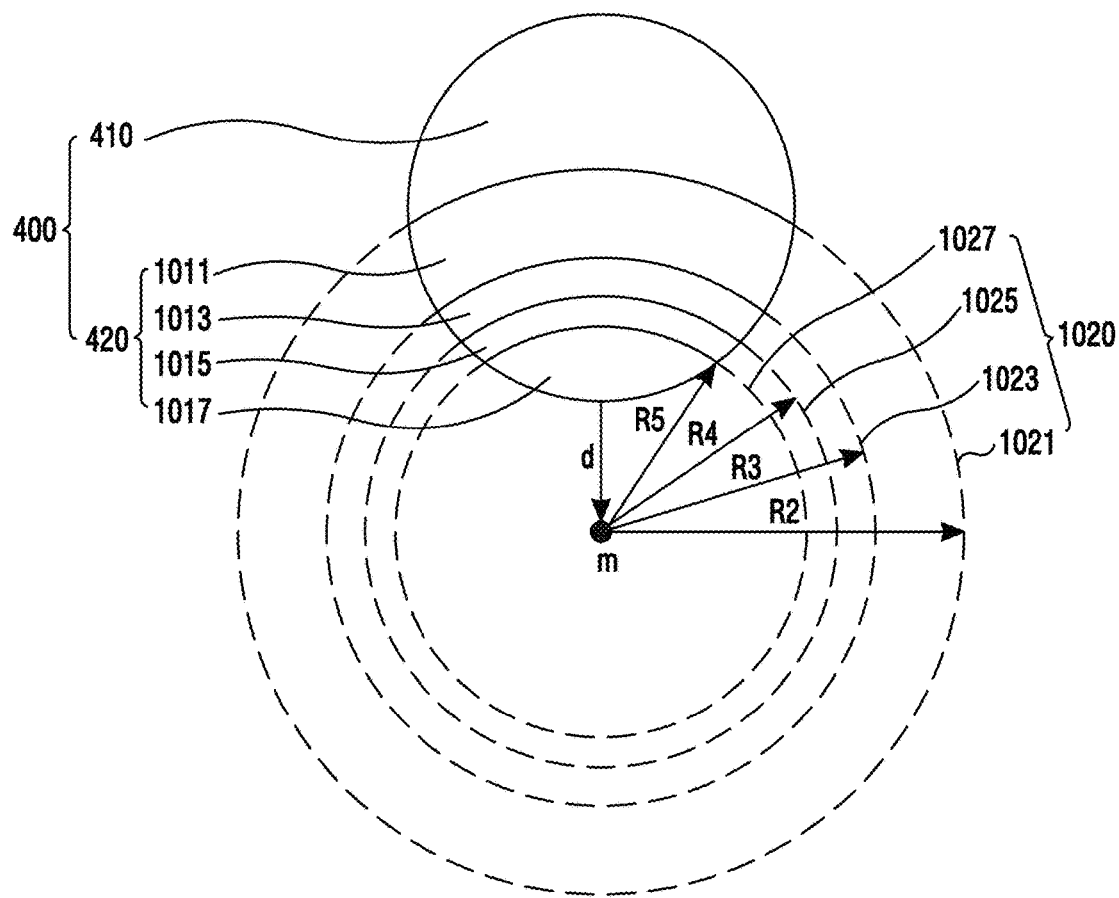
Figure 11:
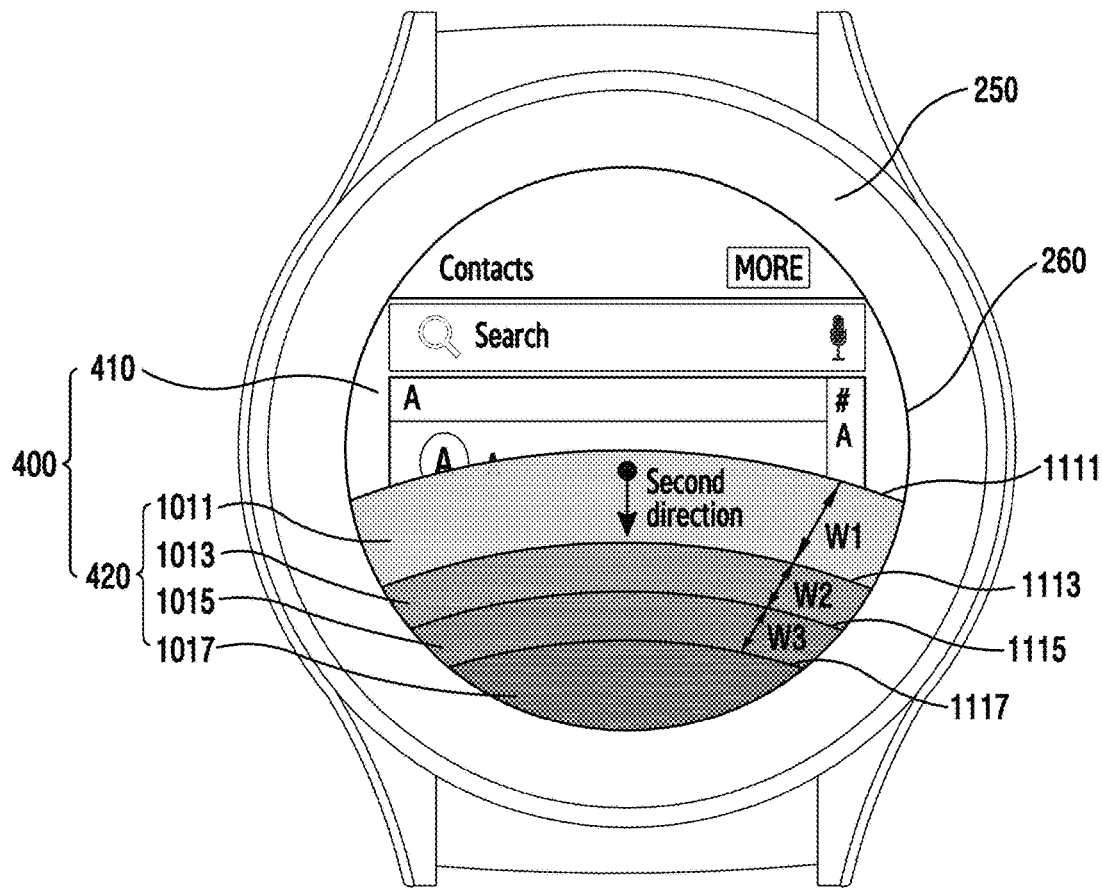

As shown in FIG. 10 and FIG. 11, if there are a plurality of pieces of information to be displayed, the plurality of the virtual circles 1020 may be determined. That is, when there are a plurality of pieces of information to be displayed, a plurality of sub-regions included in the second region 420 may be determined.

For example, if the number of pieces of information to be displayed is four, the processor 120 may determine the number of virtual circles 1020 to four (e.g., 1021, 1023, 1025, and 1027). The virtual circle 1020 may include a first virtual circle 1021, a second virtual circle 1023, a third virtual circle 1025, and a fourth virtual circle 1027.

In operation 713, the processor 120 may determine a size of the virtual circle 1020.

The first virtual circle 1021, the second virtual circle 1023, the third virtual circle 1025, and the fourth virtual circle 1027 may have different radiuses with respect to the virtual center point m.

The first virtual circle 1021 may be a circle having a second radius R2 about the virtual center point m. The second virtual circle 1023 may be a circle having a third radius R3 about the virtual center point m. The third radius R3 may have a size different from the second radius R2. The third radius R3 may be smaller than the second radius R2. The third virtual circle 1025 may be a circle having a fourth radius R4 about the virtual center point m. The fourth radius R4 may have a size different from the second radius R2 and the third radius R3. The fourth radius R4 may be smaller than the second radius R2 and the third radius R3. The fourth virtual circle 1027 may be a circle having a firth radius R5 about the virtual center point m. The fifth radius R5 may have a size different from the second radius R2, the third radius R3, and the fourth radius R4. The fifth radius R5 may be smaller than the second radius R2, the third radius R3, and the fourth radius R4.

The first sub-region 1011, the second sub-region 1013, the third sub-region 1015, and the fourth sub-region 1017 may be defined by the first virtual circle 1021, the second virtual circle 1023, the third virtual circle 1025, and the fourth virtual circle 1027. The first sub-region 1011 may correspond to one part of the first virtual circle 1021. The second sub-region 1013 may correspond to one part of the second virtual circle 1023. The third sub-region 1015 may correspond to one part of the third virtual circle 1025. The fourth sub-region 1017 may correspond to one part of the fourth virtual circle 1027.

Sizes of the first sub-region 1011, the second sub-region 1013, the third sub-region 1015, and the fourth sub-region 1017 may be determined according to sizes of the virtual circles 1021, 1023, 1025, and 1027. That is, the sizes of the first sub-region 1011, the second sub-region 1013, the third sub-region 1015, and the fourth sub-region 1017 may be determined by determining sizes of the second radius R2, the third radius R3, the fourth radius R4, and the fifth radius R5 of the virtual circles 1021, 1023, 1025, and 1027.

According to an embodiment of the disclosure, each of the first sub-region 1011, the second sub-region 1013, and the third sub-region 1015 may have a constant width. The first sub-region 1011 may have a first width W1 which is a distance between the first virtual circle 1021 and the second virtual circle 1023. The second sub-region 1013 may have a second width W2 which is a distance between the second virtual circle 1023 and the third virtual circle 1025. The third sub-region 1015 may have a third width W3 which is a distance between the third virtual circle 1025 and the fourth virtual circle 1027. The first width W1, the second width W2, and the third width W3 may have the same size. According to one embodiment of the disclosure, the first width W1, the second width W2, and the third width W3 may have different sizes. For example, sizes of the first width W1, the second width W2, and the third width W3 may vary depending on information displayed on the first sub-region 1011, the second sub-region 1013, and the third sub-region 1015. Meanwhile, the fourth sub-region 1017 may have a non-constant width. As one part of the fourth virtual circle 1027, the fourth sub-region 1017 may vary depending to the fifth radius R5 of the fourth virtual circle 1027. For example, widths of the sub-regions 1011, 1013, 1015, and 1017 may vary depending on a data amount of information to be displayed on each of the sub-regions 1011, 1013, 1014, and 1017, whether the information is new information, whether a user's input is generated, an importance of the information, a priority of the information, or the like.

According to one embodiment of the disclosure, the sizes of the virtual circles 1021, 1023, 1025, and 1027 and the sizes of the sub-regions 1011, 1013, 1015, and 1017 may be determined according to an amount of information to be displayed on the sub-regions 1011, 1013, 1015, and 1017. If the amount of information to be displayed on the sub-regions 1011, 1013, 1015, and 1017 is great, the size of the virtual circles 1021, 1023, 1025, and 1027 may be adjusted so that the size of the sub-region is determined to be greater than a size of another sub-region.

Figure 12:
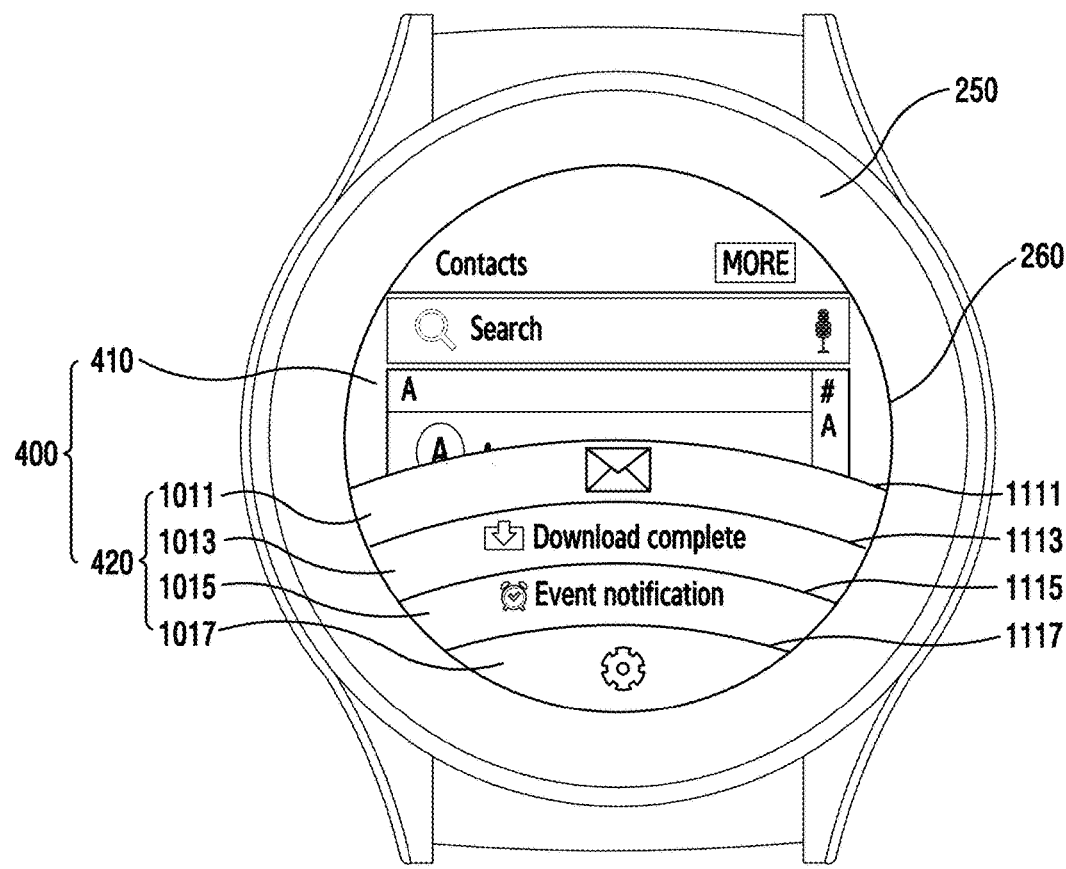

In another embodiment of the present disclosure, if the information to be displayed on the sub-regions 1011, 1013, 1014, and 1017 is new update information, the sizes of the virtual circles 1021, 1023, 1025, and 1027 may be adjusted so that the size of the sub-region is determined to be greater than a size of another sub-region. For another example, the sizes of the virtual circles 1021, 1023, 1025, and 1027 and the sizes of the sub-regions 1011, 1013, 1015, and 1017 may be determined according to whether the user's input is generated in the sub-regions 1011, 1013, 1015, and 1017. When the user's input is generated in the sub-regions 1011, 1013, 1015, and 1017, the size of the sub-region may be determined to be greater than a size of another sub-region. For another example, the sizes of the virtual circles 1021, 1023, 1025, and 1027 and the sizes of the sub-regions 1011, 1013, 1015, and 1017 may be determined according to a priority or importance of the information displayed on the sub-regions 1011, 1013, 1015, and 1017. The sizes of the sub-regions 1011, 1013, 1015, and 1017 may be determined to be great in proportion to the priority or importance of the information displayed on the sub-regions 1011, 1013, 1015, and 1017. Meanwhile, the priority or importance of the information may vary depending on a configuration. First sub information may be displayed on the first sub-region 1011. Second sub information may be displayed on the second sub-region 1013. Third sub information may be displayed on the third sub-region 1015. Fourth sub information may be displayed on the fourth sub-region 1017. The first sub information, the second sub information, the third sub information, and the fourth sub information may be information related to the first information displayed on the first region 410. Alternatively, the first sub information, the second sub information, the third sub information, and the fourth sub information may be information not related to the first information displayed on the first region 410. The first sub information, the second sub information, the third sub information, and the fourth sub information may be information different from one another. The first information may be information related to a first application. The first sub information, the second sub information, the third sub information, and the fourth sub information may be information related to an application different from the first application. For example, as shown in FIG. 12, in a state where contact information is displayed on the first region 410 of the information display screen 400, the first sub information indicating message reception may be displayed on the first sub-region 1011 of the second region 420, the second sub information indicating an update of new information such as download completion may be displayed on the second sub-region 1013, the third sub information indicating an event generation may be displayed on the third sub-region 1015, and the fourth sub information such as a function setup icon capable of setting various functions may be displayed on the fourth sub-region 1017.

According to various embodiments of the present disclosure, a plurality of applications currently being executed may be displayed through the second region 420, and information between the applications may be easily shared. For example, multi-tacking may be supported through a plurality of sub-regions, and information sharing may be supported between an application displayed on the first region 410 and an application displayed on the second region 420 or between applications displayed on the second region 420. For another example, this may be easily confirmed by displaying a menu having an index or a multi-depth on the second region 420.

In operation 715, the processor 120 may generate the virtual circles 1021, 1023, 1025, and 1027. The generation of the virtual circles 1021, 1023, 1025, and 1027 may allow the displaying of the information display screen 400 including the second region 420. That is, the virtual circles 1021, 1023, 1025, and 1027 are generated, and a portion in which the virtual circles 1021, 1023, 1025, and 1027 overlap with the display 260 may be displayed as the sub-regions 1011, 1013, 1015, and 1017.

For example, the generation of the virtual circles 1021, 1023, 1025, and 1027 of FIG. 10 may allow the displaying of the first curve 1111, the second curve 1113, the third curve 1115, and the fourth curve 1117 on the information display screen 400 as shown in FIG. 11. The second curve 1113 may be arranged by being separated from the first curve 1111 in the second direction. The third curve 1115 may be arranged by being separated from the second curve 1113 in the second direction. The fourth curve 1117 may be arranged by being separated from the third curve 1115 in the second direction. The first curve 1111, the second curve 1113, the third curve 1115, and the fourth curve 1117 may be arranged concentrically.

Referring to FIG. 11, the second region 420 of the display 400 according to one embodiment of the present disclosure, may include the plurality of sub-regions 1011, 1013, 1015, and 1017. For example, the second region 420 may include the first sub-region 1011, the second sub-region 1013, the third sub-region 1015, and the fourth sub-region 1017. The first sub-region 1011 and the second sub-region 1013 may be distinguished by the second curve 1113. The first sub-region 1011 is a region facing in an outward direction of the second curve 1113. The second sub-region 1013 is a region facing in an inward direction of the second curve 1113. Meanwhile, the second sub-region 1013 and the third sub-region 1015 may be distinguished by the third curve 1115. The second sub-region 1013 is a region facing in an outward direction of the third curve 1115. The third sub-region 1015 is a region facing in an inward direction of the third curve 1115. Meanwhile, the third sub-region 1015 and the fourth sub-region 1017 may be distinguished by the fourth curve 1117. The third sub-region 1015 is a region facing in an outward direction of the fourth curve 1117. The fourth sub-region 1017 is a region facing in an inward direction of the fourth curve 1117.

The first sub-region 1011 is a region between the first curve 1111 and the second curve 1113. That is, the first sub-region 1011 may have a shape of a curved band or belt containing a periphery formed by the first curve 1111 and the second curve 1113. The second sub-region 1013 is a region between the second curve 1113 and the third curve 1115. That is, the second sub-region 1013 may have a shape of a curved band or belt containing a periphery formed by the second curve 1113 and the third curve 1115. The third sub-region 1015 is a region between the third curve 1115 and the fourth curve 1117. That is, the third sub-region 1015 may have a shape of a curved band or belt containing a periphery formed by the third curve 1115 and the fourth curve 1117. The fourth sub-region 1017 is a region extended from the fourth curve 1117 in the second direction.

The first sub-region 1011 may display first sub information. The second sub-region 1013 may display second sub information. The third sub-region 1015 may display third sub information. The fourth sub-region 1017 may display fourth sub information.

The first curve 1111, the second curve 1113, the third curve 1115, and the fourth curve 1117 may have different colors. Alternatively, the first curve 1111, the second curve 1113, the third curve 1115, and the fourth curve 1117 may have the same color. The first curve 1111, the second curve 1113, the third curve 1115, and the fourth curve 1117 may have different thicknesses. Alternatively, the first curve 1111, the second curve 1113, the third curve 1115, and the fourth curve 1117 may have the same thickness.

The first sub-region 1011, the second sub-region 1013, the third sub-region 1015, and the fourth sub-region 1017 may have different colors. Alternatively, the first sub-region 1011, the second sub-region 1013, the third sub-region 1015, and the fourth sub-region 1017 may have the same color.

According to one embodiment of the present disclosure, and as illustrated in FIG. 11, the first curve 1111, the second curve 1113, the third curve 1115, the fourth curve 1117, the first sub-region 1011, the second sub-region 1013, the third sub-region 1015, and the fourth sub-region 1017 are all displayed on the information display screen 400; however, not all of the regions and curves may be displayed on the information display screen in other embodiments of the disclosure. For example, at least any one of the first curve 1111, the second curve 1113, the third curve 1115, and the fourth curve 1117 may be displayed on the information display screen 400. In addition, at least any one of the first sub-region 1011, the second sub-region 1013, the third sub-region 1015, and the fourth sub-region 1017 may be displayed on the information display screen 400. The sub-regions in the information display screen 400 may vary depending on the number of pieces of information to be displayed.

Figure 13:
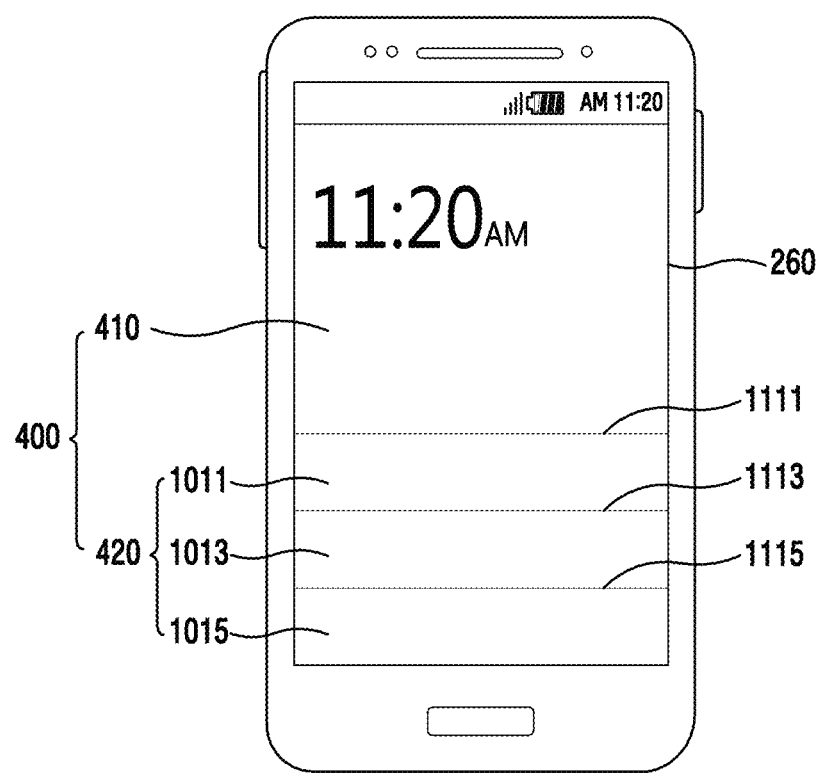

According to one embodiment of the present disclosure, as shown in FIG. 13, the information display screen 400 may have a square shape. In this embodiment, the information display screen 400 may include the first region 410, the second region 420, and the first curve 1111, and the first curve 1111 may have an infinite radius of curvature. That is, the first curve 1111 may be close to a linear line.

According to an embodiment of the present disclosure, although not shown in the figures, the second region 420 may correspond to one part of a virtual polygon. The second region 420 may be a region in which the virtual polygon and the display 260 overlap with each other. The virtual polygon may be plural in number. Therefore, the second region 420 may include the plurality of sub-regions 1011, 1013, and 1015.

Referring to FIG. 6, in operation 615, the processor 120 may detect a selection of the second region 420. The selection of the second region 420 may be a selection based on a user input. For example, the user input may be generated by a rotation device 250 to select the second region 420. Alternatively, the user input may be generated by a selection of a physical button to select the second region 420. Alternatively, the user input 250 may be generated by a touch of the second region 420 to select the second region 420. The selection of the second region 420 may result in a change in at least one part of the first region 410 and/or the second region 420.

In operation 617, the processor 120 may determine whether to change the first region 410. The processor 120 may determine whether the second region 420 is selected to change the first region 410. Whether to change the first region 410 may be determined on the basis of a gesture direction when the second region 420 is selected. For example, when the second region 420 is selected, if the input gesture direction is the first direction, the processor 120 may determine to change the first region 410. When the second region 420 is selected, if the input gesture direction faces the first region 410, the processor 120 may determine to change the first region 410. If it is determined to change the first region 410, in operation 619, the processor 120 may change the first region 410.

Figure 14:
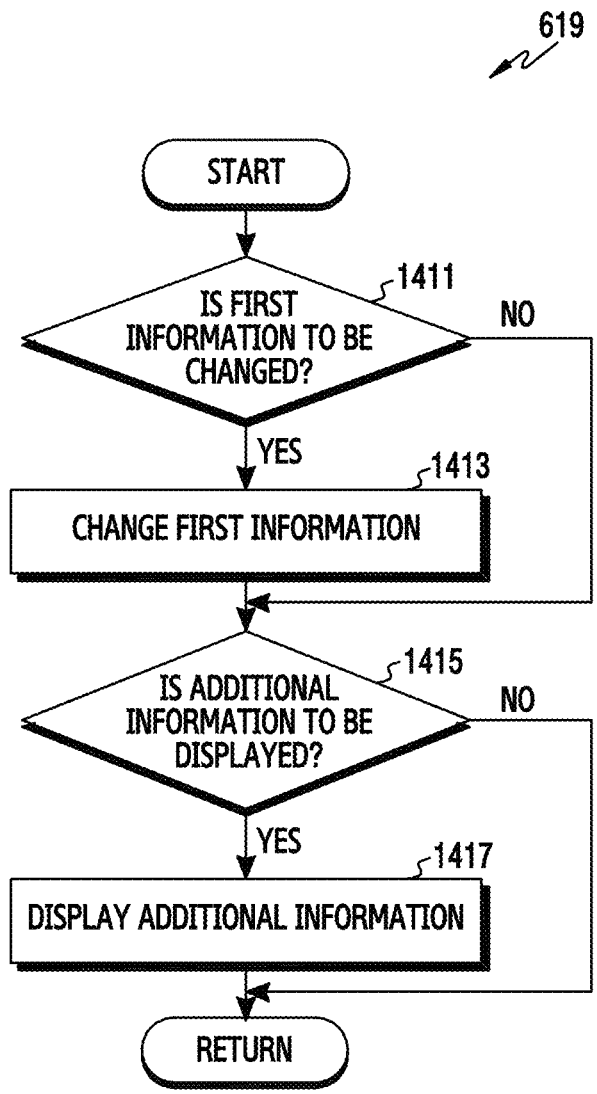
FIG. 14 is a flowchart illustrating an operation of changing a first region as performed by an electronic apparatus as part of the method of FIG. 6, according to various embodiments of the present disclosure.

FIG. 14 is a flowchart illustrating an operation of changing a first region as performed by an electronic apparatus as part of the method of FIG. 6. Regarding FIG. 15 to FIG. 19, each of these figures illustrates an information display screen of an electronic apparatus according to various embodiments of the present disclosure, in which the electronic apparatus performs an operation of changing a first region, the operation as shown in FIG. 14.

Figure 15:
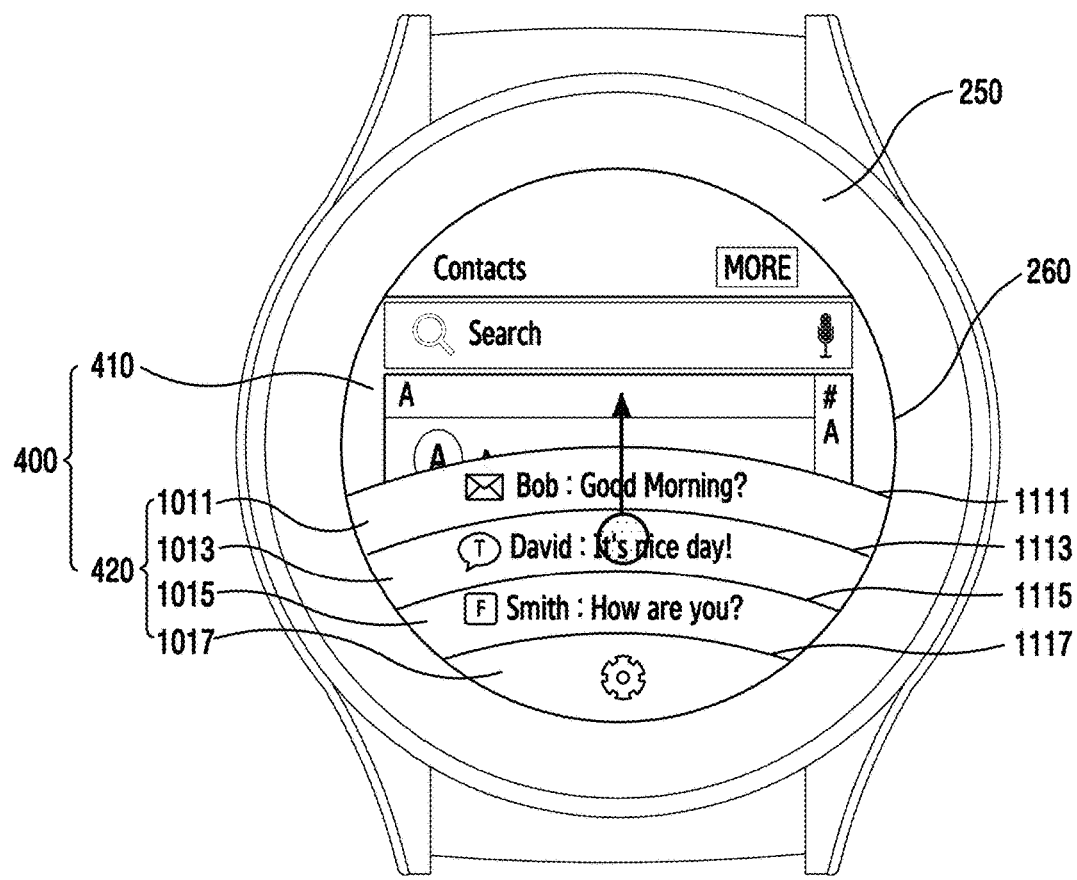
FIG. 15 to FIG. 19 illustrate an information display screen of an electronic apparatus according to various embodiments of the present disclosure.
Figure 16:
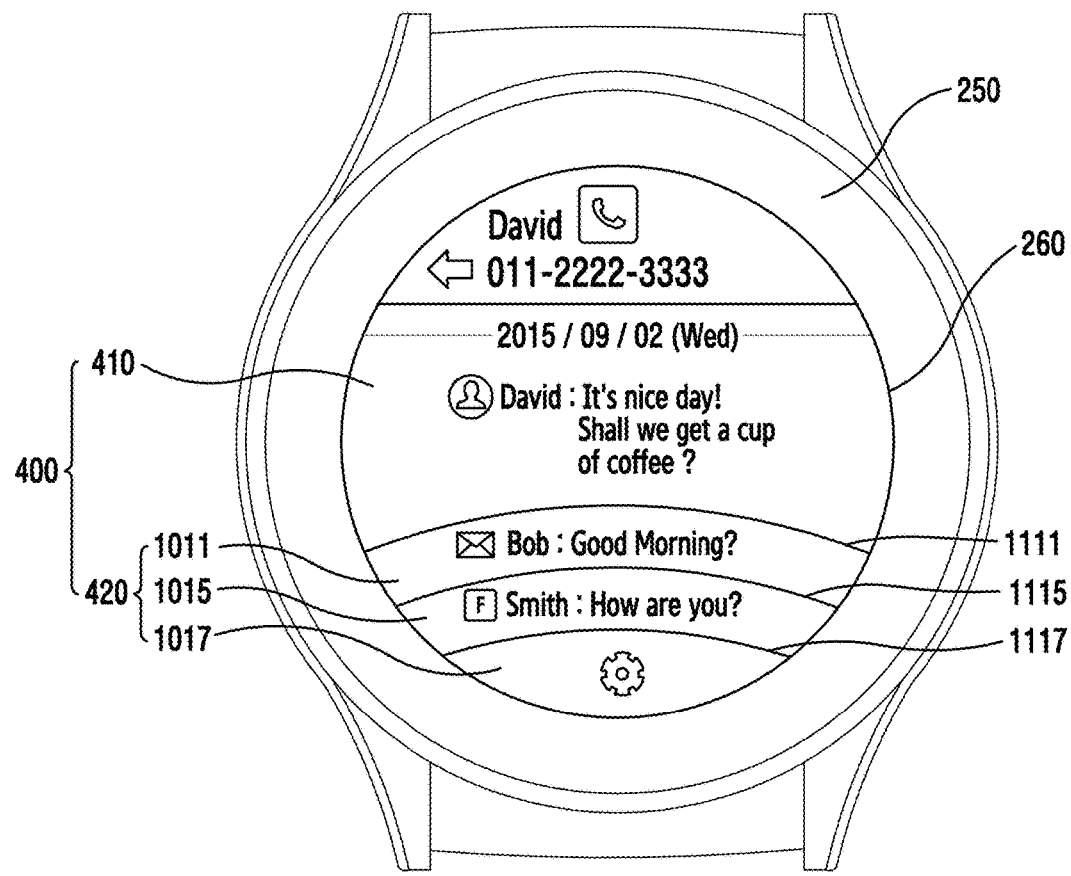

As shown in FIG. 14, in operation 1411, the processor 120 may determine whether to change first information. The processor 120 may determine to change the first information when a specific gesture is input. If it is determined to change the first information, in operation 1413, the processor 120 may change the first information displayed on the first region 410. For example, as shown in FIG. 15, a gesture may be input on the second sub-region 1013 in a situation where the information display screen 400 includes the first region 410 and the second region 420 and where the second region 420 includes the first sub-region 1011, the second sub-region 1013, the third sub-region 1015, and the fourth sub-region 1017. When the gesture to be input on the second sub-region 1013 faces in the first direction, first information to be displayed on the first region 410 may be changed. For example, as shown in FIG. 16, information previously displayed on the second sub-region 1013 may be displayed on the first region 410. For another example, an application displayed on the second sub-region 1013 may be executed in the first region 410. According to one embodiment of the disclosure, when the second sub-region 1013 included in the second region 420 moves to the first region 410, the second virtual circle 1023 is removed, thereby removing the second sub-region 1013 from the second region 420. According to one embodiment of the disclosure, an application previously displayed on the first region 410 may be displayed on a sub-region included in the second region 420.

Meanwhile, if it is determined in operation 1411 that the first information is not necessarily to be changed, the processor 120 may determine whether to display additional information in operation 1415. According to one embodiment of the disclosure, the processor 120 may determine to display the additional information when a specific gesture is input. If it is determined to display the additional information, the processor 120 may display the additional information on the first region 410 in operation 1417.

Figure 17:
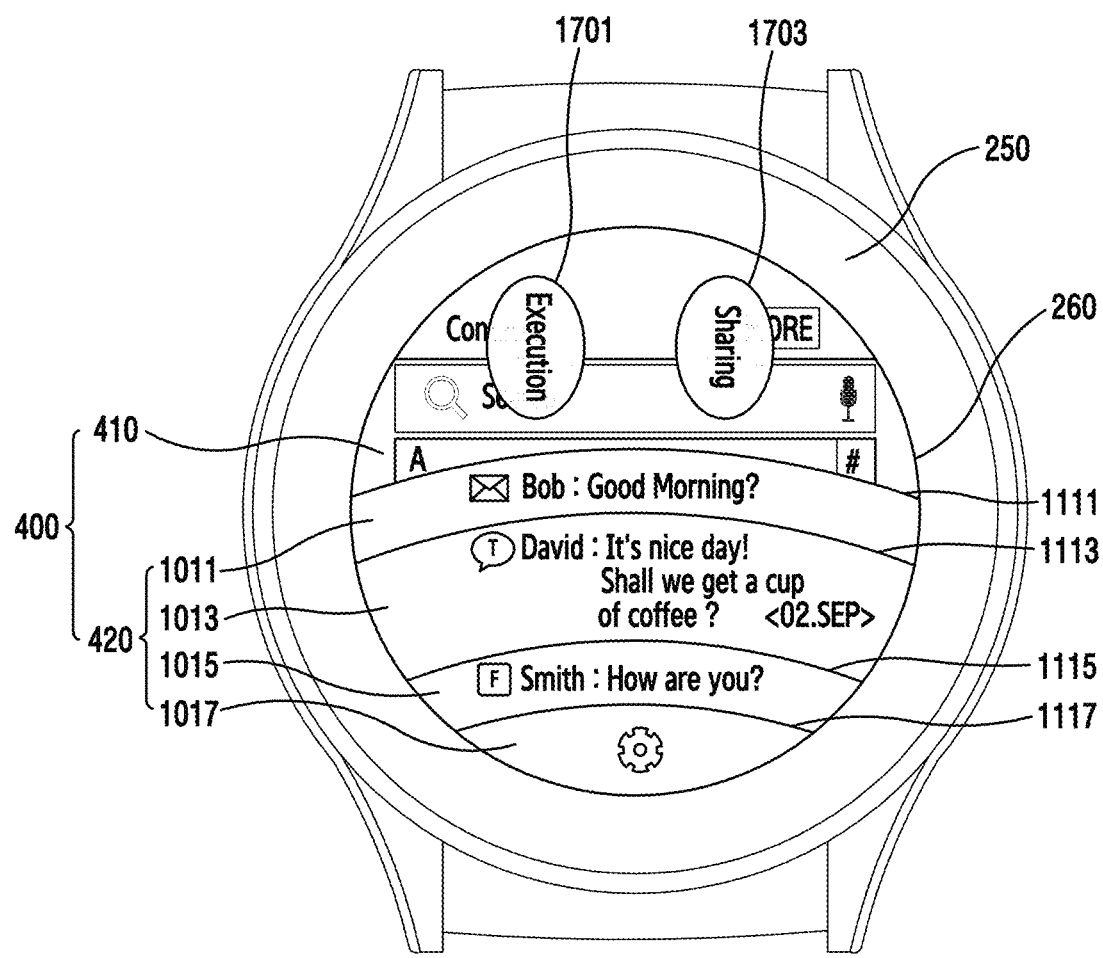
Figure 18:
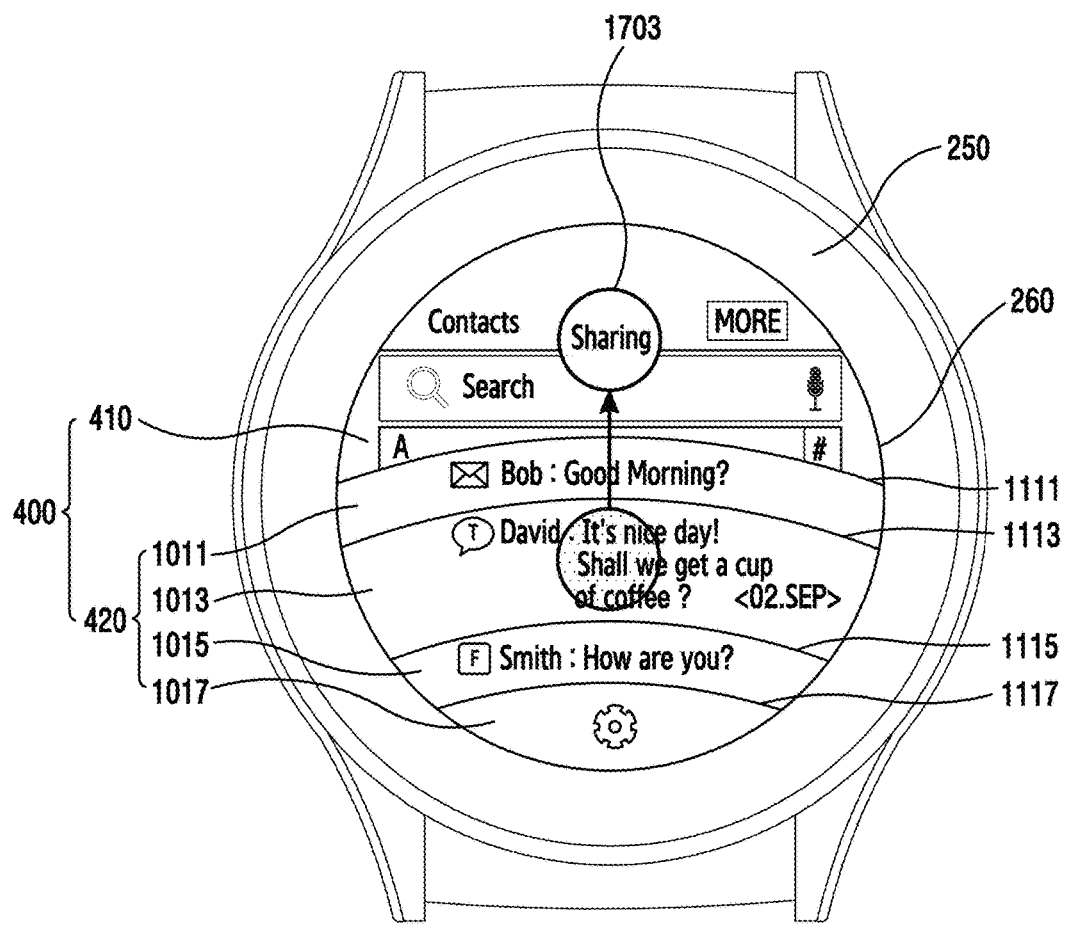

For example, as shown in FIG. 17, if a gesture input on the second sub-region 1013 faces in the first direction or is a long press, a menu 1701 may be displayed so that an application displayed on the second sub-region 1013 is executed in the first region 410 or a menu 1703 may be displayed so that information displayed on the second sub-region 1013 is shared with the application displayed on the first region 410. Upon selecting the execution menu 1701, as shown in FIG. 16, the application displayed on the second sub-region 1013 may be executed in the first region 410. That is, information related to the second sub-region 1013 may be displayed on the first region 410. Meanwhile, upon selecting the sharing menu 1703, as shown in FIG. 18, the processor 120 may share the information displayed on the second sub-region 1013 with the application displayed on the first region 410. For example, if the application displayed on the first region 410 is a contact list application, the processor 120 may deliver a message displayed on the second sub-region 1013 to a contact selected form the contact list. For another example, if the application displayed on the first region 410 is the contact list application, when the message displayed on the second sub-region 1013 moves to the first region 410, the processor 120 may perform an operation of selecting a contact for delivering the message from the contact list.

Figure 19:
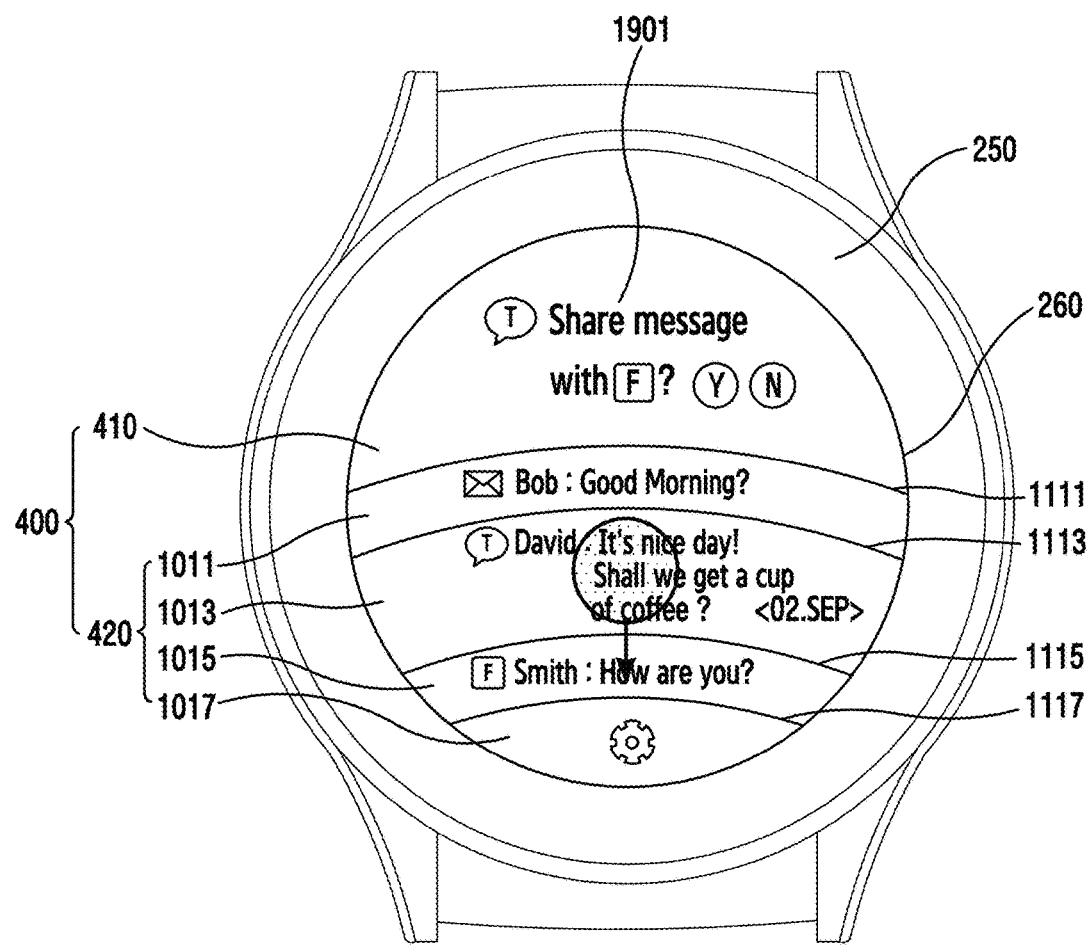

As shown in FIG. 19, according to one embodiment of the disclosure, if a gesture input on the second region 1013 faces different sub-regions (e.g., 1011, 1015, and 1017) of the second region 420, different additional information may be displayed on at least one part (e.g., the first region 410 or the second region 420) of the information display screen 400. For example, if the gesture input on the second sub-region 1013 faces the third sub-region 1015, a menu 1901 may be displayed on the first region 410 to select whether to share a message displayed on the second sub-region 1013 with an application displayed on the third sub-region 1015. According to one embodiment of the disclosure, when two sub-regions are simultaneously selected among the first sub-region 1011, the second sub-region 1013, the third sub-region 1015, and the fourth sub-region 1017, a menu may be displayed on the first region 410 to select whether to move information displayed on a certain sub-region to another application. According to one of the disclosure, if the second sub-region 1013 is selected and thereafter the third sub-region 1015 is selected, information displayed on the second sub-region 1013 may be shared with an application displayed on the third sub-region 1015 according to a selection order.

If it is determined in operation 617 that the first region 410 is not necessarily to be changed, the processor 120 may determine whether to change the second region 420 in operation 621. Whether to change the second region 420 may be determined according to a selection of the second region 420. If it is determined to change the second region 420, the processor 120 may change the second region 420 in operation 623.

Figure 20:
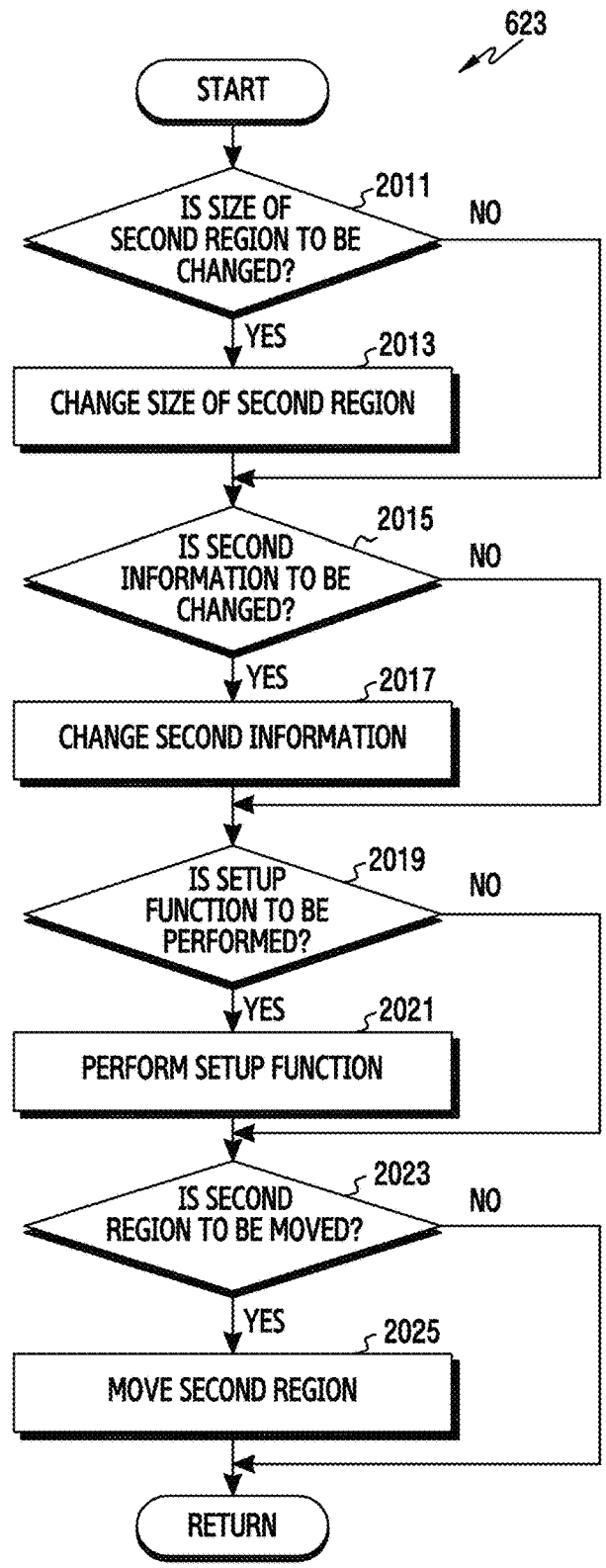
FIG. 20 is a flowchart illustrating an operation of changing a second region as performed by an electronic apparatus as part of the method of FIG. 6, according to various embodiments of the present disclosure.

FIG. 20 is a flowchart illustrating an operation 623 of changing a second region as performed by an electronic apparatus as part of the method of FIG. 6, accordingly to various embodiments of the present disclosure. Regarding FIG. 21 to FIG. 53, each of these figures illustrates an information display screen of an electronic apparatus according to various embodiments of the present disclosure, in which the electronic apparatus performs an operation of changing a second region, the operation as shown in FIG. 14.

Figure 21:
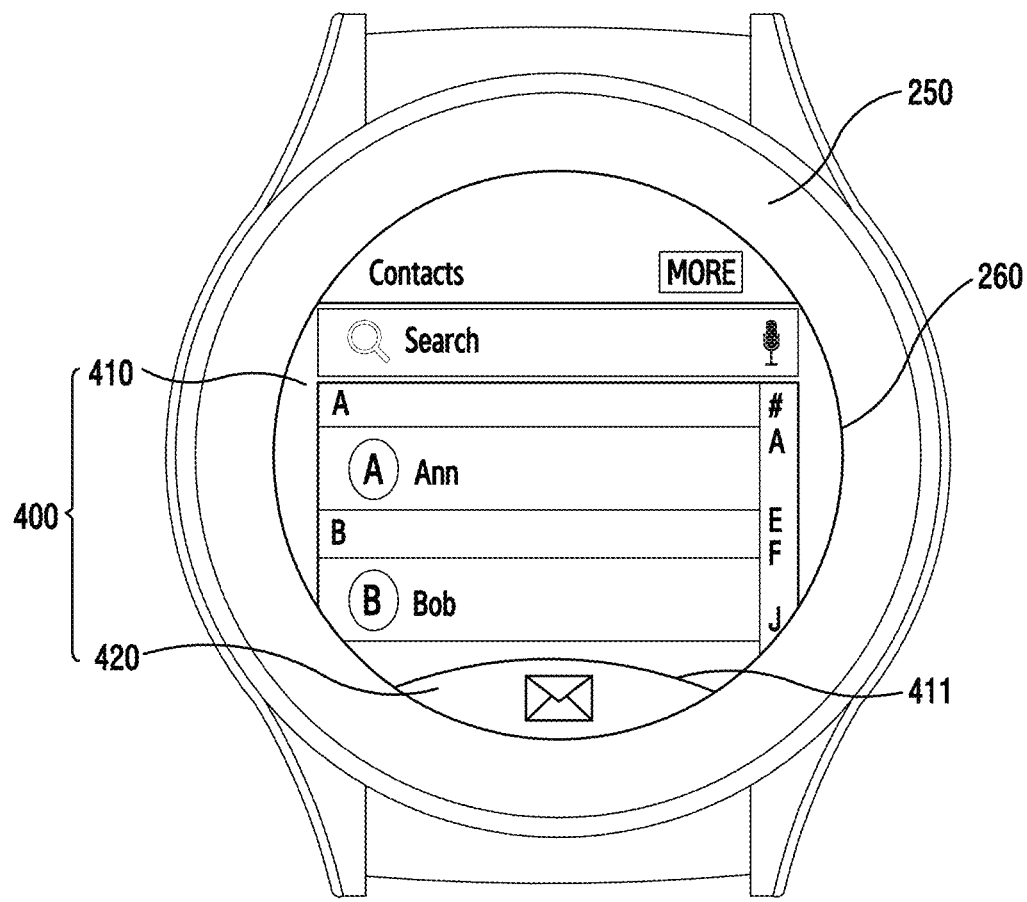
FIG. 21 to FIG. 53 illustrate an information display screen of an electronic apparatus according to various embodiments of the present disclosure.
Figure 22:
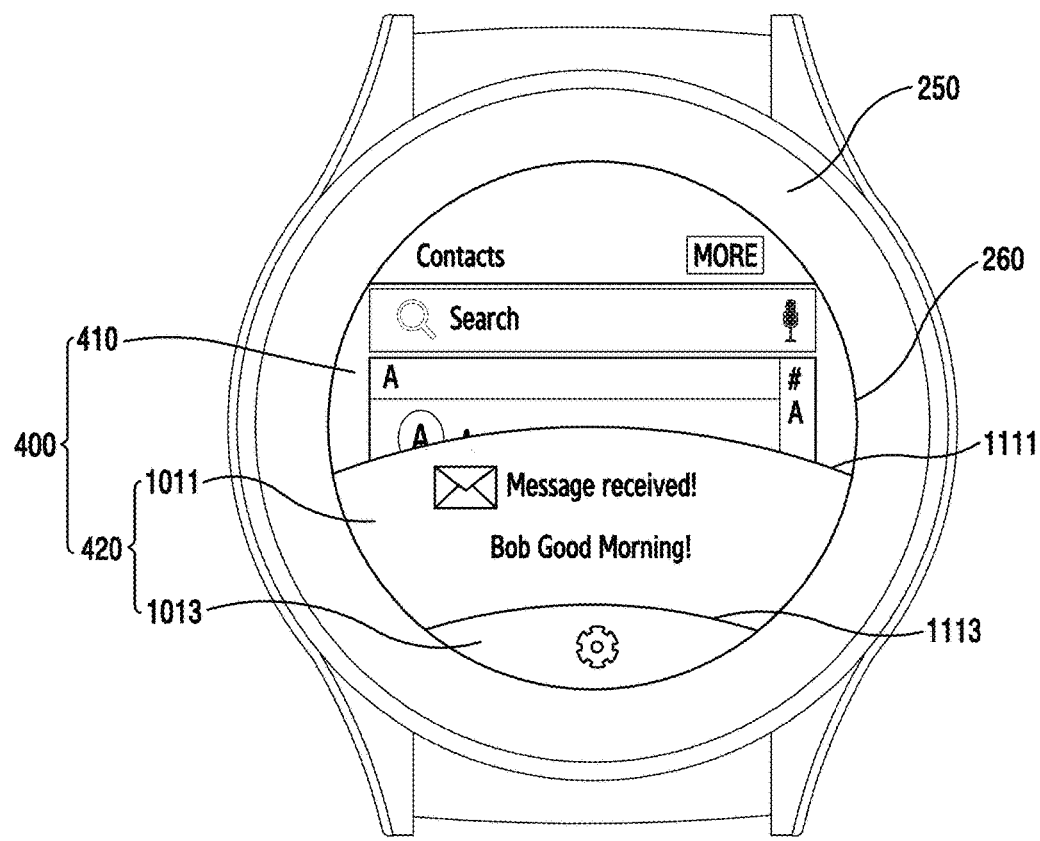

As shown in FIG. 20, the processor 120 may determine whether to change a size of the second region 420 in operation 2011. When a specific gesture is input on the second region 420, the processor 120 may determine to change the size of the second region 420. Alternatively, if a specific gesture is input on the first curve 1111, the second curve 1113, the third curve 1115, or the fourth curve 1117, the processor 120 may determine to change the size of the second region 420. If it is determined to change the size of the second region 420, the processor 120 may change the size of the second region 420 in operation 2013. As shown in FIG. 21, when an event is generated such as message reception during an execution of an application, related information may be displayed on the second region 420 of the information display screen 400. As shown in FIG. 22, upon selecting the second region 420, the size of the second region 420 may be enlarged. The selection of the second region 420 may be possible in various manners such as a tap, a swipe-up gesture input, a voice or action (wrist shaking), or the like. Further, upon selecting the second region 420, the sub-regions 1011 and 1013 may be displayed on the second region 420. For example, the second region 420 may include the first sub-region 1011 and the second sub-region 1013, may display message reception information on the first sub-region 1011 by selecting the second region 420, and may display a function setup icon capable of setting various functions on the second sub-region 1013.

Figure 23:
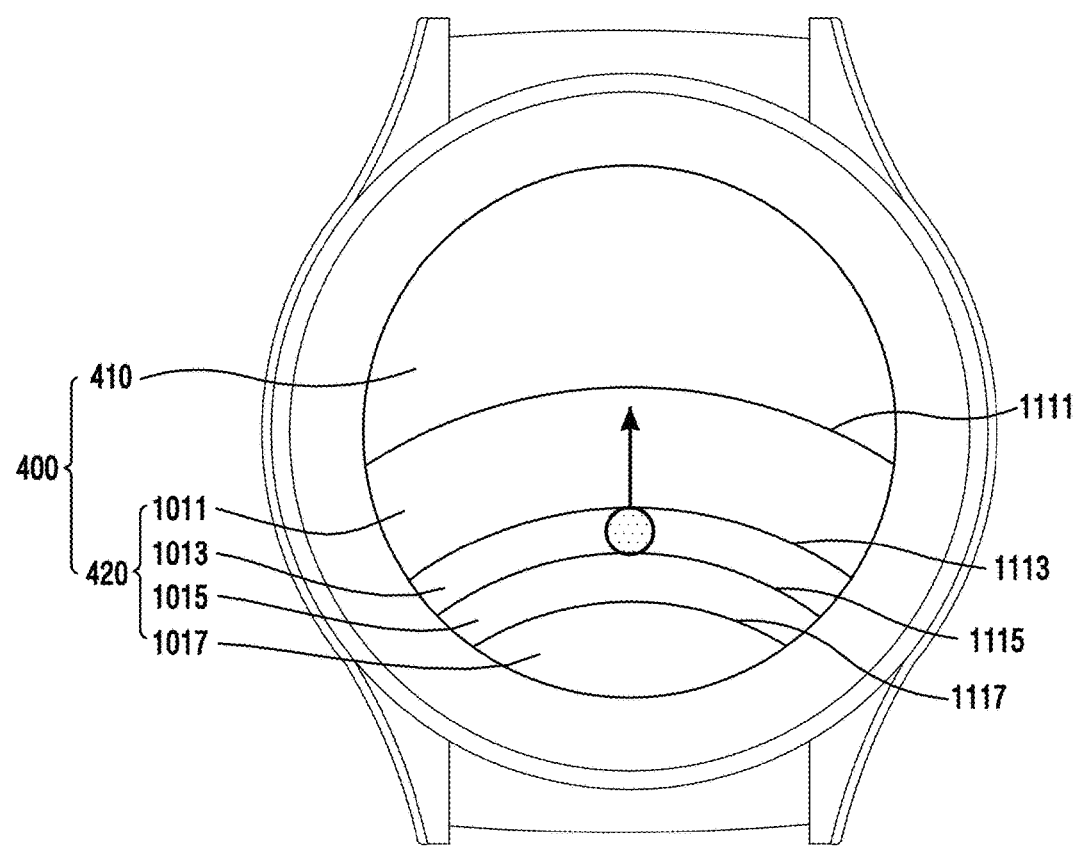
Figure 24:
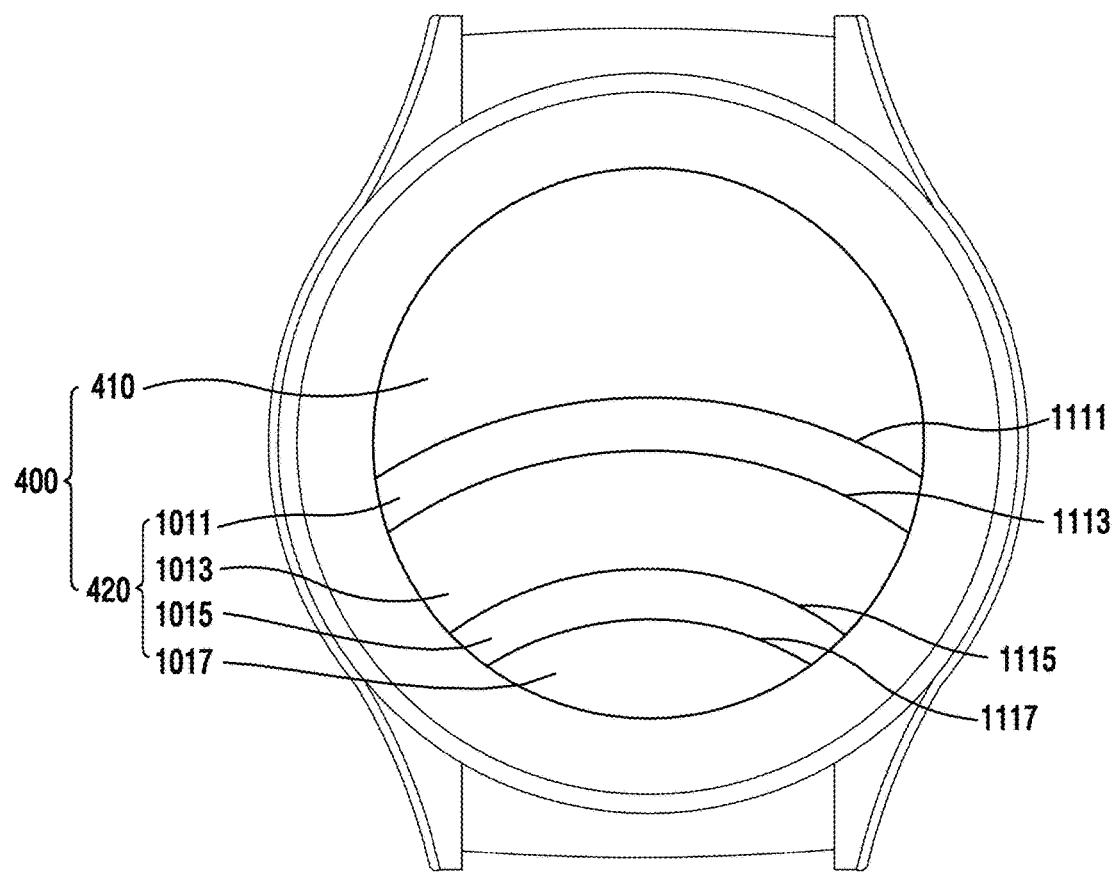

As shown in FIG. 23 and FIG. 24, the second region 420 may include the first sub-region 1011, the second sub-region 1013, the third sub-region 1015, and the fourth sub-region 1017. According to one embodiment of the disclosure, the processor 120 may change a size of a selected sub-region when a user input (e.g., a gesture) is detected in at least one sub-region selected among the sub-regions 1011 to 1017 in the second region 420. For example, if a gesture input on the second sub-region 1013 faces in the first direction, the processor 120 may determine to change the size of the second sub-region 1013. That is, if the gesture input on the second sub-region 1013 faces the first sub-region 1011, the processor 120 may determine to enlarge the size of the second sub-region 1013. When the size of the second sub-region 1013 is enlarged, information displayed on the second sub-region 1013 may be displayed in greater detail. Meanwhile, although not shown, an opposite action (an enlargement action) may be performed as to a direction not illustrated in the figure. For example, if the gesture input on the first sub-region 1011 faces in the second direction, the processor 120 may determine to shrink the size of the first sub-region 1011. That is, the size of the sub-region may be changed on the basis of a user input for dragging the sub-region.

Figure 25:
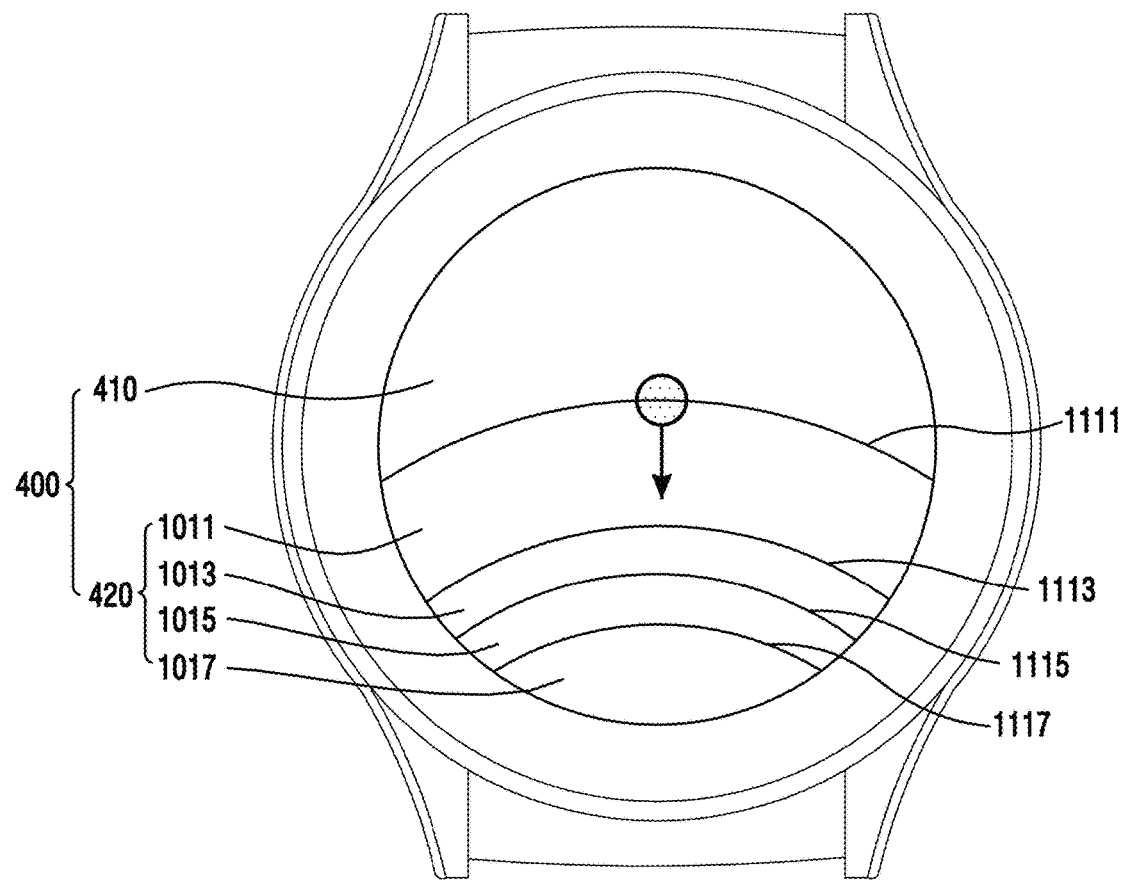
Figure 26:
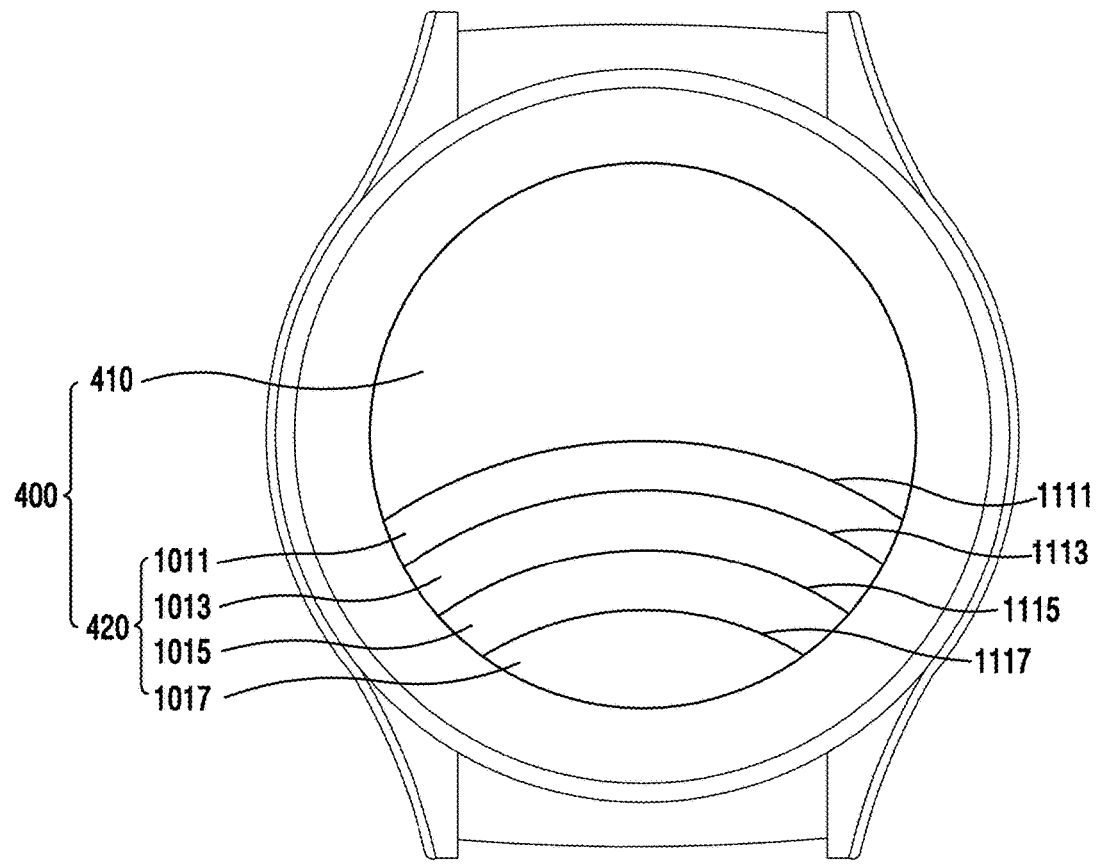

Meanwhile, as shown in FIG. 25 and FIG. 26, according to one embodiment of the disclosure, upon detecting a user input (e.g., a gesture) in at least one curve selected among the plurality of curves 1111 to 1117 for distinguishing the sub-regions 1011 to 1017 existing in the second region 420, the processor 120 may change the size of the at least one sub-regions 1011 to 1017. For example, if the gesture input on the first curve 1111 faces in the second direction, the processor 120 may determine to change the size of the first sub-region 1011. That is, if the gesture input on the first curve 1111 faces the second sub-region 1013, the processor 120 may determine to shrink the size of the first sub-region 1011. When the size of the first sub-region 1011 is shrunk, information displayed on the first sub-region 1011 may be displayed further simply. Meanwhile, although not shown, an opposite direction (an enlargement action) may be performed as to a direction not illustrated in the figure. For example, if the gesture is input on the first curve 1011 in the first direction, it may be determined to enlarge the size of the first sub-region 1011. That is, the size of the first sub-region 1011 may be changed on the basis of a user input for dragging the first curve 1011.

Figure 27:
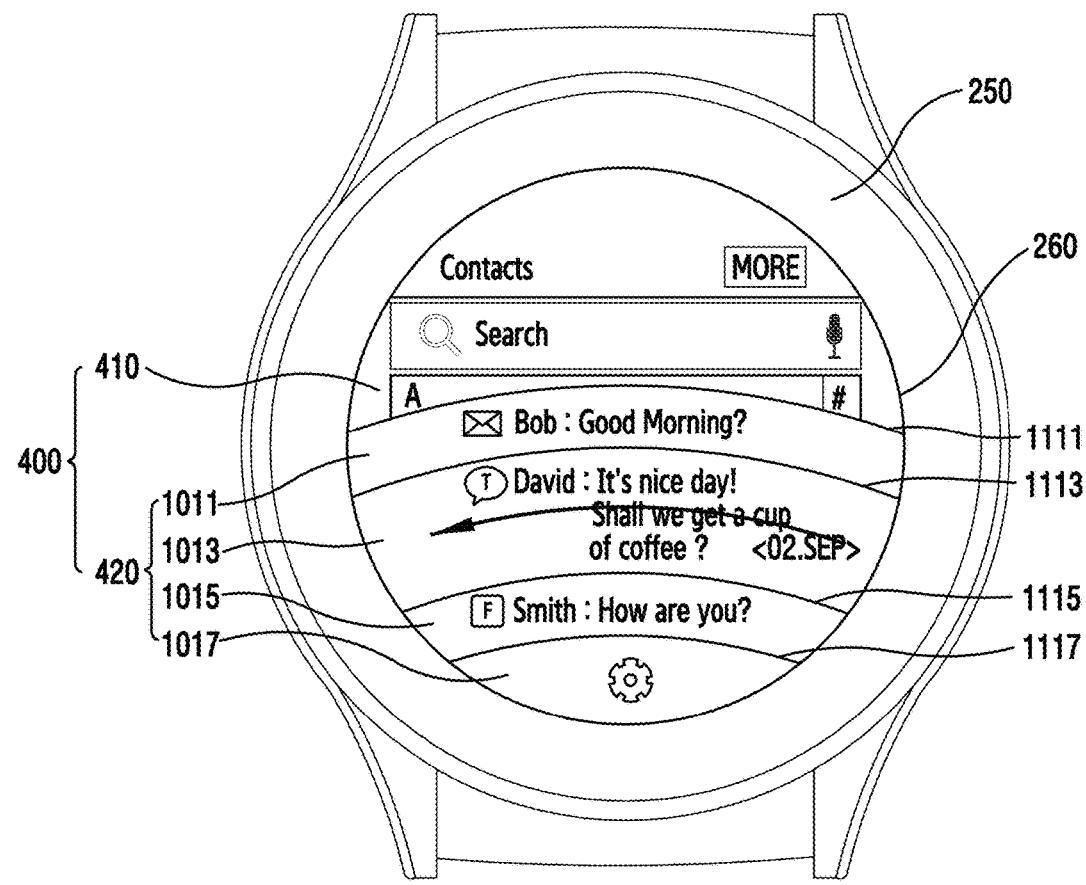
Figure 28:
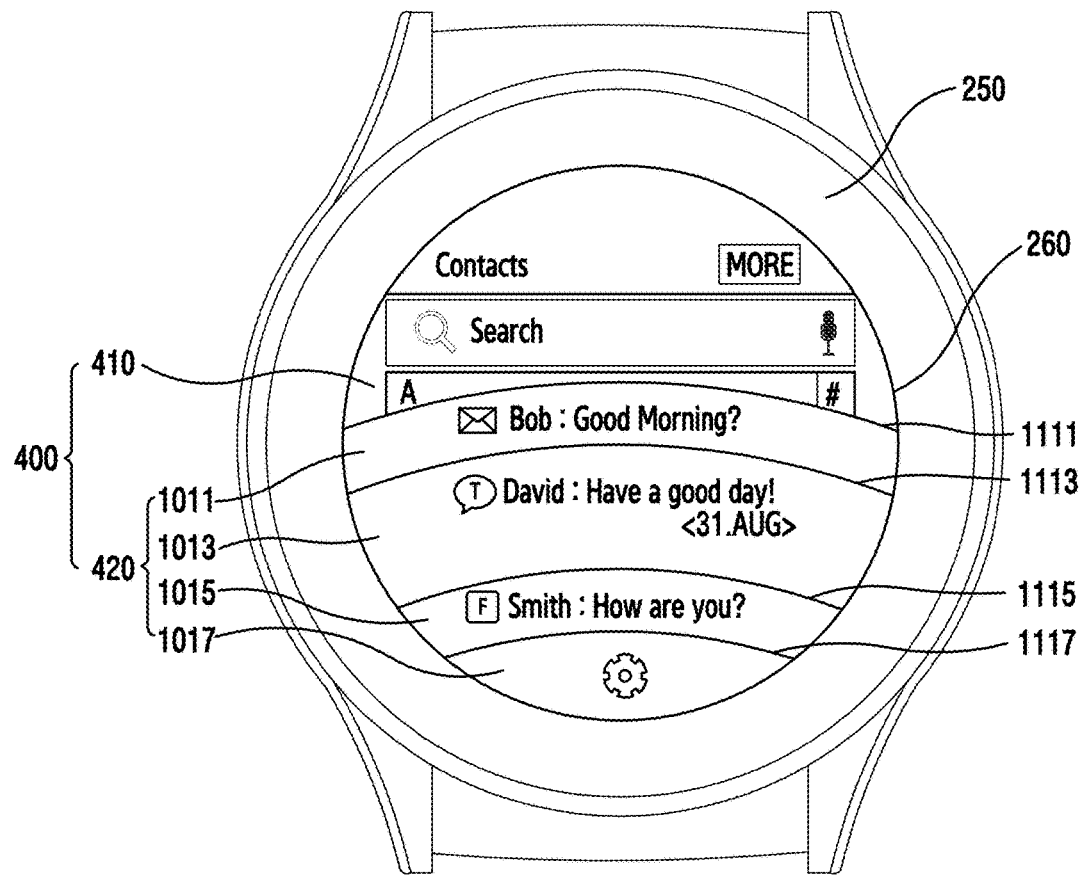

The processor 120 may determine whether to change second information in operation 2015. According to one embodiment of the disclosure, when a specific gesture (e.g., a left swipe or a right swipe or the like) is input, the processor 120 may determine to change the second information. If it is determined to change the second information, the processor 120 may change the second information in operation 2017. For example, as shown in FIG. 27, if a message application currently being displayed on the second sub-region 1013 receives a plurality of messages, when a left swipe action is carried out in the second sub-region 1013, as shown in FIG. 28, the processor 120 may display the second information displayed on the second sub-region 1013 by changing it to a previous message.

Figure 29:
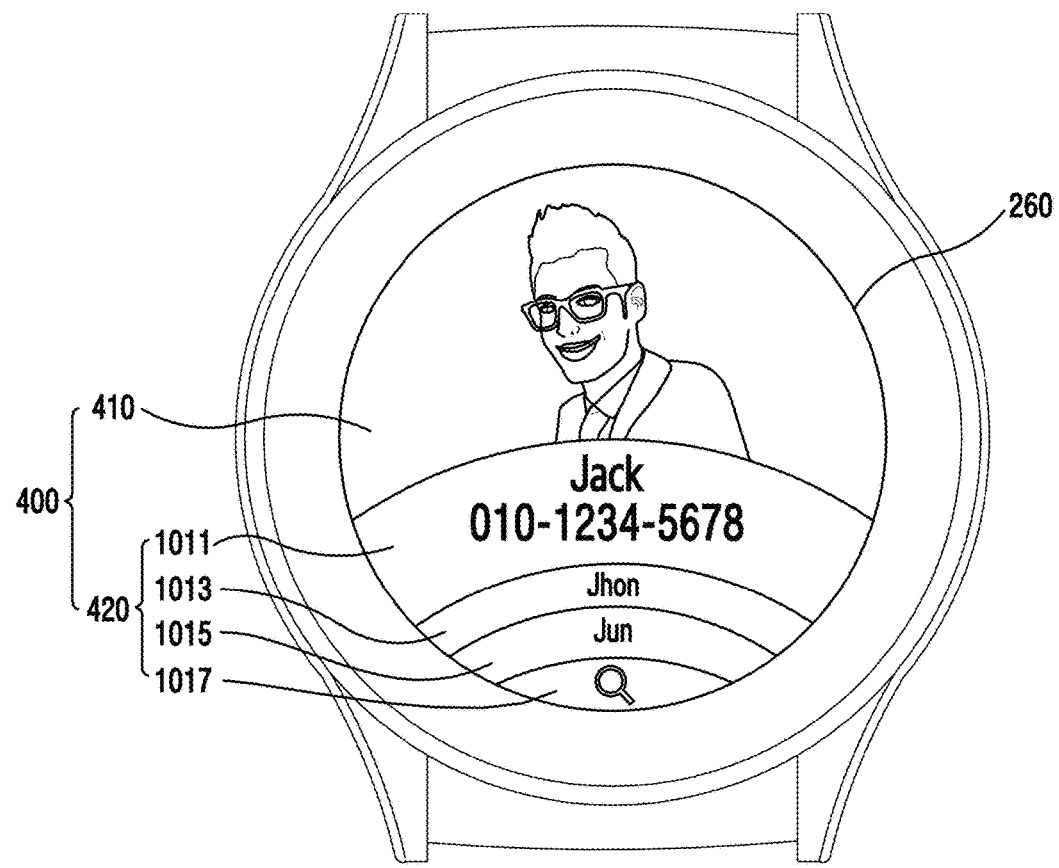
Figure 30:
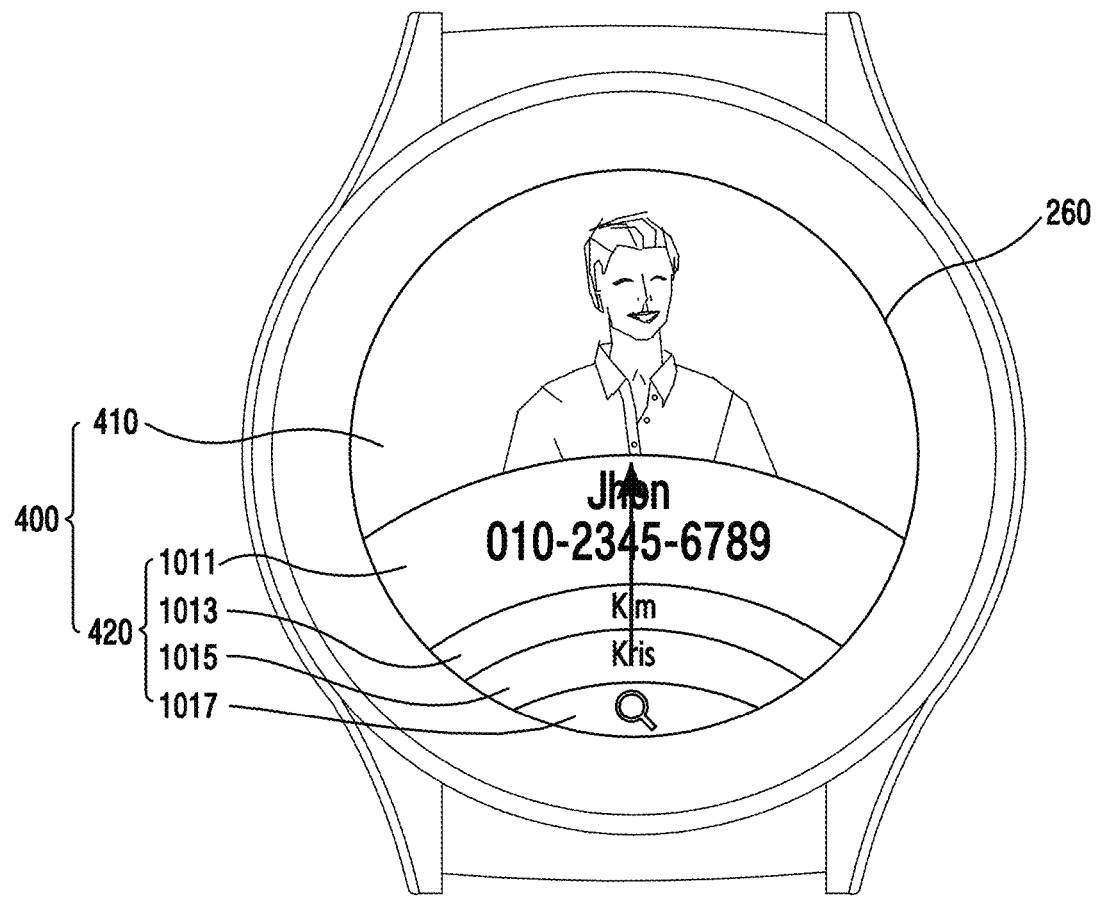

As shown in FIG. 29, according to one embodiment of the disclosure, if the information display screen 400 is applied to a contact list screen, a contact image may be displayed on the first region 410, and the contact list may be displayed on the second region 420. For example, an image of a contact displayed on the first sub-region 1011 may be displayed on the first region 410, and other contacts may be displayed on the second sub-region 1013 and the third sub-region 1015. A search icon capable of searching the contact may be displayed on the fourth sub-region 1017. An image of 'Jack' displayed on the first sub-region 1011 may be displayed on the first region 410, and different contacts, i.e., 'Jhon' and 'Jun', may be displayed on the second sub-region 1013 and the third sub-region 1015. Meanwhile, a phone number of 'Jack' may be displayed together on the first sub-region 1011. In this case, if an up/down scroll gesture of a user is input on the second region 420, the processor 120 may determine to change the information displayed on the second region 420. That is, as shown in FIG. 30, according to the up/down scroll gesture of the user in the second region 420, different contacts may be displayed on the second region 420, and thus an image displayed on the first region 410 may also be changed. That is, the first information displayed on the first region 410 and the second information displayed on the second region 420 may be both changed.

Figure 31:
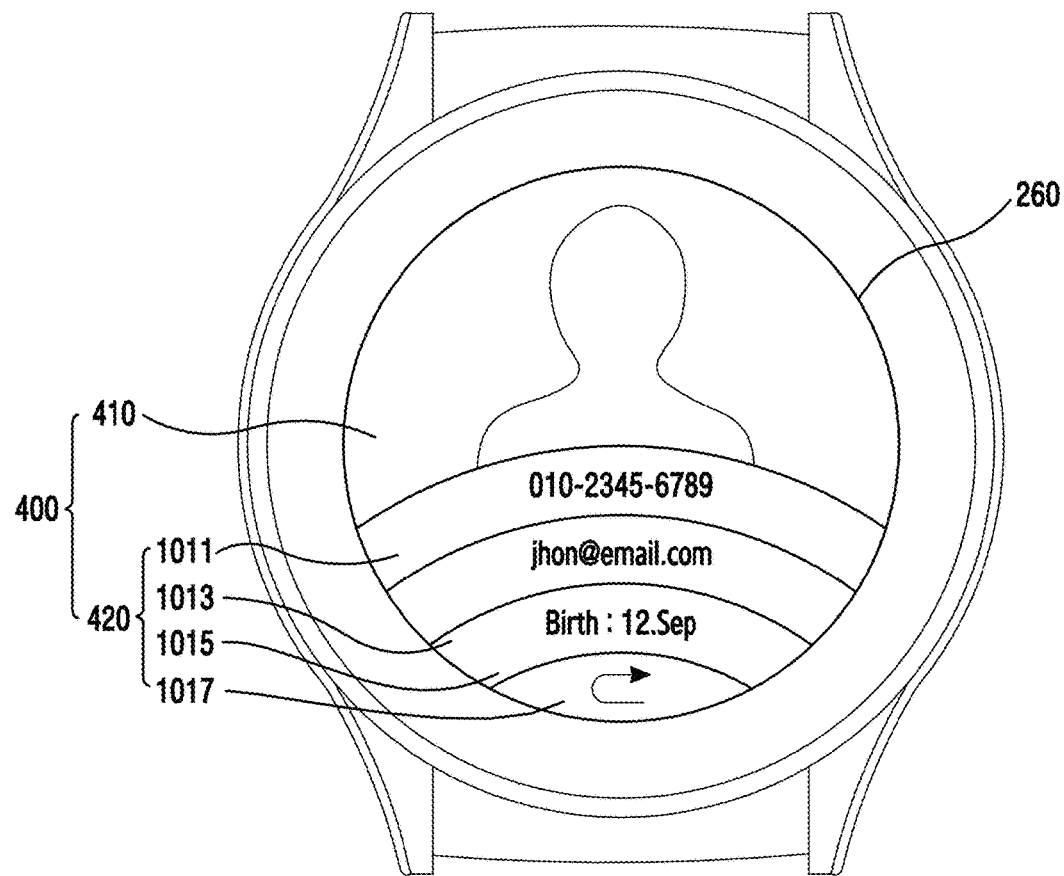

As shown in FIG. 31, according to one embodiment of the disclosure, when a long touch is detected in the first sub-region 1011, contact detail information displayed on the first sub-region 1011 may be displayed on the second region 420. For example, a phone number of the contact may be displayed on the first sub-region 1011, an e-mail address of the contact may be displayed on the second sub-region 1013, and a birthday of the contact may be displayed on the third sub-region 1015. Further, an icon for returning to a previous screen may be displayed on the fourth sub-region 1017. However, the embodiment of the disclosure is not limited thereto, and thus, according to another embodiment of the disclosure, upon selecting the first region 410, information related to the contact displayed on the first region 410 may be displayed on the second region 420.

Figure 32:
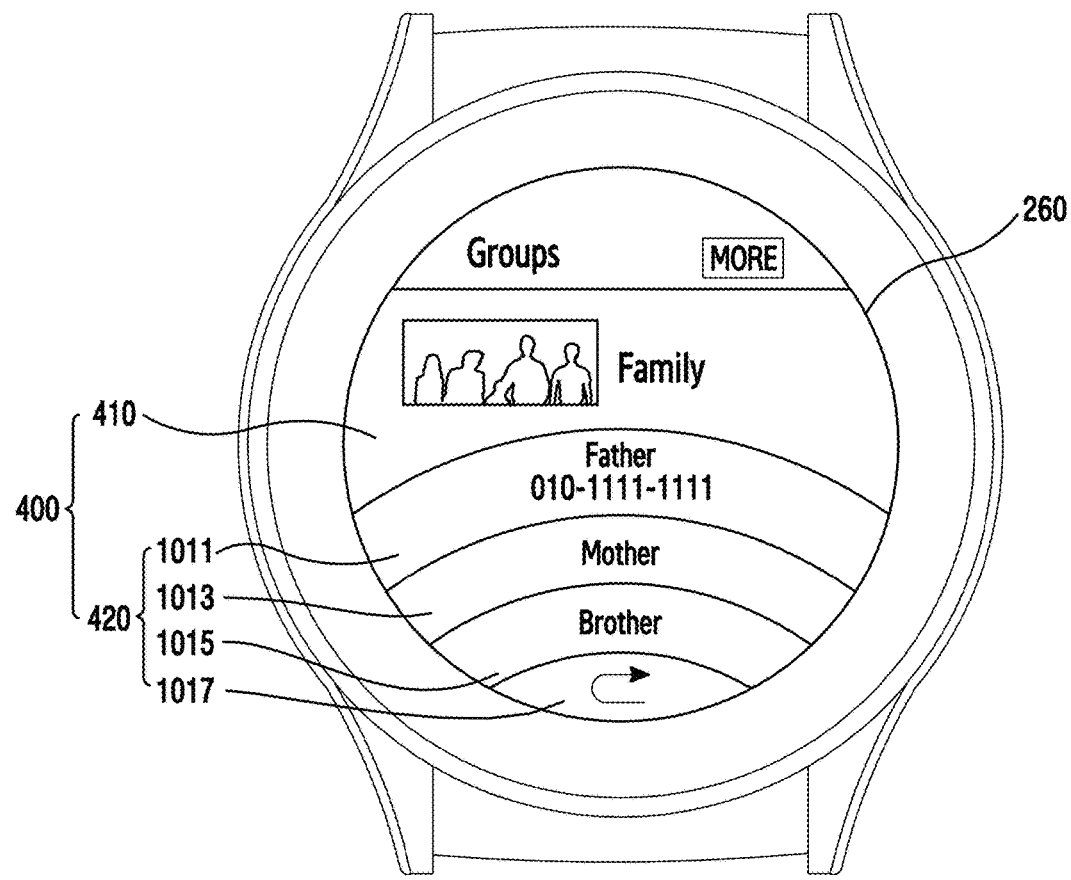

Meanwhile, as shown in FIG. 32, group information may be displayed on the first region 410, and information of group members belonging to a group may be displayed on the second region 420. In this case, upon selecting the second region 420, information of a corresponding contact may be displayed. For example, upon selecting the first sub-region 1011, information related to 'Father' displayed on the first sub-region 1011 may be displayed on the second region 420. However, the embodiment of the disclosure is not limited thereto, and thus the group information may be changed upon selecting the first region 410.

The processor 120 may determine whether to perform a setup function in operation 2019. When a specific gesture is input, the processor 120 may determine to perform the setup function. If it is determined to perform the setup function, the processor 120 may perform the setup function in operation 2021.

Figure 33:
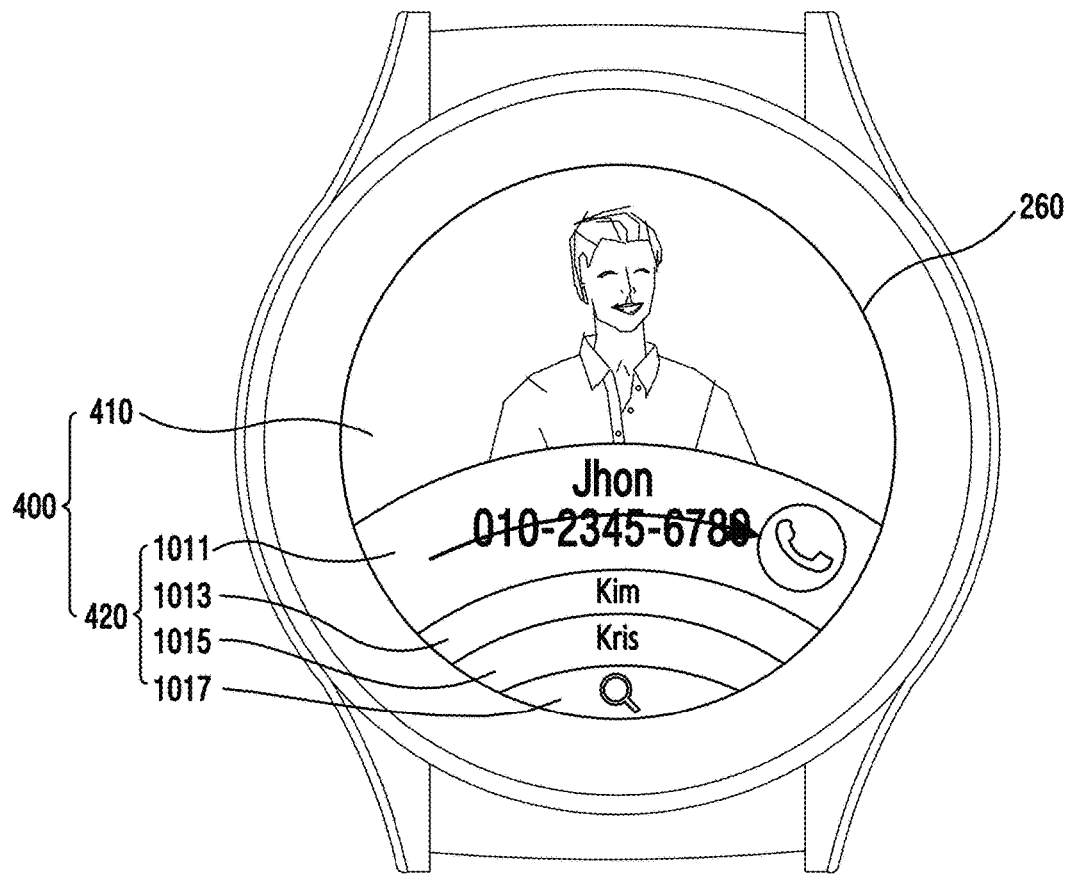

For example, as shown in FIG. 33, the phone number of the contact may be displayed on the first sub-region 1011, and call originating may be performed on the contact by detecting an input of a left/right swipe action of the user in the first sub-region 1011.

Figure 34:
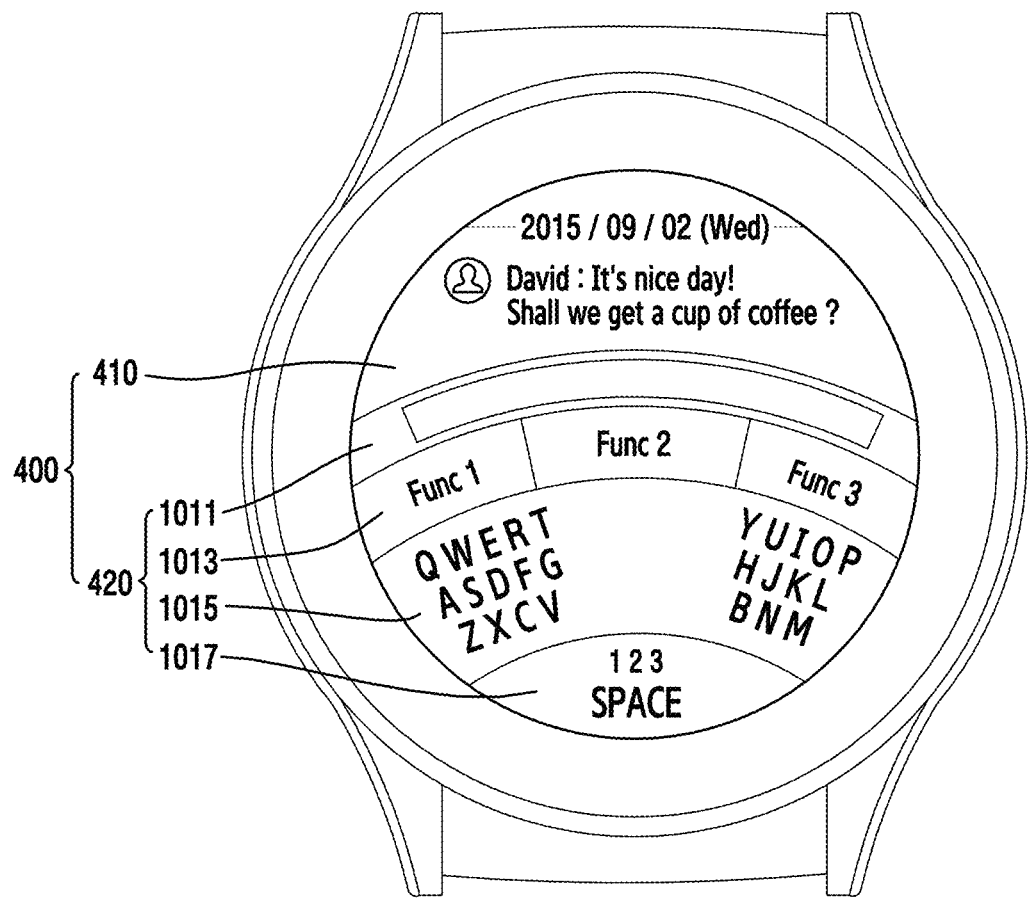

As shown in FIG. 34, according to one embodiment of the present disclosure, the processor 120 may display a keyboard on the second region 420 and may perform a function of receiving a character input. For example, if an application related to a message is executed in the first region 410, a keyboard and/or an input window may be displayed on the second region 420, and a function of receiving and displaying the character input may be performed. Different information may be displayed on each of the first sub-region 1011, the second sub-region 1013, the third sub-region 1015, and the fourth sub-region 1017. For example, an input window for displaying an input character may be displayed on the first sub-region 1011. Various function keys may be displayed on the second sub-region 1013. The function key may be 'back', 'enter', 'predictive text', 'caps lock', or the like. Character keys may be displayed on the third sub-region 1015. A letter key, a numeric key, a symbol key, or the like may be displayed on the third sub-region 1015 on the basis of a set input value. A key for setting an input value may be displayed on the fourth sub-region 1017. Character keys displayed on the third sub-region 1015 may vary depending on an input value selected in the fourth sub-region 1017. That is, a keyboard displayed on the third sub-region 1015 may vary depending on an input value selected in the fourth sub-region 1017.

Figure 35:
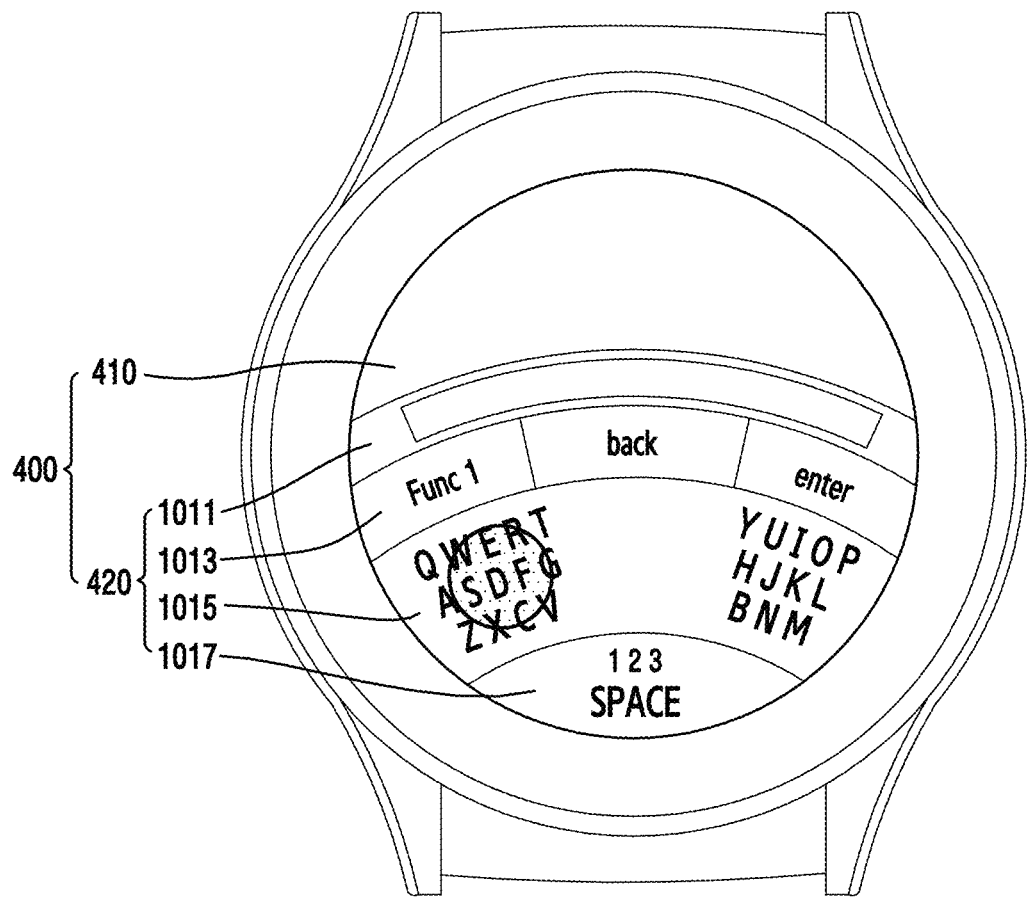
Figure 36:
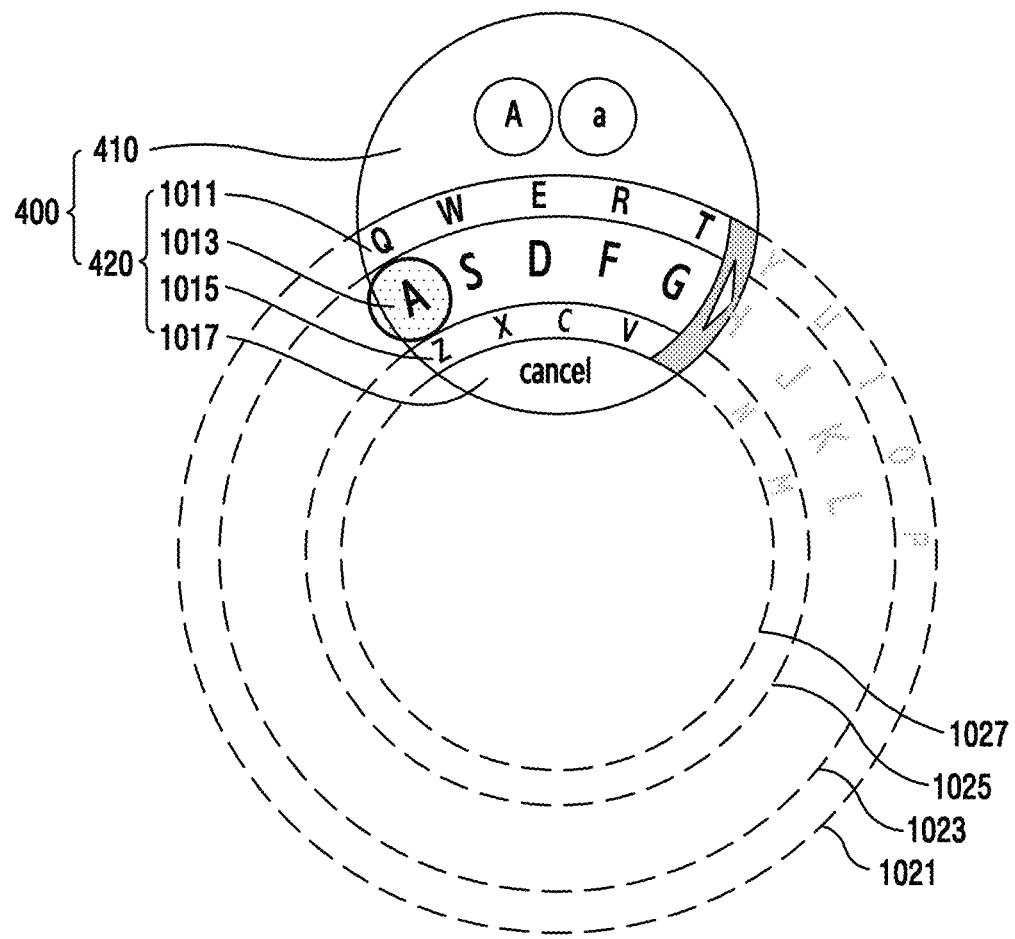
Figure 37:
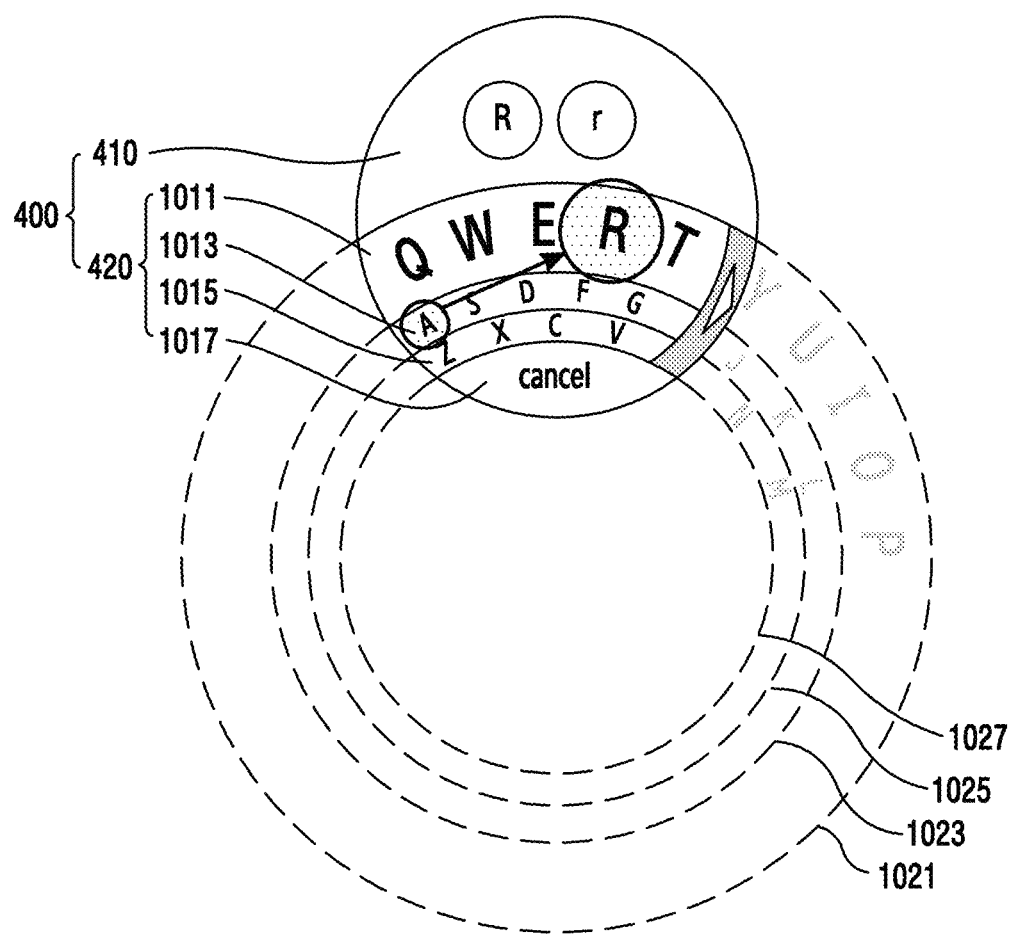

As shown in FIG. 35 to FIG. 37, a function of receiving an input of an English character key and displaying it on the second region 420 is described.

As shown in FIG. 35, some English character keys may be displayed on one region of the third sub-region 1015, and the remaining English character keys may be displayed on the remaining regions. For example, a qwerty keyboard may be displayed on the third sub-region 1015. In this case, when a user selection is input on one region (e.g., a left side) of the third sub-region 1015, as shown in FIG. 36, English character keys displayed on one region may be displayed on the first sub-region 1011, the second sub-region 1013, and the third sub-region 1015. Upon selecting any one of the English character keys displayed on the first sub-region 1011, the second sub-region 1013, and the third sub-region 1015, capital and lower-case letters of the selected English character may be displayed on the first region 410. Further, a width of a selected sub-region may be displayed to be wider than a width of a not-selected sub-region. For example, upon selecting an English character key 'A' displayed on the second sub-region 1013, a capital letter 'A' and a lower-case letter 'a' may be displayed together on the first region 410. Further, the second width W2 of the second sub-region 1013 may be displayed to be wider than the first width W1 of the first sub-region 1011 and the third width W3 of the third sub-region 1015. For another example, a size of the selected key may be displayed to be greater than a size of the not-selected key. For example, upon selecting the English character key 'A' displayed on the second sub-region 1013, it may be displayed to be larger than another English character key 'S', 'D', 'F', or 'G' displayed on the second sub-region 1013. Accordingly, a user input can be easily achieved. For another example, as shown in FIG. 37, upon selecting an English character key 'R' displayed on the first sub-region 1011, a capital letter 'R' and a lower-case letter 'r' may be displayed together on the first region 410. Further, the first width W1 of the first sub-region 1011 may be wider than the second width W2 of the second sub-region 1013 and the third width W3 of the third sub-region 1015. That is, the first width W1 of the first sub-region 1011 may be increased by decreasing the third radius R3 of the second virtual circle 1023. If a release is performed on the selected English character key 'R' and any one of the capital letter 'R' and lower-case letter 'r' displayed on the first region 410 is input, the selected letter may be displayed. Meanwhile, an English character key not selected in FIG. 35 may be included in virtual circles not displayed on the display 260. According to one embodiment of the disclosure, the included English character key may be displayed by selecting a left arrow or a right arrow.

As shown in FIG. 38 to FIG. 42, a function of receiving and displaying an input of a Korean character key in the second region 420 is described according to one embodiment of the disclosure.

Figure 38:
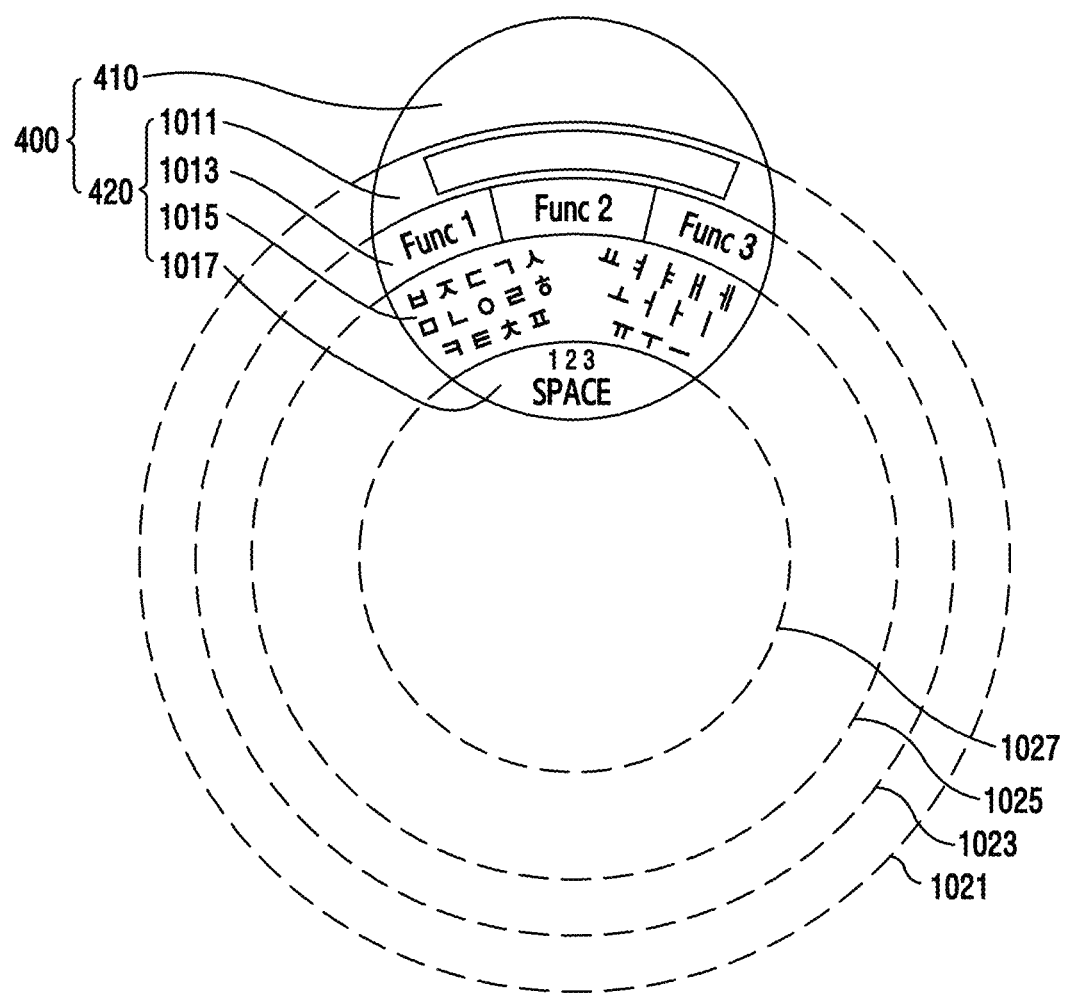
Figure 39:
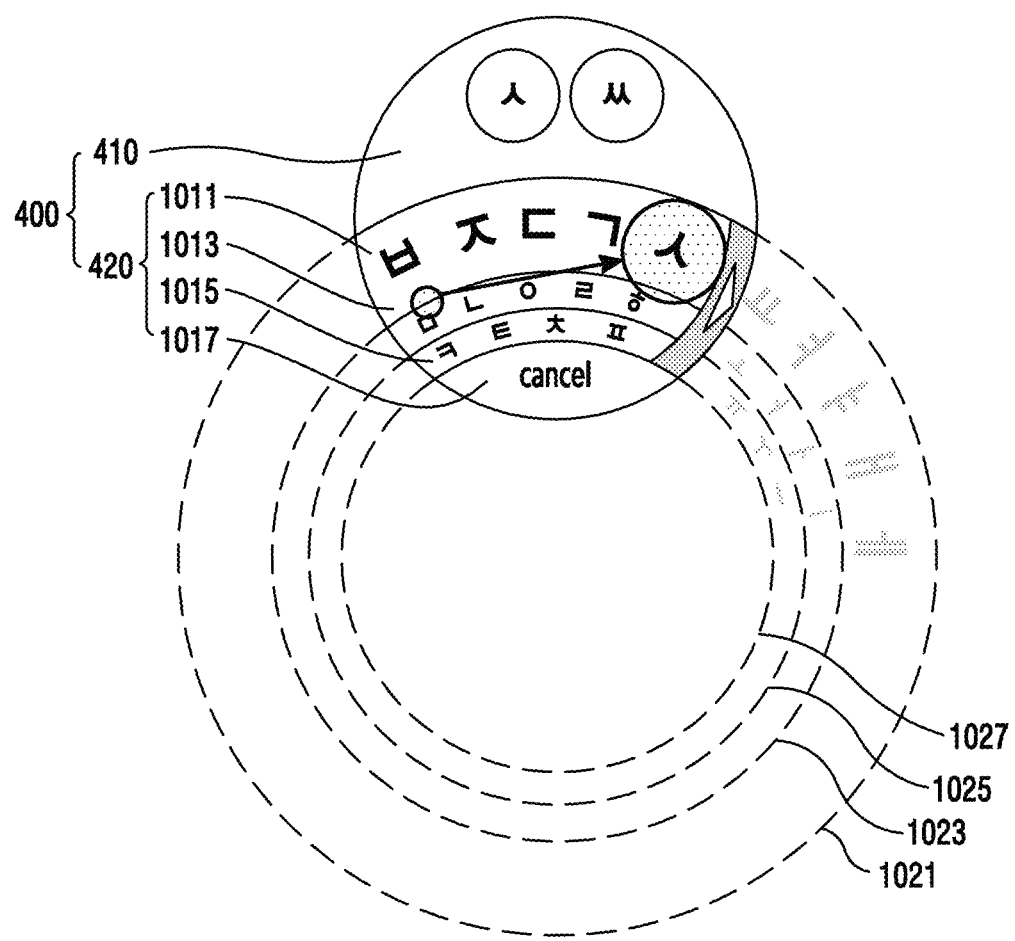
Figure 40:
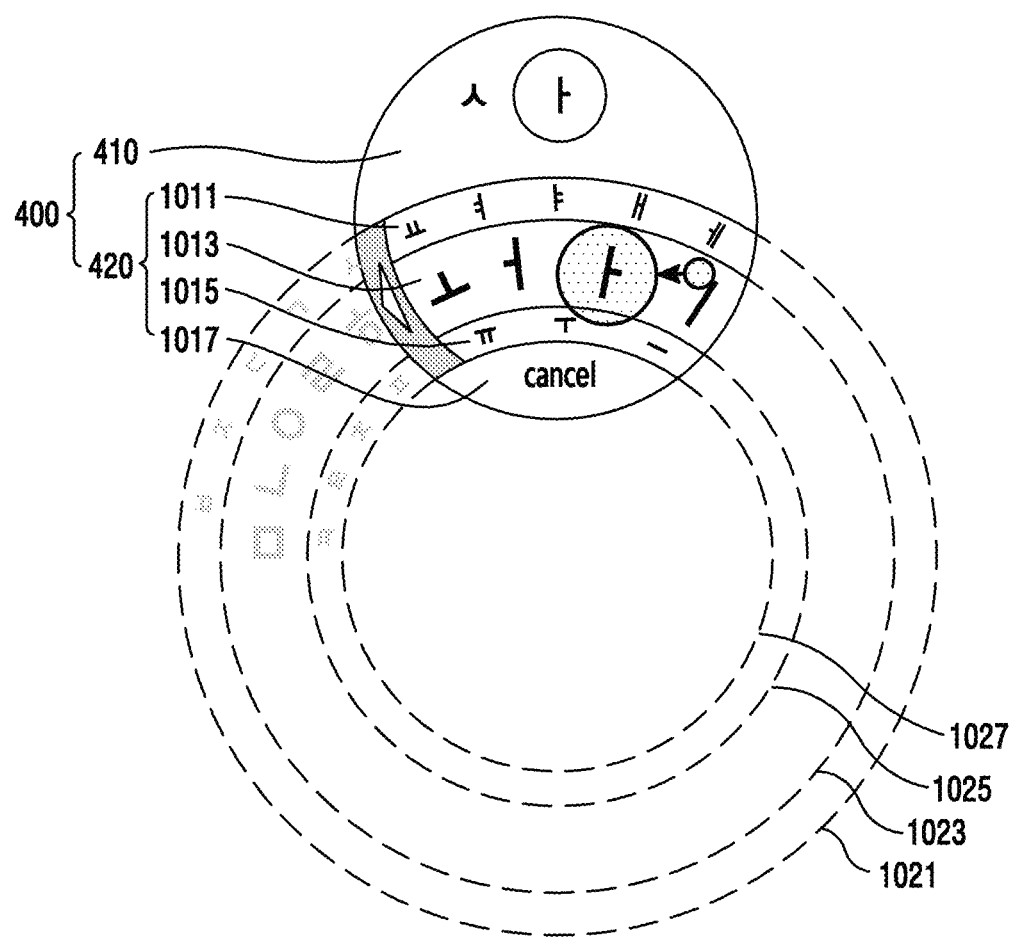
Figure 41:
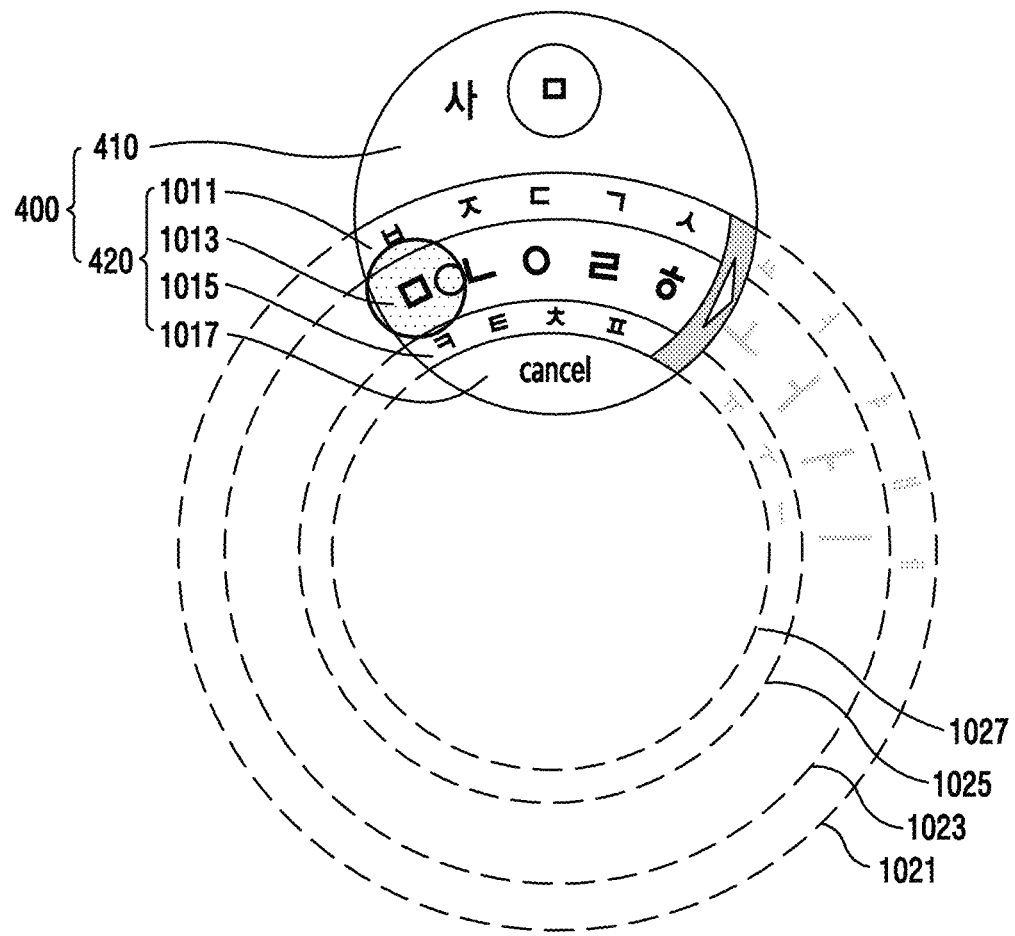

As shown in FIG. 38, some Korean character keys may be displayed on one region of the third sub-region 1015, and the remaining Korean character keys may be displayed on the remaining regions. For example, a Korean language keyboard may be displayed on the third sub-region 1015. In this case, when a user selection is input on one region of the third sub-region 1015, as shown in FIG. 39, Korean character keys displayed on one region may be displayed on the first sub-region 1011, the second sub-region 1013, and the third sub-region 1015. According to one embodiment of the disclosure, when a swipe gesture is input on the second region 420, the input sub-region may be enlarged, and a user selection may be input on a Korean character key displayed on the enlarged sub-region. For example, when the user input stays for a specific time on any one Korean character key among Korean character keys displayed on the first sub-region 1011, the second sub-region 1013, and the third sub-region 1015, the selected Korean character key may be enlarged and displayed, or a selected consonant and a double consonant may be displayed on the first region 410. According to one embodiment of the disclosure, a width of a selected sub-region may be displayed to be wider than a width of a not-selected sub-region. For example, upon selecting a Korean character key 'ㅅ' displayed on the first sub-region 1011, a consonant 'ㅅ' and a double consonant 'ㅆ' may be displayed together on the first region 410. Further, the first width W1 of the first sub-region 1011 may be displayed to be wider than the second width W2 of the second sub-region 1013 and the third width W3 of the third sub-region 1015. In this case, if a long press is input for a specific time on the selected Korean character key, a corresponding Korean character key may be input, followed by transitioning to an input standby state. Alternatively, upon completion of a gesture input (e.g., a swipe action) on the selected Korean character key, a movement to a space or a movement to an initial screen (e.g., the screen of FIG. 38) may be achieved. According to one embodiment of the disclosure, a vowel key not selected in FIG. 38 may be included in virtual circles not displayed on the display 260. The included vowel key may be displayed on the second region 420 by selecting at least one of a left arrow or right arrow displayed on the second region 420. For example, upon selection of the right arrow displayed on a right side of the second region 420 in FIG. 39, the included vowel key may be displayed on the second region 420 as shown in FIG. 40, and a consonant key may be included in virtual circles not displayed on the display 260. Upon selection of the vowel key displayed on the second region 420, the selected vowel may be displayed on the first region 410. According to one embodiment of the disclosure, the consonant key included in the virtual circle may be displayed on the second region 420 by selecting at least any one of a left arrow and right arrow displayed on one region to select a consonant key again. For example, by selecting a left arrow displayed on left and right sides of the second region 420 of FIG. 40, the consonant key included in the virtual circle may be displayed on the second region 420 as shown in FIG. 41. According to one embodiment of the disclosure, an arrow displayed on the second region 420 may exist at both left and right sides, and may operate in a cyclical manner.

Figure 42:
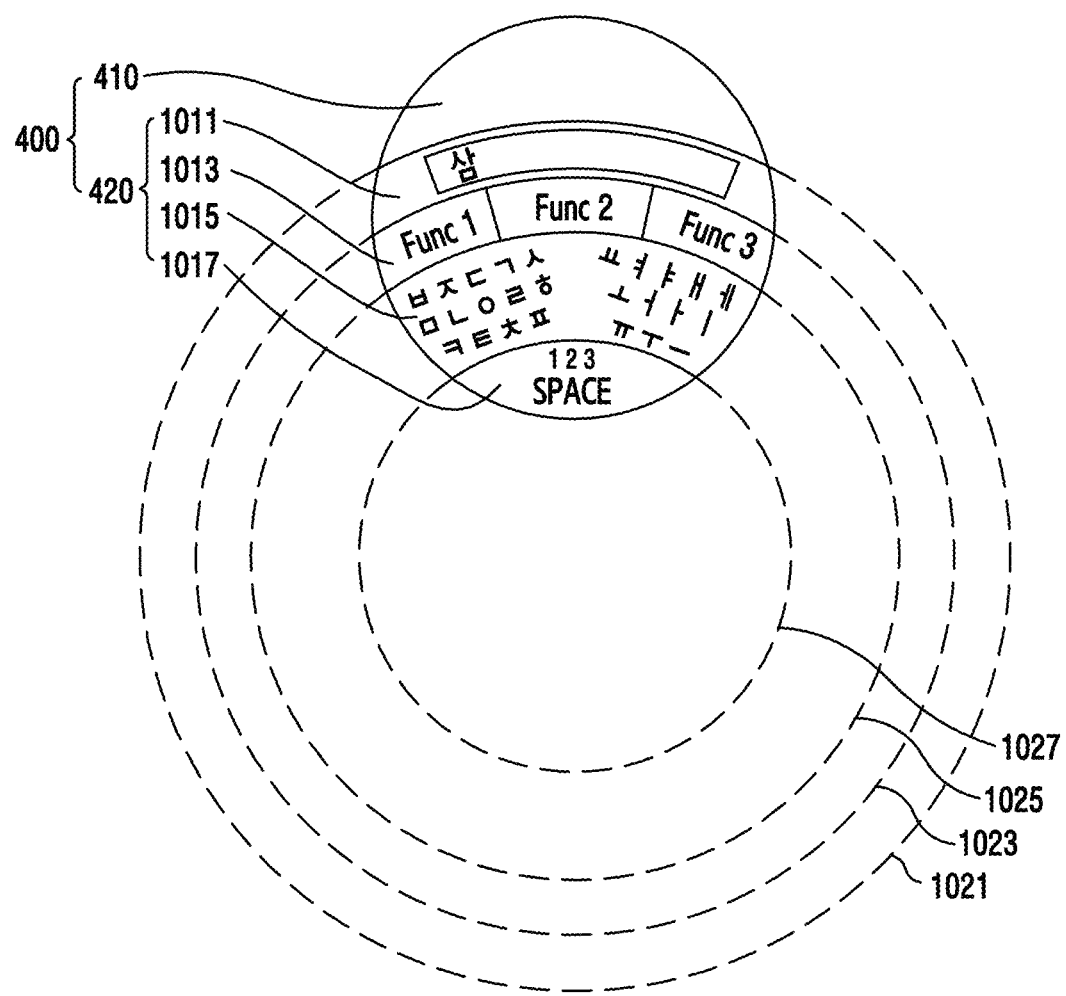

According to one embodiment of the disclosure, if an input is complete or an input of at least one character is complete, as shown in FIG. 42, a selected letter may be displayed on an input window of the first sub-region 1011.

Figure 43:
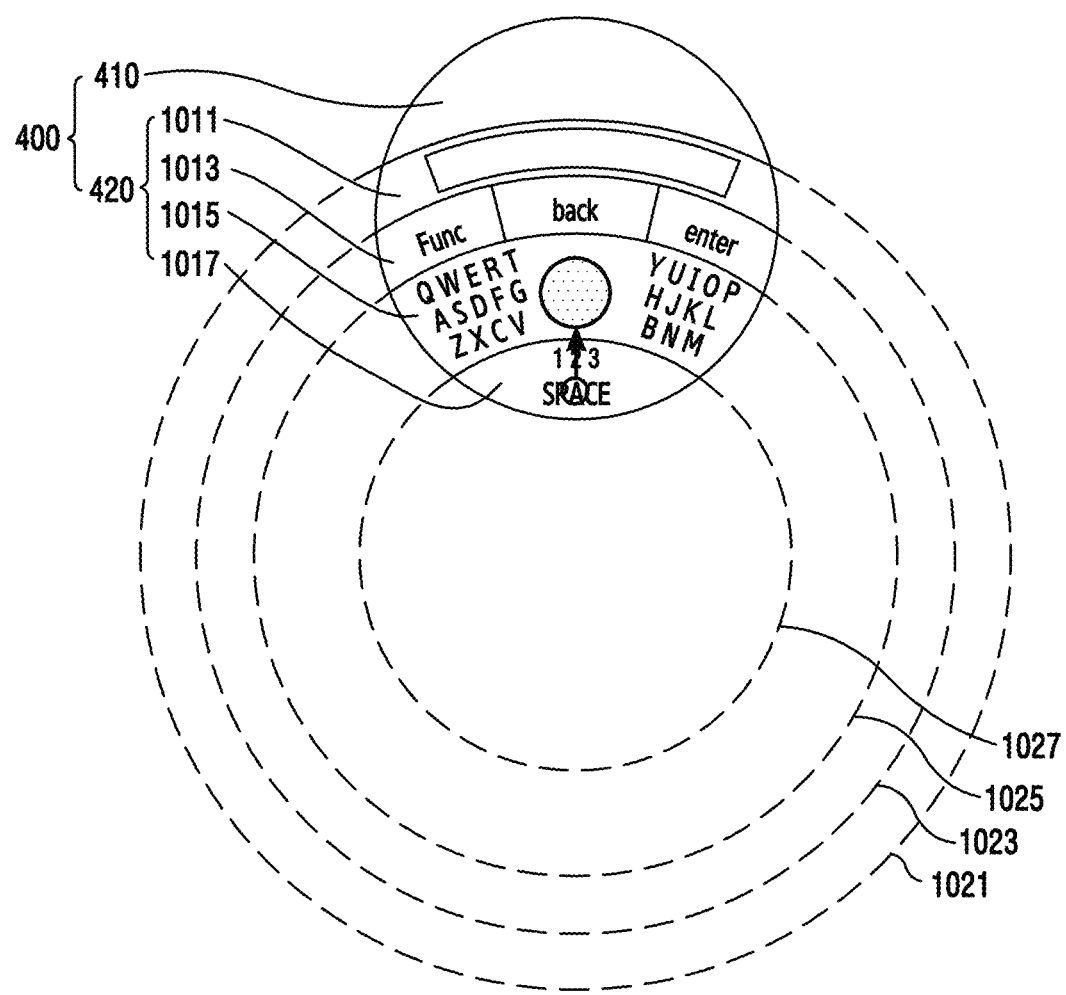
Figure 44:
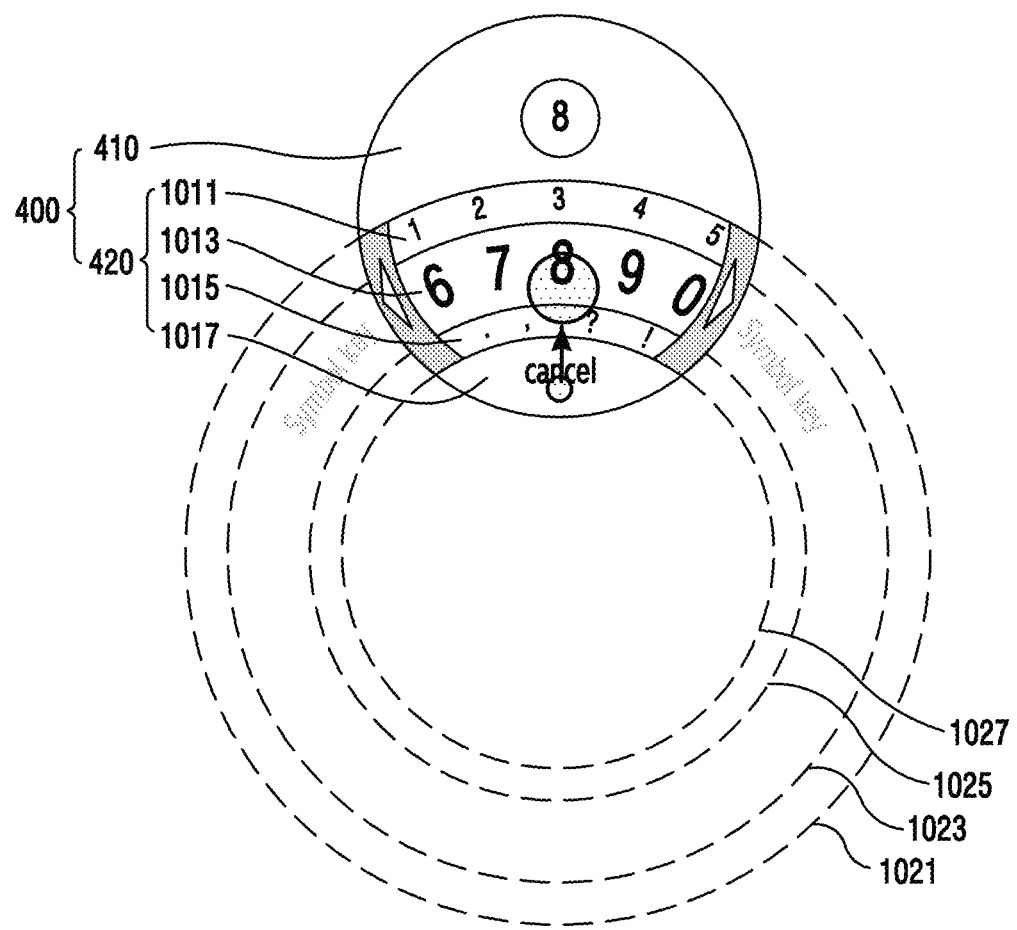
Figure 45:
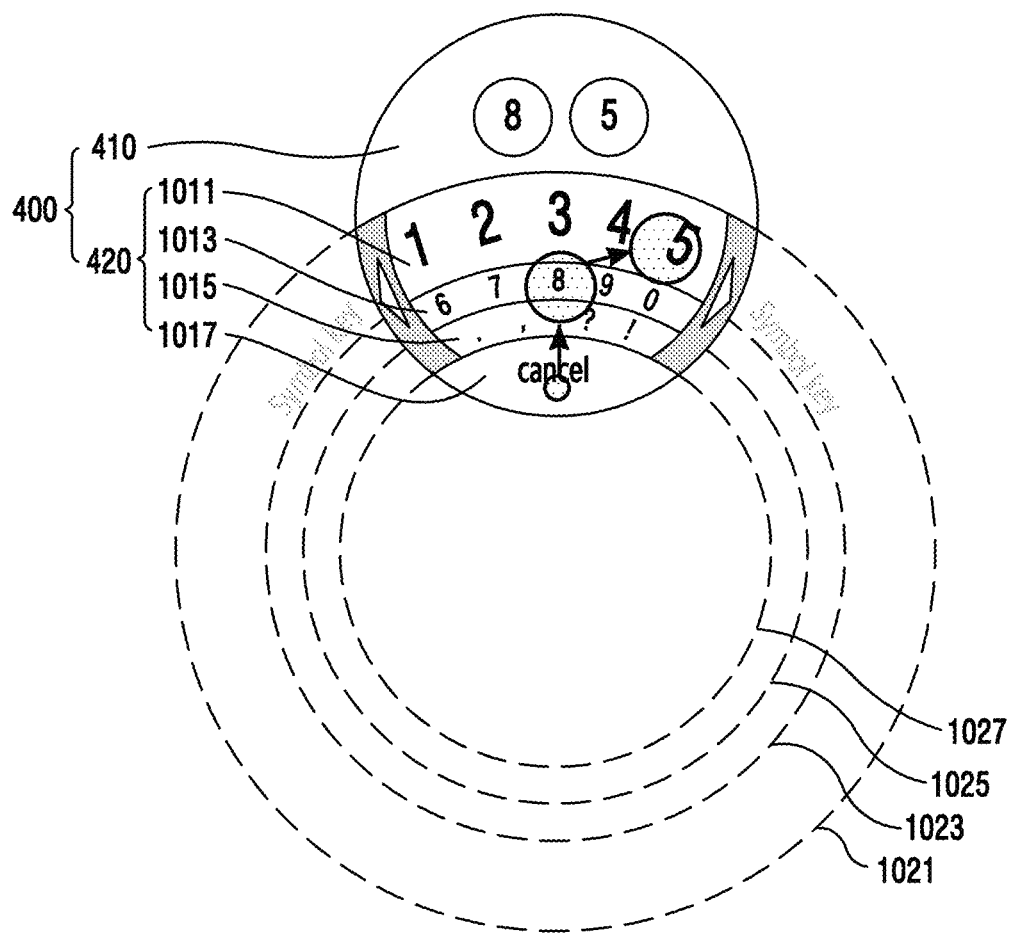

Meanwhile, as shown in FIG. 43 to FIG. 45, a function of inputting and displaying a numeric key on the second region 420 will be described.

When an English character key is displayed on the third sub-region 1015 and when a swipe is performed towards the third sub-region 1015 in a state of selecting a numeric key in the fourth sub-region 1017, a displayed keyboard may be changed. For example, as shown in FIG. 44, numeric keys may be displayed on the first sub-region 1011 and the second sub-region 1013. Meanwhile, symbol keys may be displayed on the third sub-region 1015. When a numeric key '8' displayed on the second sub-region 1013 is selected, a number '8' may be displayed on the first region 410. Further, the second width W2 of the second sub-region 1013 may be displayed to be wider than the first width W1 of the first sub-region 1011 and the third width W3 of the third sub-region 1015. Meanwhile, symbol keys may be included in virtual circles not displayed on the display 260. As shown in FIG. 45, when a numeric number '5' displayed on the first sub-region 1011 is selected after the numeric key '8' is selected, numbers '8' and '5' may be displayed on the first region 410. Upon selection of the numeric key, the selected number may be continuously displayed on the first region 410. Further, the first width W1 of the first sub-region 1011 may be wider than the second width W2 of the second sub-region 1013 and the third width W3 of the third sub-region 1015.

Figure 46:
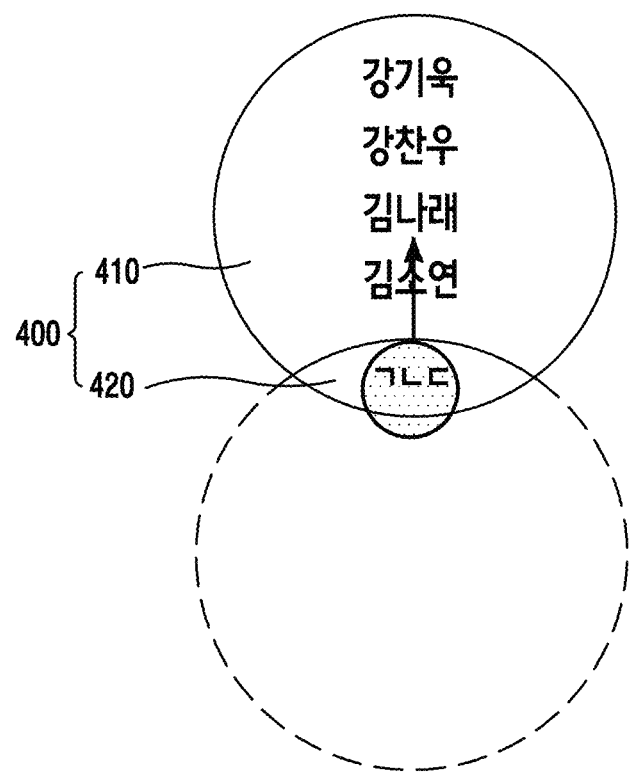
Figure 47:
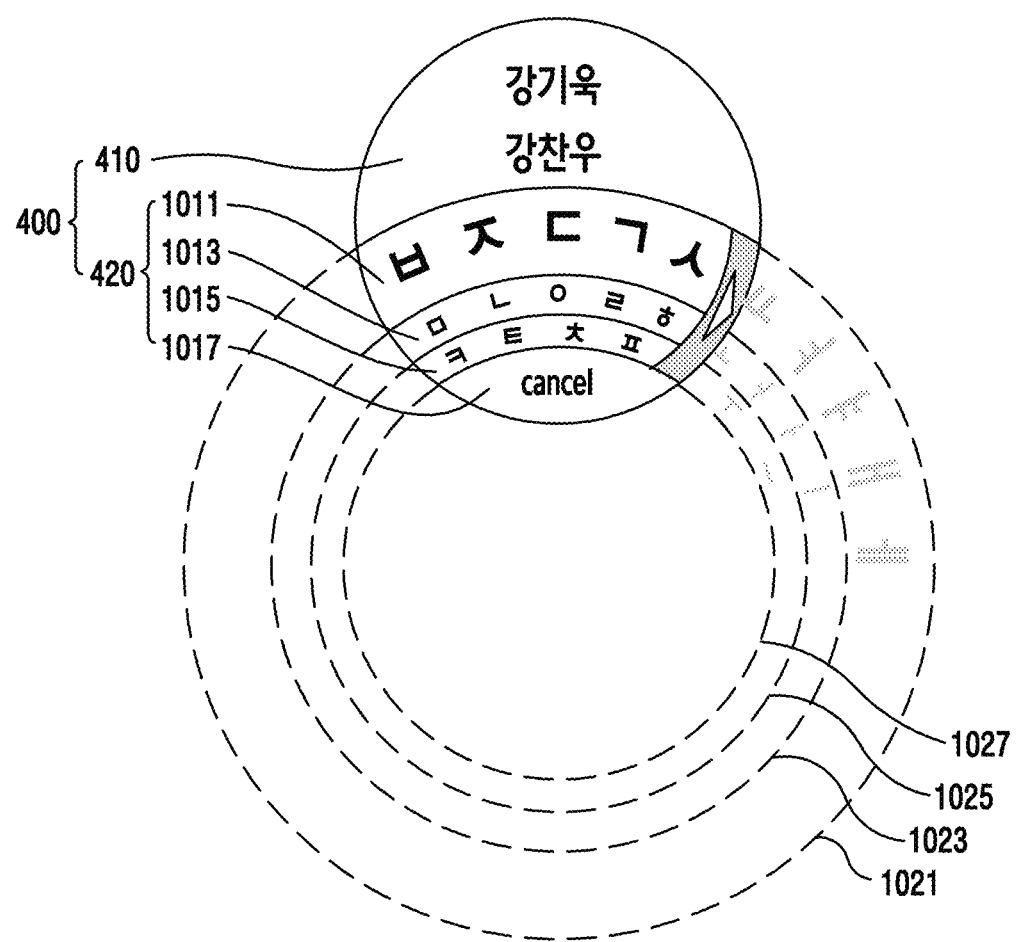
Figure 48:
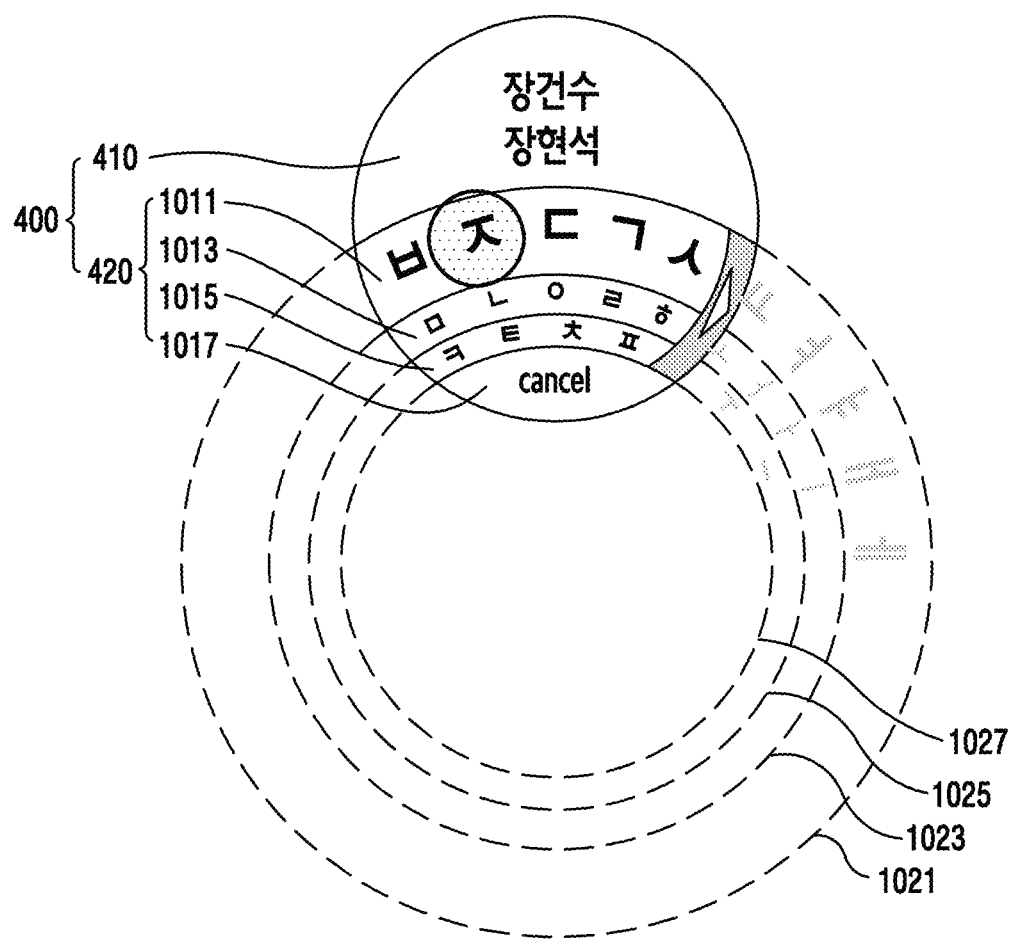
Figure 49:
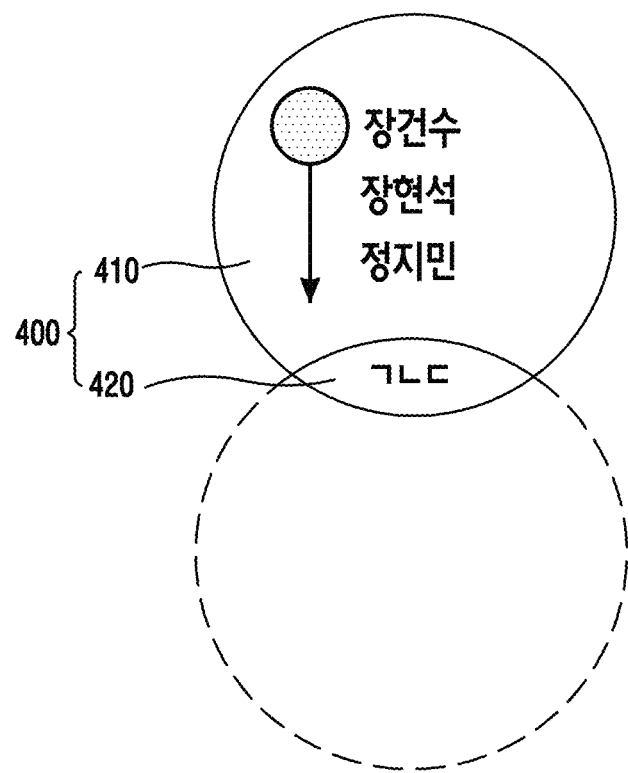
Figure 50:
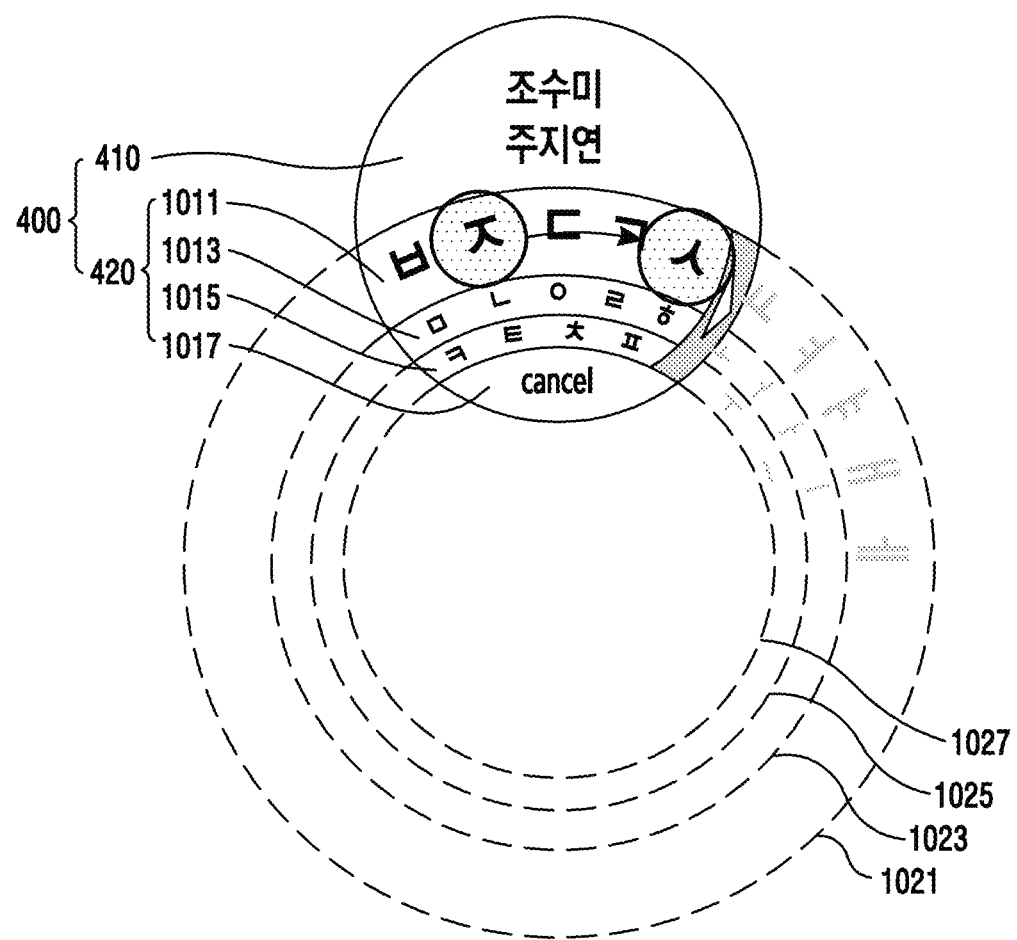

According to various embodiments of the disclosure, as shown in FIG. 46 to FIG. 50, the processor 120 may perform data search in operation 2021. For example, as shown in FIG. 46 and FIG. 47, a contact list is displayed on the first region 410, and the search may be performed when the selection of the second region 420 is input. When the second region 420 is selected and a swipe action is performed towards the first region 410, the first sub-region 1011, the second sub-region 1013, the third sub-region 1015, and the fourth sub-region 1017 may be displayed. Consonant keys may be displayed on the first sub-region 1011, the second sub-region 1013, and the third sub-region 1015. A cancel key may be displayed on the fourth sub-region 1017. As shown in FIG. 48 and FIG. 49, when a consonant key 'ㅊ' is selected in the first sub-region 1011, a contact may be aligned with respect to 'ㅊ' in the first region 410. A swipe action may be input to move the contact in the first region 410, and a selection may be input. For another example, as shown in FIG. 50, a plurality of consonants may be selected. For example, when a long-press is input on the consonant key 'ㅊ' for a specific time and a release is performed by moving to a consonant key 'ㅊ' then 'ㅊ' and 'ㅅ' are determined as an input value, thereby moving to data having 'ㅊ' and 'ㅅ' as a consonant. In this manner, a detailed search can be performed.

In an embodiment of the present disclosure, a keyboard is effectively displayed on the second region 420 and a character is input thereon, thereby allowing a precise keyboard input on a small display.

Figure 51:
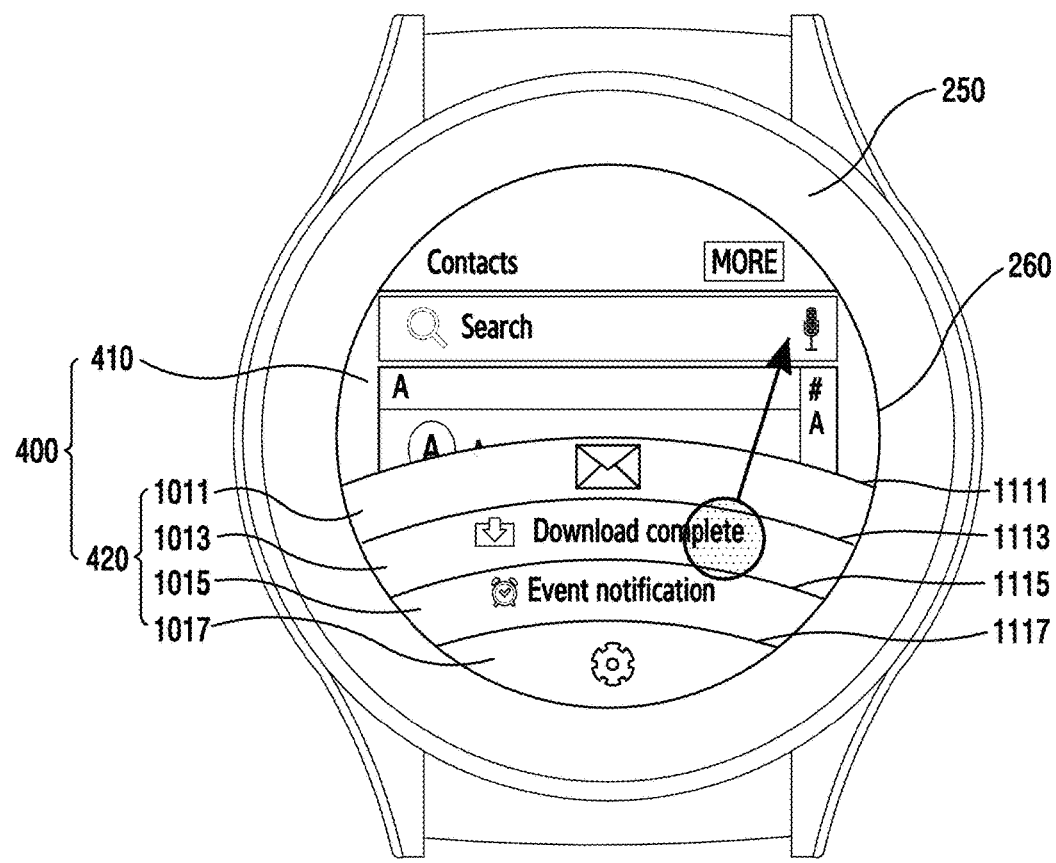
Figure 52:
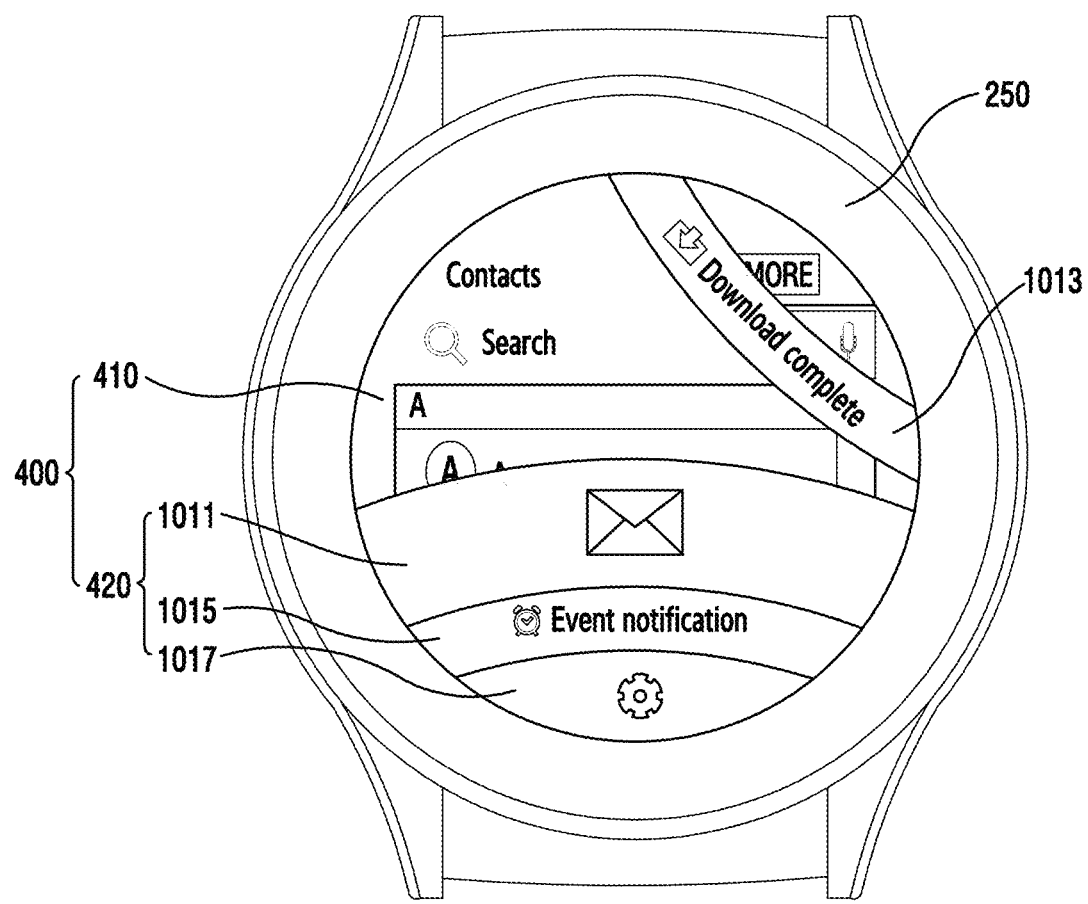

In operation 2023, the processor 120 may select whether to move and display the second region 420. When a specific gesture is input, the processor 120 may determine to move and display the second region 420. When it is selected to move and display the second region 420, the processor 120 may move and display the second region 420 in operation 2025. For example, as shown in FIG. 51 to FIG. 53, when the second sub-region 1013 is selected and a drag gesture is input, the second sub-region 1013 may move in a direction of the drag gesture. Therefore, at least one second sub-region 1013 may be displayed at a different location from the previously displayed second region 420, thereby generating the different second region 430. That is, as shown in FIG. 53, the second virtual circle 1023 and third virtual circle 1025 for defining the second sub-region 1013 may be moved to generate the different second region 430. Therefore, the second region 420 may include the first sub-region 1011, the third sub-region 1015, and the fourth sub-region 1017, and the different second region 430 may include the second sub-region 1013. According to one embodiment of the disclosure, if there is a request to display information which has a high priority or is important or information configured by an application, the processor 120 may display at least one sub-region at a location separated from the second region 420. According to one embodiment of the disclosure, the processor 120 may display the plurality of second regions 420 and 430 according to an event type (e.g., a system, a message, an application, or the like).

In an embodiment of the present disclosure, a variety of information can be displayed through a small display, and this can be easily controlled by a user. That is, a screen can be effectively divided by using an information display screen, thereby implementing a User Interface (UI) for a variety of information and applications.

Meanwhile, an embodiment of the present disclosure is applicable not only to the wearable electronic apparatus but also to various electronic apparatuses having a circular display. For example, it is also applicable to a display of a robot.

According to various embodiments of the present disclosure, a method of operating the electronic apparatus includes displaying the first region 410 and the second region 420, which are distinguished by the first curve 411 having the second radius R2, on the information display screen having the first radius R1, displaying first information on at least one part of the first region 410, displaying second information to at least one part of the second region 420, and changing at least one part of the displayed first information or second information, in response to an input of selecting the at least one part of the second region 420.

According to various embodiments of the present disclosure, the displaying of the first region 410 and the second region 420 on the information display screen further include generating the virtual circle 511 overlapping with the information display screen 400, and displaying at least one part of a circumference of the virtual circle 511 as the first curve 411.

According to various embodiments of the present disclosure, the second region 420 is a region in which the virtual circle 511 overlaps with the information display screen 400.

According to various embodiments of the present disclosure, the generating of the virtual circle 511 further includes determining the number of the virtual circles 511 on the basis of information to be displayed and determining a size of the virtual circle 511 on the basis of the information to be displayed.

According to various embodiments of the present disclosure, the method further includes changing at least one part of the first region 410 or the second region 420 in response to an input of selecting at least one part of the second region 420.

The features, structures, effects, and the like described in the various embodiments of the present disclosure are included in a single embodiment of the present disclosure and are not necessarily limited to a single embodiment. Furthermore, the features, structures, effects, and the like provided in each embodiment can be combined or modified in other embodiments covered by the present disclosure, as will be understood by those skilled in the art. Therefore, contents related to the combination and modification should be construed to be included in the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic apparatus comprising:
    a housing;
    a display having a first radius, wherein the display is exposed through one surface of the housing and is configured to detect one of a touch input or a gesture input;
    a processor electrically connected to the display; and
    a memory electrically connected to the processor, wherein the memory stores instructions that, when executed, allow the processor to:
        display first information on at least one part of a first region,
        display second information on at least one part of a second region, wherein the first region and the second region are distinguished by a first curve having a second radius, and
        in response to detecting an input of selecting a portion of the at least one part of the second region, change at least one part of the displayed first information,
    wherein the second region includes a plurality of sub-regions that are distinguished by a plurality of curves,
    wherein the plurality of sub-regions comprises:
        a first sub-region extending between the first curve and a second curve separated from the first curve in a second direction and having a third radius smaller than the second radius, and
        a second sub-region extending from the second curve in the second direction, and
    wherein the instructions further allow the processor to:
        determine a width of at least one of the first sub-region or the second sub-region, wherein the determination is based on at least one of an amount of the second information or an amount of a third information, the second information being information to be displayed on at least one part of the first sub-region, the third information being information to be displayed on at least one part of the second sub-region.

2. The electronic apparatus of claim 1, wherein the instructions allow the processor to display the first curve on the display.

3. The electronic apparatus of claim 1, wherein the instructions allow the processor to display a curved band or belt containing a periphery formed by the first curve on the display.

4. The electronic apparatus of claim 1,
    wherein the first region is a region extending outward from the first curve in a first direction, and
    wherein the second region is a region extending inward from the first curve in a second direction.

5. The electronic apparatus of claim 4,
    wherein the instructions allow the processor to:
        display the second information on the at least one part of the first sub-region on the display; and
        display the third information on the at least one part of the second sub-region on the display.

6. The electronic apparatus of claim 5, wherein the instructions allow the processor to:
    acquire a priority of the second information and the third information from at least one of the memory or an external device; and
    display the second information on the first sub-region and the third information on the second sub-region, based on the acquired priority.

7. The electronic apparatus of claim 6, wherein the instructions allow the processor to determine a width of at least one of the first sub-region or the second sub-region based on the acquired priority.

8. The electronic apparatus of claim 5, wherein the instructions allow the processor to determine a width of at least one of the first region, the first sub-region, or the second sub-region based on a user input of dragging a periphery between two regions, wherein the two regions are at least two of the first region, the first sub-region, or the second sub-region.

9. The electronic apparatus of claim 1, wherein the first radius is smaller than the second radius.

10. The electronic apparatus of claim 1, wherein the first information is information related to at least one application, and the second information is information related to the first information.

11. The electronic apparatus of claim 1, wherein the first information is information related to a first application, and the second information is information related to a second application.

12. An electronic apparatus comprising:
a housing;
a circular-shaped display exposed through one surface of the housing and having a first radius;
a user input device;
a processor electrically connected to the circular-shaped display and the user input device; and
a memory electrically connected to the processor, wherein the memory stores instructions that, when executed, allow the processor to:
display a first item on at least one part of a first region,
display a second item on at least one part of a second region, wherein the first region and the second region are distinguished by a first curve having a second radius and
in response to detecting an input of selecting the second item, change at least one part of a screen displayed on the second region,
wherein the second region includes a plurality of sub-regions that are distinguished by a plurality of curves,
wherein the plurality of sub-regions comprises:
a first sub-region extending between the first curve and a second curve separated from the first curve in a second direction and having a third radius smaller than the second radius, and
a second sub-region extending from the second curve in the second direction, and
wherein the instructions further allow the processor to:
determine a width of at least one of the first sub-region or the second sub-region, wherein the determination is based on at least one of an amount of the second item or an amount of a third item, the second item being an item to be displayed on at least one part of the first sub-region, the third item being an item to be displayed on at least one part of the second sub-region.

13. A method of operating an electronic apparatus, the method comprising:
displaying first information on at least one part of a first region;
displaying second information on at least one part of a second region, wherein the first region and the second region are distinguished by a first curve having a second radius;
in response to an input of selecting the at least one part of the second region, changing at least one part of the displayed first or second information,
wherein the second region includes a plurality of sub-regions that are distinguished by a plurality of curves
wherein the plurality of sub-regions comprises:
a first sub-region extending between the first curve and a second curve separated from the first curve in a second direction and having a third radius smaller than the second radius, and
a second sub-region extending from the second curve in the second direction; and
determining a width of at least one of the first sub-region or the second sub-region, wherein the determination is based on at least one of an amount of the second information or an amount of a third information, the second information being information to be displayed on at least one part of the first sub-region, the third information being information to be displayed on at least one part of the second sub-region.

14. The method of claim 13, wherein displaying the first information on the first region and second information on the second region comprises:
generating a number of virtual circles overlapping with an information display screen; and
in response to the number of virtual circles being one virtual circle, displaying at least one part of a circumference of the one virtual circle as the first curve.

15. The method of claim 14, wherein the second region is a region in which the one virtual circle overlaps with the information display screen.

16. The method of claim 14, wherein the generating of the number of virtual circles further comprises:
determining the number of virtual circles based on a number of information to be displayed; and
determining a size of the number of virtual circles based on the number of information to be displayed.

17. The method of claim 13, further comprising:
in response to the input of selecting the at least one part of the second region, further changing at least part of the first region or part of the second region.

* * * * *